(12) United States Patent  
Nirmal et al.

(10) Patent No.: US 10,795,061 B2
(45) Date of Patent: Oct. 6, 2020

(54) LIGHT REDIRECTING FILM WITH MULTI-PEAK MICROSTRUCTURED PRISMATIC ELEMENTS AND METHODS OF MAKING THEM

(71) Applicant: 3M INNOVATIVE PROPERTIES COMPANY, St. Paul, MN (US)

(72) Inventors: Manoj Nirmal, St. Paul, MN (US); Scott M. Tapio, Falcon Heights, MN (US); Erik A. Aho, New Richmond, WI (US); Bing Hao, Woodbury, MN (US); John F. Reed, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 133 days.

(21) Appl. No.: 16/190,920

(22) PCT Filed: May 12, 2017

(86) PCT No.: PCT/US2017/032360
§ 371 (c)(1),
(2) Date: Nov. 14, 2018

(87) PCT Pub. No.: WO2017/200862
PCT Pub. Date: Nov. 23, 2017

(65) Prior Publication Data
US 2019/0146126 A1 May 16, 2019

Related U.S. Application Data

(60) Provisional application No. 62/336,726, filed on May 15, 2016.

(51) Int. Cl.
*G02B 5/02* (2006.01)
*G02B 5/04* (2006.01)
*B32B 27/00* (2006.01)

(52) U.S. Cl.
CPC ............ *G02B 5/0231* (2013.01); *B32B 27/00* (2013.01); *G02B 5/0278* (2013.01); *G02B 5/04* (2013.01); *G02B 5/045* (2013.01)

(58) Field of Classification Search
CPC ........ G02B 5/02; G02B 5/0205; G02B 5/021; G02B 5/0215; G02B 5/0231;
(Continued)

(56) References Cited

U.S. PATENT DOCUMENTS

| 5,223,465 A | 6/1993 | Ueki |
| RE34,605 E | 5/1994 | Schrenk |

(Continued)

FOREIGN PATENT DOCUMENTS

| WO | WO 2011-084303 | 7/2011 |
| WO | WO 2011-084391 | 7/2011 |

(Continued)

*Primary Examiner* — Arnel C Lavarias

(57) ABSTRACT

Light redirecting film articles include a microstructured optical film, such as a daylight redirecting film, bonded to another film. This type of assembly may serve various purposes. For example, the assembly may protect the structured film, provide additional functionality, such as diffusion or infrared reflection, and/or facilitate attachment of the microstructured optical film to a mounting surface, such as a glazing or window pane.

15 Claims, 27 Drawing Sheets

(58) Field of Classification Search
CPC .. G02B 5/0273; G02B 5/0278; G02B 5/0294; G02B 6/0001; G02B 6/0011; G02B 6/0033; G02B 6/0035; G02B 6/0036; G02B 6/005; G02B 6/0051; G02B 6/0053
USPC ....... 359/591, 592, 594, 597, 598, 599, 601, 359/609, 613, 614; 362/600, 602, 603, 362/604, 605, 606, 607, 608, 609, 610, 362/615, 616, 617, 618, 619, 620
See application file for complete search history.

(56) References Cited

U.S. PATENT DOCUMENTS

| 5,360,659 | A | | 11/1994 | Arends |
| 5,551,042 | A | | 8/1996 | Lea |
| 5,579,162 | A | | 11/1996 | Bjornard |
| 5,763,049 | A | | 6/1998 | Frey |
| 5,771,328 | A | * | 6/1998 | Wortman ................. F21V 5/02 385/146 |
| 5,882,774 | A | | 3/1999 | Jonza |
| 6,049,419 | A | | 4/2000 | Wheatley |
| 6,288,172 | B1 | | 9/2001 | Goetz |
| 6,456,437 | B1 | | 9/2002 | Lea |
| 6,778,240 | B2 | | 8/2004 | Nakamura |
| 6,846,089 | B2 | * | 1/2005 | Stevenson ............. G02B 5/045 349/61 |
| 7,190,525 | B2 | | 3/2007 | Ito |
| 8,040,610 | B2 | | 10/2011 | Ko |
| 8,107,164 | B2 | | 1/2012 | Tsai |
| 8,657,472 | B2 | | 2/2014 | Aronson |
| 8,664,521 | B2 | | 3/2014 | Han |
| 9,863,593 | B2 | * | 1/2018 | Sakuragi ................... E06B 3/66 |
| 9,910,192 | B2 | * | 3/2018 | Hao .......................... E06B 9/24 |
| 10,151,860 | B2 | * | 12/2018 | Hao .......................... E06B 9/24 |
| 10,168,456 | B2 | * | 1/2019 | Edmonds ............... C09J 133/08 |
| 2005/0134963 | A1 | * | 6/2005 | Stevenson ......... G02F 1/133606 359/600 |
| 2008/0291541 | A1 | | 11/2008 | Padiyath |
| 2008/0292820 | A1 | | 11/2008 | Padiyath |
| 2009/0041553 | A1 | | 2/2009 | Burke |
| 2013/0004728 | A1 | * | 1/2013 | Boyd ..................... G02B 5/045 428/172 |
| 2013/0158475 | A1 | | 6/2013 | Xia |
| 2013/0236697 | A1 | | 9/2013 | Walker, Jr. |
| 2014/0093119 | A1 | | 4/2014 | Kagawa |
| 2014/0104689 | A1 | | 4/2014 | Padiyath |
| 2014/0198390 | A1 | | 7/2014 | Padiyath |
| 2014/0211331 | A1 | | 7/2014 | Padiyath |
| 2015/0293272 | A1 | | 10/2015 | Pham |

FOREIGN PATENT DOCUMENTS

| WO | WO 2012-134787 | 10/2012 |
| WO | WO 2014-147793 | 9/2014 |
| WO | WO 2015-050750 | 4/2015 |
| WO | WO 2015-072420 | 5/2015 |
| WO | WO 2016-064621 | 4/2016 |
| WO | WO 2016-064667 | 4/2016 |
| WO | WO 2016-099600 | 6/2016 |

* cited by examiner

A = Pitch
B = Height
Aspect Ratio = B/A = 1.23

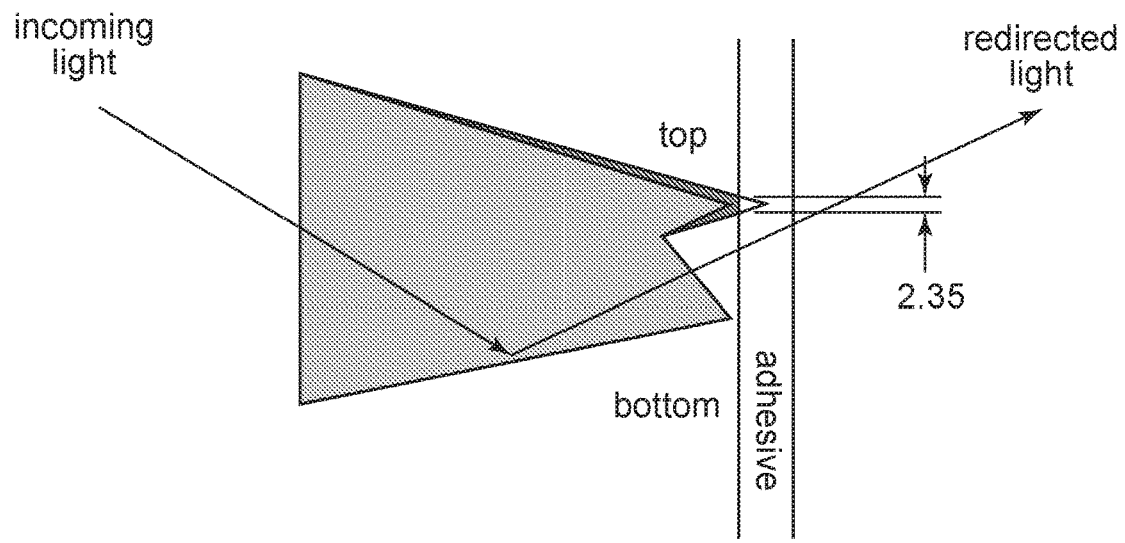
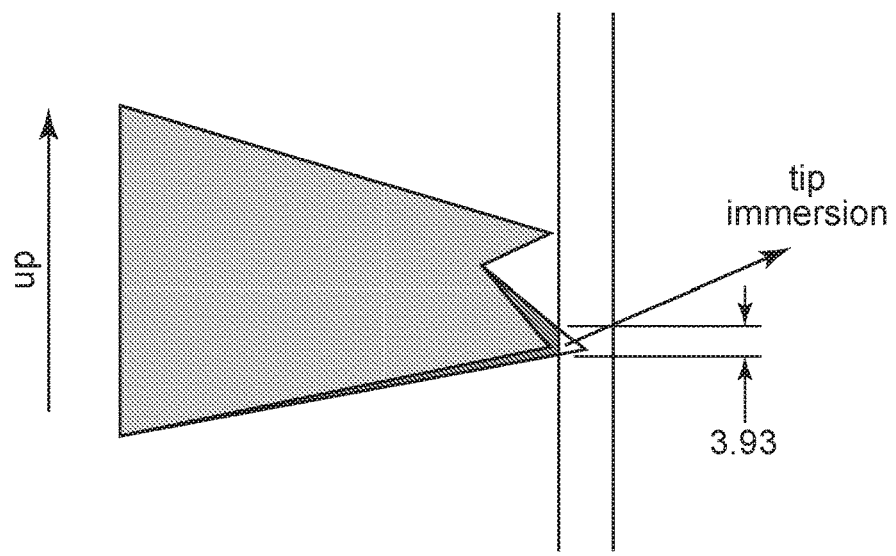
FIG. 18
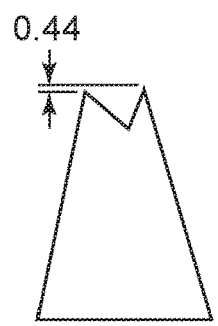
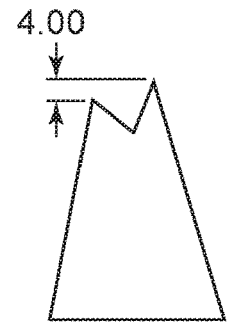
FIG. 19A          FIG. 19B

1. Diffuser coating (optional) or hardcoat (optional)
2. PET Film
3. Prism
4. Adhesive coating with beads (for diffusion)
5. Cover film 1. Diffuser
2. Cover film
3. Adhesive coating
4. Prism
5. PET Film
6. Adhesive (could be PSA)
7. Glass (or glazing) or release liner
8. Incoming light
9. Redirected light

LIGHT REDIRECTING FILM WITH MULTI-PEAK MICROSTRUCTURED PRISMATIC ELEMENTS AND METHODS OF MAKING THEM

CROSS REFERENCE TO RELATED APPLICATIONS

This application is a national stage filing under 35 U.S.C. 371 of PCT/US2017/032360, filed May 12, 2017, which claims the benefit of U.S. Provisional Application No. 62/336,726, filed May 15, 2016, the disclosure of which is incorporated by reference in its/their entirety herein.

The present disclosure relates to articles and methods of making light redirecting film constructions comprising a microstructured optical film, such as a daylight redirecting film, bonded to another film. This type of assembly may serve various purposes. For example, the assembly may protect the microstructured optical film, provide additional functionality, such as diffusion or infrared reflection, and/or facilitate attachment of the microstructured optical film to a mounting surface, such as a glazing or window pane.

BACKGROUND

A variety of approaches are used to reduce energy consumption in buildings. Among those approaches is the more efficient use of sunlight to provide lighting inside buildings. One technique for supplying light inside of buildings, such as in offices, residential buildings, etc. is the redirection of incoming sunlight. Because sunlight enters windows at a downward angle, much of this light produces glare and is not useful in illuminating a room. However, if the incoming downward light rays can be redirected upward such that they strike the ceiling, the light can be more usefully employed in lighting the room.

Light Redirection Films (LRFs), provide natural lighting by redirecting incoming sunlight upward, onto the ceiling. This can lead to significant energy savings by reducing the need for artificial lights. LRFs can consist of linear optical microstructures that reflect incoming sunlight onto the ceiling. LRFs are typically installed on the upper clerestory section of windows 7' and above. A typical configuration is shown on FIG. 1, where an LRF 101 on a window 110 redirects sunlight 120 upward as deflected (reflected or refracted) light 124.

Sunlight that would normally land on the floor can be used to provide natural lighting by using suitable constructions involving daylight redirecting films. A comparison of FIG. 2 (no LRF) with FIG. 3 (LRF present) shows an example of the amount of light that can be redirected from the floor to the ceiling by the use of a LRF 201.

Buildings (residential & commercial) account for about 40% of all energy consumed and lighting represents about 30% of that energy. Substituting even a fraction of artificial lighting with natural light can yield significant energy savings. The Illuminating Engineering Society of North America (IES) has developed a comprehensive daylight illuminance metric, named spatial Daylight Autonomy or sDA that characterizes the efficacy of daylighting systems. An extensive study conducted at several Department of Defense sites across the U.S. demonstrated that installation of 3M DRF increases sDA values. In addition to energy savings, daylighting has soft benefits related to increased worker productivity, elevated test scores, and improved mood and energy.

A problem that is frequently encountered when an area is illuminated using natural daylight is how to spread the light adequately and evenly. In the case, for example, in which an area is being illuminated within a building, there will usually be parts of that area that are less well-lit than others, and also some locations where the users of the building are troubled by glare from the light source. One solution to address this problem is the use of a diffuser.

In general, microstructured light redirecting films may be fragile under certain circumstances because the microstructured features may be subject to mechanical damage and/or chemical damage (e.g. window cleaners). One challenge when attempting to protect the microstructured elements in a LRF is that the lamination process to add a cover or protective layer can cause damage to those microstructured elements. The same challenge is present when attempting to laminate any other type of functional layer or film, such as a diffuser, to a LRF on the side of the microstructured elements. Additionally, the presence of an additional layer next to the LRF may also modify its optical properties and significantly degrade or modify its light redirecting properties. One of the goals of the present disclosure is to provide for film constructions that allow the bonding of a microstructured film, such as a LRF, to another functional film, without significantly sacrificing the optical performance of the microstructured film.

SUMMARY

The present disclosure is directed, inter alia, to film constructions comprising a microstructured optical film, such as a light redirecting film bonded to another film.

In some embodiments, film constructions of the present disclosure include light management film constructions comprising two films: a) a first optical film having a first major surface and a second major surface opposite the first major surface, wherein the first major surface comprises a microstructured surface comprising an ordered arrangement of a plurality of microstructured prismatic elements, and b) a cover film having a first major surface and a second major surface opposite the first major surface, the second major surface disposed adjacent to and making contact with and bonded to one or more of the microstructured prismatic elements of the first major structured surface of the first optical film. A cross section of a microstructured prismatic element comprises two or more peaks within the same microstructure.

The first major surface of the first optical film and second major surface of the cover film define an enclosed volume partially occupied by an adhesive layer and by the microstructured prismatic elements on the first major surface of the first optical film. That volume defines one or more optically active areas wherein a first material immediately adjacent to the microstructured prismatic elements, such as air or any other synthetic alternatives (e.g., aerogel), has a difference in refractive index (low with respect to the microstructured prismatic elements) that allows the microstructured prismatic elements to redirect light. The difference in refractive index between the first material (e.g., air) and the microstructured prismatic elements allows redirection of the incident light. Those one or more optically active areas are bounded by a second material, typically an adhesive, adjacent to a portion of the microstructured prismatic elements. The presence of the adhesive immediately adjacent the microstructured prismatic elements reduces the refraction in the portion of the microstructured prismatic element that is in contact with the adhesive if the refractive index of the adhesive is similar to the refractive index of the microstructured prismatic elements.

The first optical film and the cover film are bonded via the adhesive layer when certain portions of the microstructured prismatic elements (e.g., the tip of one or more of the peaks) on the first optical film penetrate the adhesive layer. Partial, as opposed to full, penetration of the tips (e.g., peaks) allows the presence of a low index interface (e.g., air or low index synthetic material) for the microstructured prismatic elements to refract light.

In some embodiments, the adhesive comprises a plurality of diffusing agents, such as particles or beads. The particles can include, for example, silica, alumina, TiO2, or zirconia micro or nanoparticles to scatter (diffuse) the light. As an alternate embodiment, spherical beads can be added to the adhesive. If the beads are matched in refractive index to the adhesive, then the beads will be transparent, but they can cause a rough surface which can generate haze and reduce clarity. For example, PMMA beads can be added to an acrylate adhesive of similar refractive index. In some embodiments, the particles have a mean diameter in a range from 0.1 to 100 microns, or 0.5 to 50 microns, or 0.7 to 20 microns. In illustrative embodiments, the particles can be "surface modified" such that the particles provide a stable dispersion in which the particles do not agglomerate after standing for a period of time, such as 24 hours, under ambient conditions.

In one embodiment, the present disclosure is directed to a film construction comprising:
 a light redirecting film having a first major surface and a second major surface opposite the first major surface, wherein the first major surface of the light redirecting film comprises a plurality of microstructured prismatic elements,
  wherein one or more of the microstructured prismatic elements have a first peak and a second peak,
  wherein the first peak has a height H1 and the second peak has a height H2,
  wherein H3 is H1−H2, and H3 is equal or greater than 1 micron,
 an adhesive layer comprising an adhesive, wherein the adhesive layer has a first major surface and a second major surface opposite the first major surface,
 a cover film having a first major surface and a second major surface opposite the first major surface, wherein the first peak of one or more of the microstructured prismatic elements penetrates at least partially into the first major surface of the adhesive layer, wherein the second major surface of the adhesive layer is adjacent to the first major surface of the cover film.

In other embodiments, the film construction comprises:
 a light redirecting film having a first major surface and a second major surface opposite the first major surface, wherein the first major surface of the light redirecting film comprises a plurality of microstructured prismatic elements,
  wherein one or more of the microstructured prismatic elements have a first peak and a second peak,
  wherein the first peak has a height H1 and the second peak has a height H2,
  wherein H3 is H1−H2, and H3 is from 1 microns to 8 microns,
 an adhesive layer comprising an adhesive, wherein the adhesive layer has a first major surface and a second major surface opposite the first major surface,
 a cover film having a first major surface and a second major surface opposite the first major surface,
 a diffusion layer,
  wherein when the film construction is in a vertical position, the first peak of the microstructured prismatic element is positionally located above the second peak,
  wherein the first peak has an apex angle B1 and the second peak has an apex angle B2, and wherein B1<B2,
  wherein the first peak of one or more of the microstructured prismatic elements penetrates at least partially into the first major surface of the adhesive layer,
  wherein the first major surface of the light redirecting film is bonded to the first major surface of the adhesive layer,
  wherein the second major surface of the adhesive layer is bonded to the first major surface of the cover film.

In other embodiments, the present disclosure is directed to window films that comprise a film constructions as described above. In yet other embodiments, the present disclosure is directed to windows comprising film constructions as described herein.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters used in describing the broad scope of the invention are approximations, the numerical values in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "adhesive" as used herein refers to polymeric compositions useful to adhere together two components (adherents).

The term "bonded" as used herein refers to an element that has been adhesively attached to another element. Any type of adhesive can be used to bond to elements together. The term "bonded" can be used to describe adhesive attachment of one element (for example a layer or an individual microstructured prismatic element) to an adhesive or adhesive layer or to another element adhesively attached to the adhesive or adhesive layer. For example, in FIG. 11, the microstructured prismatic element (or in general terms the film comprising the microstructured prismatic element) is bonded (via the tip of each peak) to the adhesive layer, but it can also be said that the microstructured prismatic element (or the film) is bonded to the substrate (e.g., a cover film).

The term "penetrates" or "penetrating" as used herein in the context of a portion of a microstructured prismatic element penetrating an adhesive layer refers to a portion of the microstructured prismatic element being embedded in the adhesive layer, which would allow, once the adhesive is cured, set, hardened, etc., the microstructured prismatic element (or a film containing the microstructured prismatic element) to be bonded to the adhesive layer or to another film or substrate (e.g., a cover film). For example, FIGS. 12 and 13 show that the tip of each peak of the microstructured prismatic element penetrate the adhesive layer. The portion of the microstructured prismatic element that penetrates the adhesive later is defined as the "bonding portion" of the microstructured prismatic element. FIGS. 14 A and B show that the microstructured prismatic element (or the light redirecting film) is bonded to the adhesive layer (or to the substrate bonded to the adhesive layer) by means of the tips of the peaks of the microstructured prismatic element having penetrated the adhesive layer, creating surface contact between the prismatic element and the adhesive.

The term "window film adhesive layer" as used herein refers to a layer comprising an adhesive suitable to bond a film to a window or glazing, such as, for example, a pressure sensitive adhesive.

The term "adjacent" as used herein refers to the relative position of two elements, such as layers in a film construction, that are close to each other and may or may not be necessarily in contact with each other and may have one or more layers separating the two elements, as understood by the context in which "adjacent" appears.

The term "immediately adjacent" as used herein refers to the relative position of two elements, such as layers in a film construction, that are in physical contact and immediately next to each other without having any other layers separating the two elements, as understood by the context in which "immediately adjacent" appears. The term "immediately adjacent," however, encompasses situations where one or both elements have been treated with a primer, or whose surface has been modified to affect the properties thereof, such as etching, embossing, etc., or by surface treatments, such as corona or plasma treatment, etc., that may improve adhesion.

The term "construction" or "assembly" are used interchangeably in this application when referring to a multilayer film, in which the different layers can be coextruded, laminated, coated one over another, or any combination thereof.

The terms "pitch," "height," "valley angle," "first included angle alpha," "second included angle beta," "apex angle," and "aspect ratio" in connection with a microstructured prismatic element are defined as follows, with reference to FIG. 5. The pitch is the length of side A. The height is the height of the tallest peak (H1), which in FIG. 5 is the peak formed by sides D and E. That is, the height of the microstructure is the horizontal distance from the Y axis to the apex of the tallest peak, which in FIG. 5 is formed by sides D and E. The valley angle is the angle 407. The first included angle, or angle alpha, is the angle "a." The second included angle, or angle beta, is the angle "b." The apex angle is the internal angle of a peak. In FIG. 5, the apex angle for the peak formed by sides B and C is the angle "d" and the apex angle for the peak formed by sides D and E is the angle "c." The aspect ratio is the ratio between the height of the microstructured prismatic element and the pitch (H1/A).

The term "optical film" as used herein refers to films that are at least optically transparent and which may have high transmission of visible light, may be optically clear or translucent and may also produce additional optical effects. Examples of additional optical effects include, for example, light diffusion, light polarization or reflection of certain wavelengths of light. The optical film may be any suitable film that has high optical transmission in the visible light region of the spectrum. An optical film may have a visible light transmission greater than 20%, greater than 50%, or in certain preferred embodiments, greater than 80%. The optical film may be a single layer film or a multilayer film construction.

The term "ordered arrangement" as used herein to describe a plurality of structures, refers to a regular, repeated pattern of structures.

The term "substantially straight" in the context of a side of a microstructured prismatic element as used herein refers to a side that is mostly straight but that could deviate from a straight line due to inaccuracies introduced by manufacturing processes or may intentionally have minor curvature (i.e. large radius) to spread redirected (refract) light.

The term "light redirecting layer" as used herein refers to a layer that comprises microstructured prismatic elements.

The term "light redirecting film" or "light directing film" as used herein refers to a film that comprises one or more light redirecting layers and optionally other additional layers, such as substrates or other functional layers. A daylight redirecting film is an example of a light redirecting film.

Light redirection, in general, may be called daylight redirection, sunlight redirection, or solar light redirection when the source of light is the sun.

The term "film" as used herein refers, depending on the context, to either a single layer article or to a multilayer construction, where the different layers may have been laminated, co-extruded, coated, or any combination thereof.

The term "microstructured prismatic element," sometimes referred to in the short form as "microstructures," as used herein refers to an engineered optical element, wherein at least 2 dimensions of the features are microscopic, that redirects input light with certain angular characteristics into output light with certain angular characteristics. In certain embodiments, the height of the microstructured prismatic element is less than 1000 microns. A microstructured prismatic element of the present disclosure may comprise a multipeak structure, such as a double peak structure, structures comprising one or more curved facets, or combinations thereof. The microstructured prismatic elements, including all of their physical and optical characteristics (e.g., glare, TIR angles, etc.), are disclosed in PCT application titled "Room-Facing Light Redirecting Film with Reduced Glare," published as WO 2016/064667 and PCT application titled "Sun-Facing Light Redirecting Film with Reduced Glare," published as WO 2016/064621, are hereby incorporated by reference. Examples of microstructured prismatic elements 410 are shown in FIGS. 4 to 9.

The term "diffusing agent" as used herein refers to features or additives incorporated into an article that increase the angular spread of light passing through the same article, such as, for example, micro beads or nanoparticles.

The term "diffusing layer," "diffusive element," or "diffuser" are interchangeable in this disclosure and as used herein refer to an element in a film construction that provides diffusion of visible light. The diffusive element may be a layer or coating having diffusive properties with respect to visible light or a surface treatment on a layer of the film constructions of the present disclosure that provides diffusive properties to the treated surface.

The term "positionally located above" as used herein refers to the relative position of one peak in a microstructured prismatic element with respect to another peak in the same microstructured prismatic element. When the microstructured prismatic element is in a vertical position (see, e.g., microstructured prismatic element 410 in FIG. 4 or 5) and its base (side A) is parallel to a vertical axis (e.g., a y-axis) the peak with the apex located at the longest distance from the x-axis in the y-direction is the peak that is positionally located above the other peak. In this case, the location of the x and y axes is chosen so that the microstructured prismatic element is fully in the quadrant where both x and y have positive values. For example, in FIG. 4, the peak defined by sides C and D (apex angle "d") is positionally located above the peak defined by sides D and E (apex angle "c"). In FIG. 7, the peak with an apex angle of 41.0° is positionally located above the peak with an apex angle of 61.3°.

As used herein, the index of refraction of a material 1 ("RI1") is said to "match" the index of refraction of a material 2 ("RI2") if the value RI' is within +/−5% of RI2.

For the following definitions of "room-facing" and "sun-facing," it is assumed that a light redirecting layer has a first major surface and second major surface opposite the first major surface and that the first major surface of the light redirecting film comprises microstructured prismatic elements.

As used herein, the term "room-facing," in the context of a light redirecting film or a construction comprising a light redirecting film, refers to a film or construction where the incident light rays pass through the major surface of the light redirecting film not containing the microstructured prismatic elements before they pass through the major surface that contains the microstructured prismatic elements. In the most typical configuration, when the light redirecting film is located on an exterior window (i.e., when the window faces the exterior of a building), the microstructured prismatic elements in a "room-facing" configuration are oriented facing the interior of the room. However, the term "room-facing," as defined herein can also refer to configurations where the light redirecting film is on a glazing, or other kind of substrate, that does not face the exterior of the building, but is in between two interior areas.

As used herein, the term "sun-facing," in the context of a light redirecting film or a construction comprising a light redirecting film, refers to a film or construction where the incident light rays pass through the major surface of the light redirecting film containing the microstructured prismatic elements before they pass through the other major surface (the major surface not containing the microstructured prismatic elements). In the most typical configuration, when the light redirecting film is located on an exterior window (i.e., when the window faces the exterior of a building), the microstructured prismatic elements in a "sun-facing" configuration are oriented facing the sun. However, the term "sun-facing," as defined herein can also refer to configurations where the light redirecting film is on a glazing that does not face the exterior of the building, but is in between two interior areas.

As used herein, the term "sealing" or "sealed" when referring to an edge of an article of this disclosure means blocking the ingress of certain undesired elements such as moisture, air, and/or other contaminants.

The term "setting" or "curing" as used herein refers to transforming a material from an initial state to its final desired state with different properties such as flow, stiffness, etc., using physical (e.g. temperature, either heating or cooling), chemical, or radiation (e.g. UV or e-beam radiation) means.

The term "visible light" as used herein refers to refers to radiation in the visible spectrum, which in this disclosure is taken to be from 380 nm to 700 nm.

The term "punch through" as used herein refers to light that transmits directly (or specularly) through the light directing film construction without redirection. Another embodiment of punch through is light that is only redirected at +5 or −5 degrees from specular transmission. Punch through can cause glare, especially with light that is directed shallow and down from the horizontal position that the light impinges on the LRF.

BRIEF DESCRIPTION OF THE DRAWINGS

FIG. 18 shows two different modified microstructured prismatic element based on the same initial structure. The top panel shows a microstructured prismatic element where the top peak extended and immersed into adhesive and the bottom panel shows a microstructured prismatic element where the bottom peak extended and immersed into adhesive.

FIG. 19 is a cross-section showing two microstructured prismatic elements having different relative peak heights.

ELEMENT NUMBERS

Figure 1:
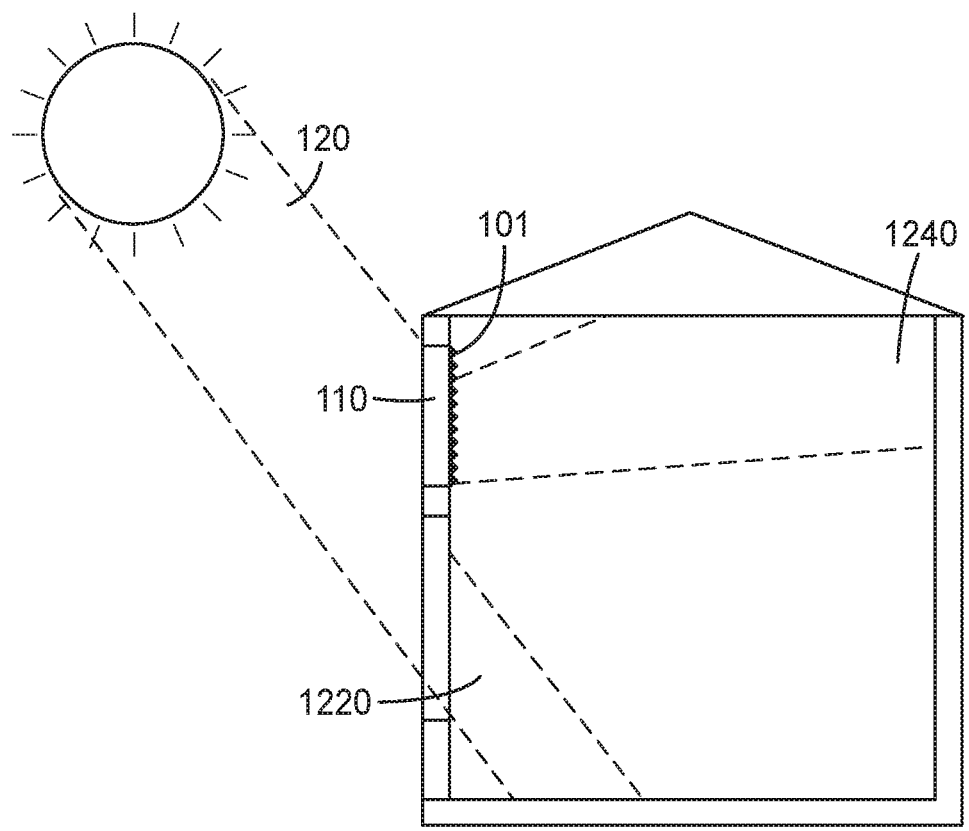
FIG. 1 is a typical configuration showing the use of a light redirecting film, demonstrating light redirection after the light passed through a room-facing light redirecting layer.
Figure 2:
FIG. 2 shows light entering a room through a window without a light redirecting film.
Figure 3:
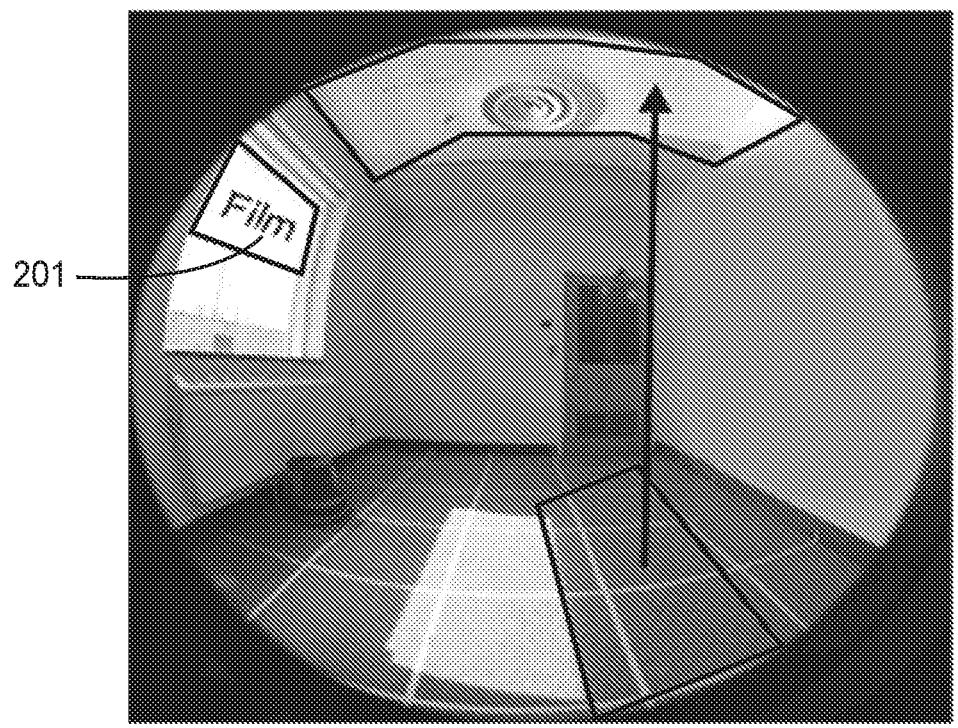
FIG. 3 shows an example of the amount of light that can be redirected from the floor to the ceiling by the use of a light redirecting film construction.
Figure 4:
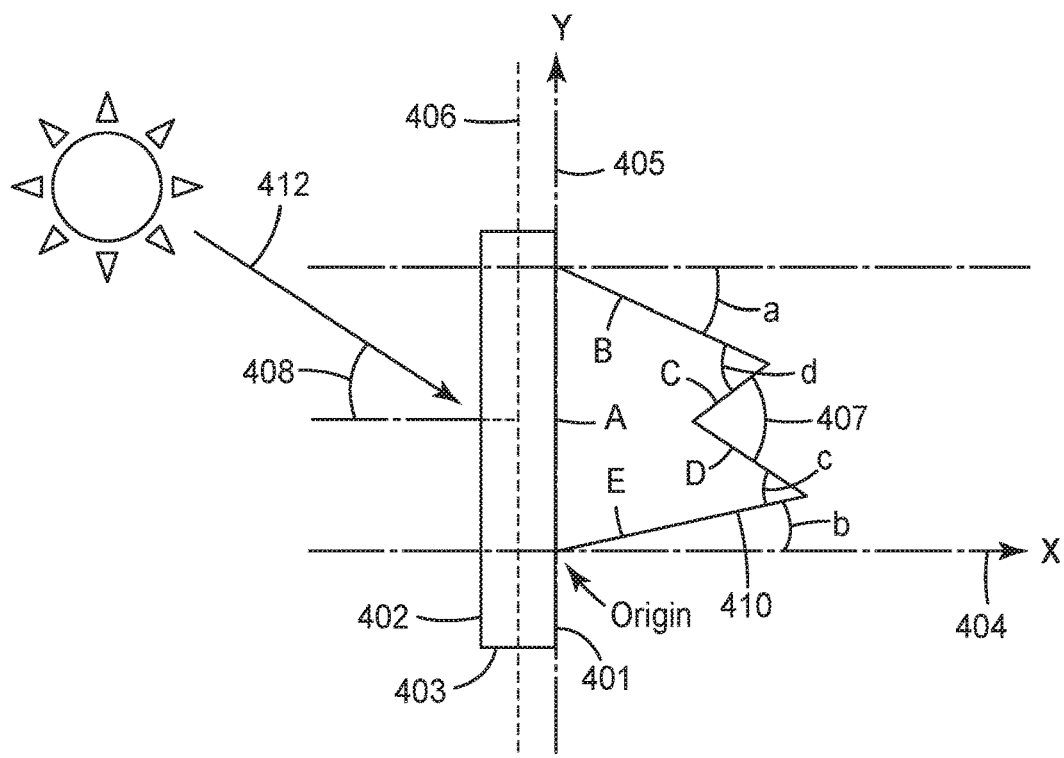
FIG. 4 shows a schematic diagram of a room-facing microstructured prismatic element of the present disclosure.
Figure 5:
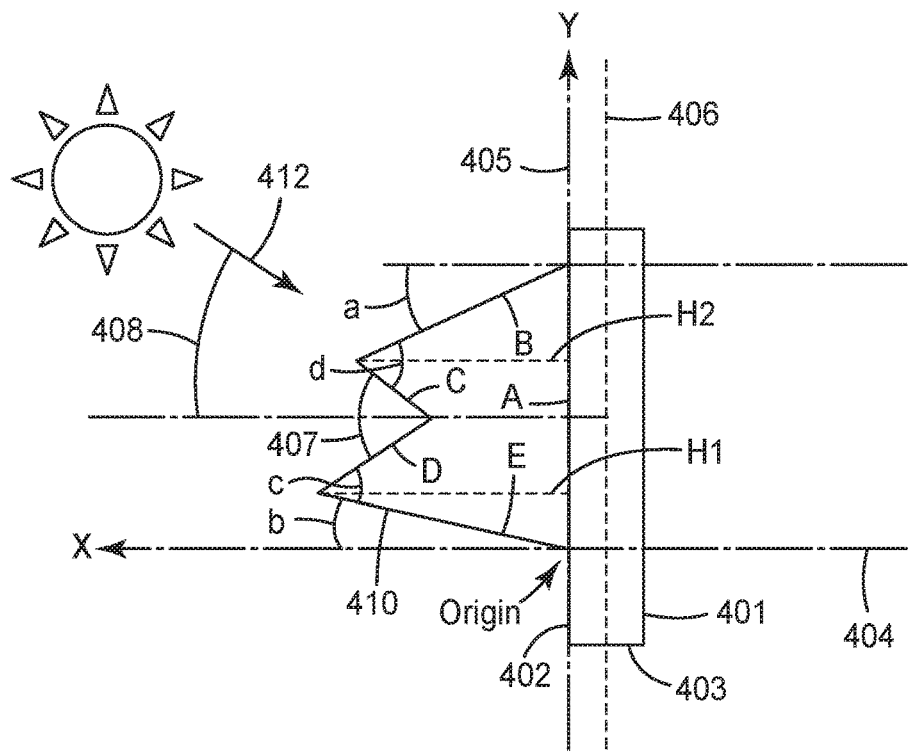
FIG. 5 shows a schematic diagram of a sun-facing microstructured prismatic element of the present disclosure.

101 Light Redirecting Film Construction
110 Window
120 Sunlight
121 Cover film
122 Guiding roller
123 Nip roller
124 Resin composition
125 Patterned tool roll
126 Coating die
127 Microstructured tool surface
129 Radiation source
130 Radiation source
131 Film with microstructured prismatic elements
201 Light Redirecting Film Construction
401 First major surface of the optical substrate
402 Second major surface of the optical substrate
403 Optical substrate
404 Reference X-axis
405 Reference Y-axis
406 Reference plane
407 Valley angle
408 Light incidence angle
410 Microstructured prismatic element
412 Sunlight
1220 Sunlight deflected downward
1240 Sunlight deflected upward
1502 Guiding roll
1504 Microstructured prismatic film
1506 Unwind roll
1508 Guiding roll
1512 Unwind roll
1514 Stripped film
1516 Cover film
1518 Pinch roller pair
1520 Coater
1522 Adhesive layer
1526 UV lamp
1528 Layered film
1542 Collection roll In the following description, reference is made to the accompanying Figures herein described. In certain cases, the Figures may depict, by way of illustration, several specific embodiments of the present disclosure. It is to be understood that other embodiments different from those explicitly depicted in the Figures are contemplated and may be made without departing from the scope or spirit of the present disclosure. The following detailed description, therefore, is not to be taken in a limiting sense.

DETAILED DESCRIPTION

The disclosure in the present disclosure is exemplified by referring to light, or daylight redirecting films and light or daylight redirecting layers as being part of the overall construction, but the concepts and subject matter taught and claimed in this application can extend to other microstructured optical films that are not light redirecting films.

In general, the present disclosure relates to film constructions where two films are bonded to each other and at least one of the films comprises a microstructured optical film. In a typical example, the microstructured prismatic optical film may be a light redirecting film and the second film is a cover film. Bonding of the structured surface of the optical film to an opposing surface of the cover film occurs via a layer of adhesive, wherein certain portions of the surface features of the microstructured prismatic elements of the microstructured optical film penetrate partially into the adhesive to a depth that is less than the height of the microstructured prismatic element. The microstructured prismatic elements of the present disclosure have two or more peaks. In some embodiments, only one peak of a microstructured prismatic element penetrates partially into the adhesive. In other embodiments, both peaks (e.g., in a two peak microstructured prismatic element) penetrate the adhesive. Under certain circumstances, it is preferable that only one peak of the multi-peak microstructured prismatic element penetrates into the adhesive in order to increase light redirection.

Typically, the adhesive layer has a thickness less than the associated heights of the microstructured prismatic element that penetrates the adhesive so as to leave a gap between the adhesive layer and portions of the light redirecting layer comprising the microstructured prismatic elements.

Full penetration of the microstructured prismatic element into the adhesive would reduce or eliminate the needed difference in refractive index between the microstructured prismatic element and the surrounding low index material (e.g., air) such that light redirection would be significantly adversely affected.

The type of bonding disclosed and taught in this application between two films (e.g., a light redirecting film and a cover film) refers to bonding only via selected areas in the light redirecting film (such as, e.g., the tips of peaks in the microstructured prismatic elements) in order to increase the light redirecting function (or a suitable function in other microstructured optical films) of the film. As will be shown below, because the presence of the adhesive contacting the microstructured prismatic elements decreases the ability to redirect light as the bonding portions of the microstructured prismatic elements (e.g., portions of the peaks) penetrate into the adhesive, there is a functional balance between the size and number of the bonding portions and the strength of the bond between the light redirecting film and the cover film. That is, as the size and number of the bonding portions increases, the strength of the bond increases, which is beneficial, but there is also less area left to perform the light redirecting function of the original light redirecting film. Conversely, as the size of the bonding portions decreases, the higher amount of light is redirected, but the size of the area available for bonding decreases as does the strength of the bond between the two films.

If the refractive index of the adhesive and the prismatic element are similar, the light will not be redirected and will punch through the film, and can produce glare. As the size and number of the bonding portions increases, the amount of punch through will increase.

Multi-peaked microstructured prismatic elements

In general, in daylight redirecting applications it is preferable that the incident light be redirected up and at shallow angles from the horizontal position that the light impinges on the LRF. This distribution provides light deeper within the interior spaces and away from windows where natural light is in short supply.

Figure 10:
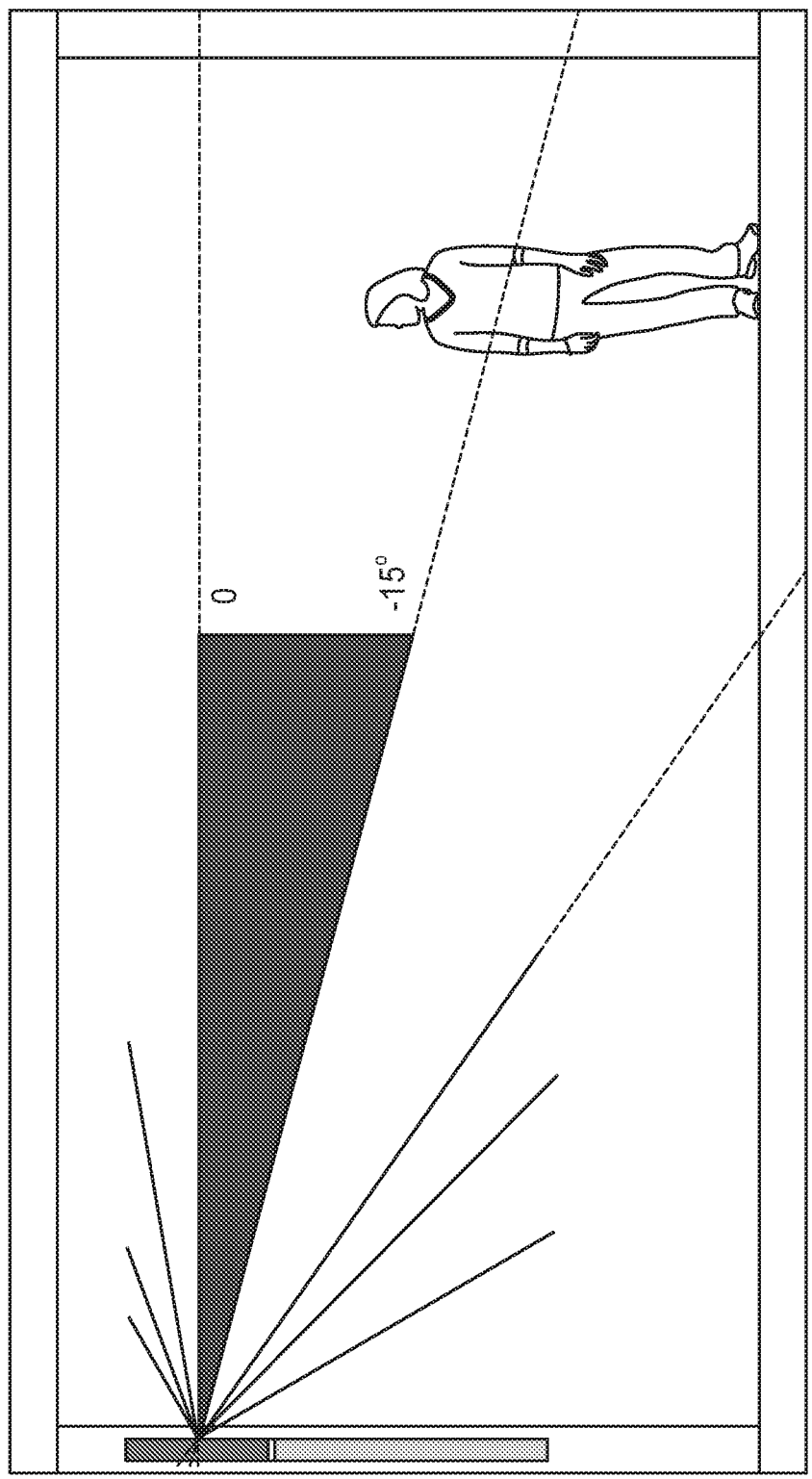
FIG. 10 is a cross-section of a room in which the upper portion of the window is outfitted with a light redirecting film, and shows the fraction of the light that is downwardly deflected as direct glare.

The light output from a light directing film is shown in FIG. 10. In general, it is desired to redirect the light upward and deep into the room. Light that is not redirected (punch-through) or light that is directed downward is not desirable as it will contribute to glare. The inventors have designated different upward and downward regions to model and measure light redirection to optimize performance. For example, as shown in FIG. 10 is a region designated as "Direct Glare" for angles from 0 degrees to −15 degrees below horizontal. In addition to improving the redirection performance, the inventors have considered other design constraints imposed to ensure that the microstructured prismatic elements can be made using a viable manufacturing process.

Figure 11:
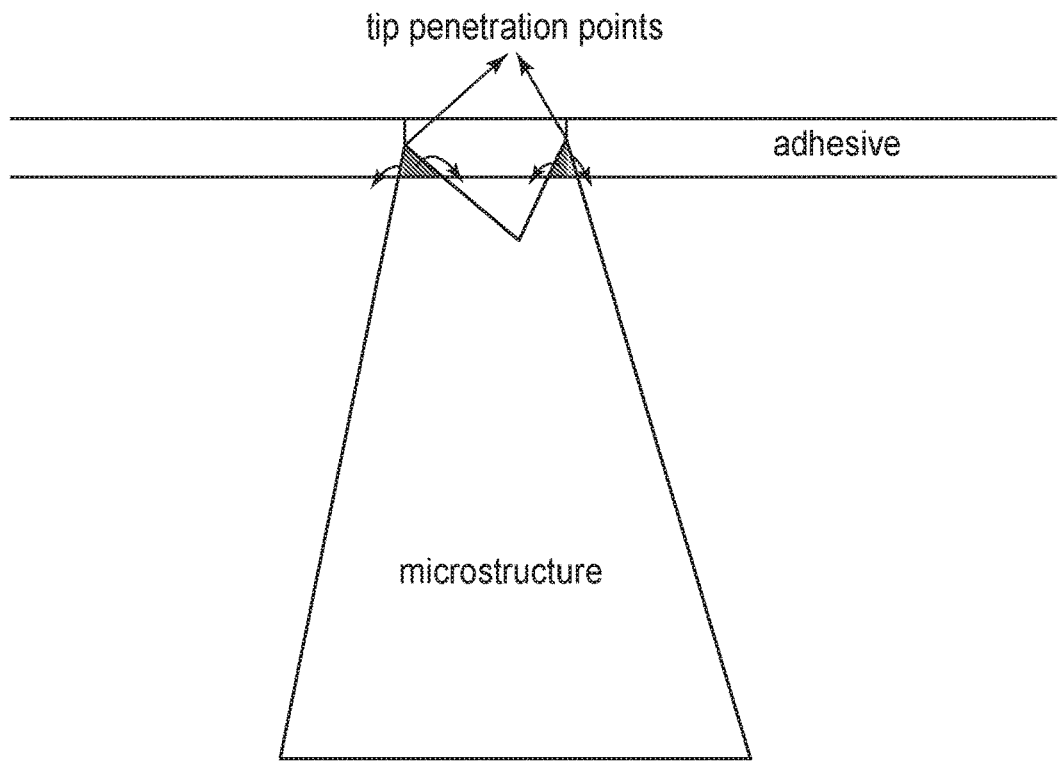
FIG. 11 is a cross-section showing a microstructured prismatic element embedded in a layer of adhesive (0° to −15°).

With respect to a microstructured prismatic element having two peaks, each peak may have different included angles and different heights. The inventors have taken into account the bonding process in order to design improved microstructured prismatic elements. For example, the inventors have found that during lamination of the daylight redirecting film and the cover film, the direction of adhesive flow is constrained by the tip immersion points (FIG. 11).

Figure 12:
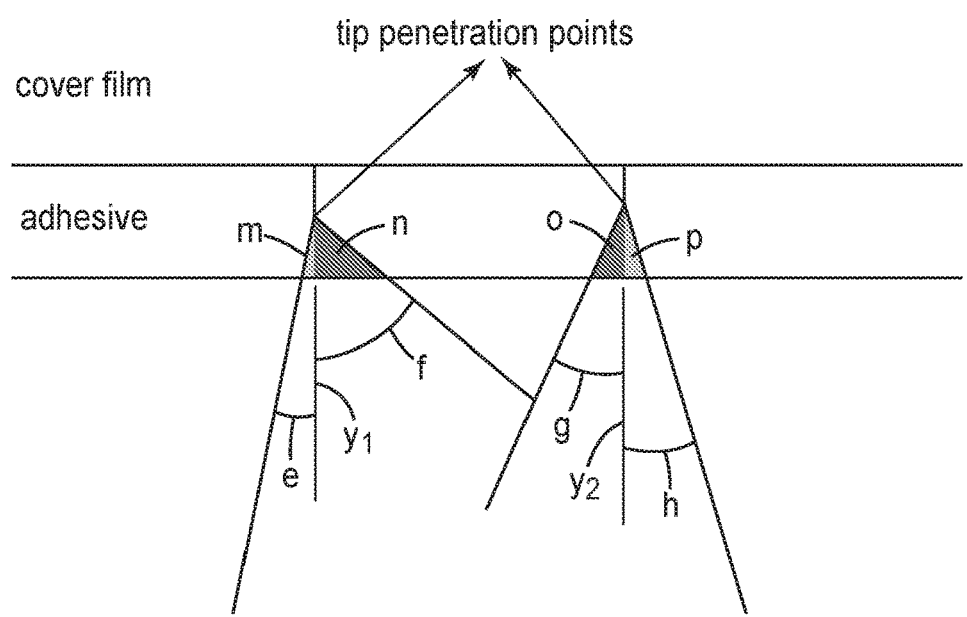
FIG. 12 is a cross-section showing that the amount of adhesive displaced by a facet of the embedded microstructured prismatic element is proportional to the slope of the facet.
Figure 13:
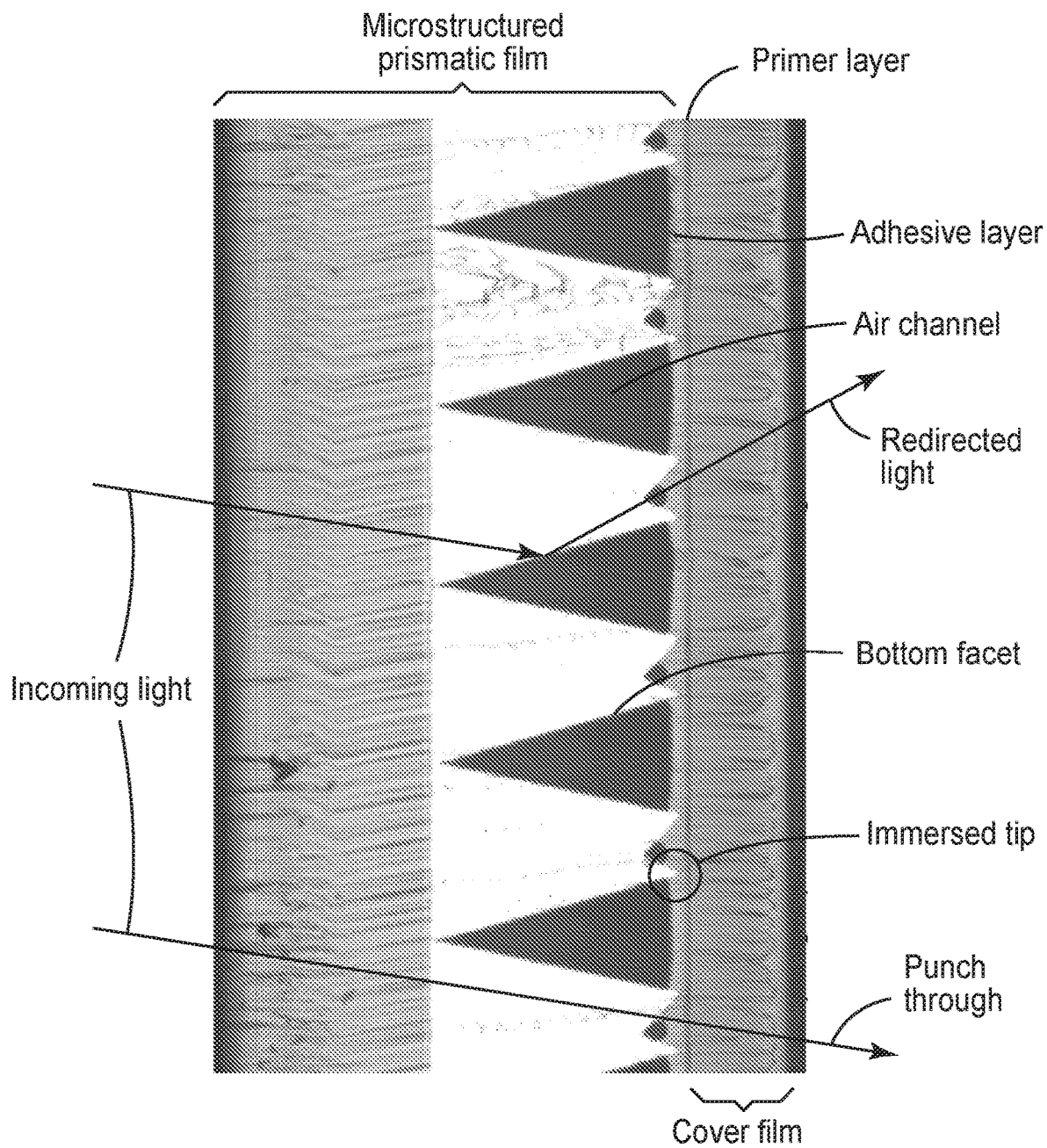
FIG. 13 is a photomicrograph of an embodiment of a light redirecting construction illustrating how light is redirected from a surface of a microstructured prismatic element with an air interface, but light impinging on a microstructured prismatic element at an adhesive interface is not redirected ("punch through").

Typically, adhesive flows along the facet depending on which side of the tip immersion point it lies. The direction of adhesive flow along the four facets of a two-peaked microstructured prismatic element is indicated by the arrows in FIG. 11. As mentioned above, adhesive flow along the facets leads to excessive adhesive along the facets and further degradation of the optical performance. The inventors have found that the magnitude of adhesive flow is proportional to the volume of adhesive displaced by a certain facet as shown in FIG. 12.

The inventors calculated the volume of adhesive displaced by a facet as a function of the area embedded within the adhesive. The embedded areas for the four facets shown in FIG. 12 are: m=1.22, n=7.05, o=3.62, and p=2.40). Based on these areas, the more gentle facets (n and o) are expected to displace more adhesive than steeper ones (m and p). Based on this model the inventors expect that the optical performance along those facets would be less favorable than along the steeper ones. The inventor's model has been verified using the structure shown in FIGS. 14(a) and (b).

Figure 14A:
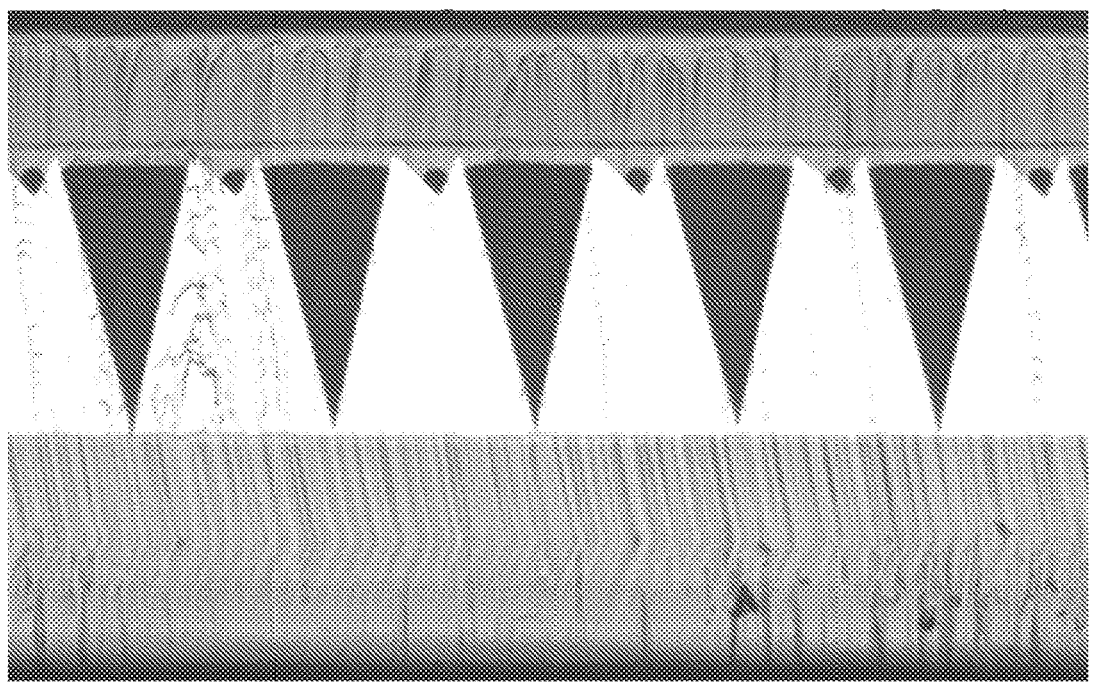
FIG. 14 shows (a) another view of the embodiment of FIG. 13 and (b) the adhesive displaced by the facets of the microstructured prismatic element.
Figure 14B:
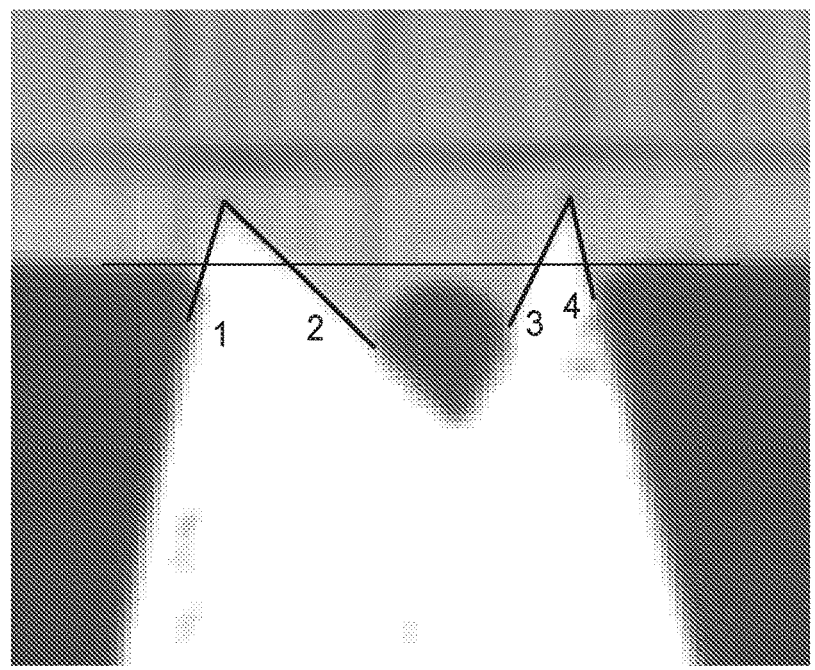

In this instance, the structure was embedded into a film with a 6 um thick adhesive. The degree of adhesive flow observed along each facet is proportional to the volume of adhesive displaced which is directly related to its slope angle. As shown in FIG. 14(b) more gently slopes (2, 3) exhibit significantly more adhesive flow (white areas) along their facets than steeper slopes (1, 4). In FIGS. 14(a) and (b), the dark or black areas surrounding the microstructured prismatic element represent air, whose presence around the microstructured prismatic element aids in the refraction of light characteristic of a daylight redirecting film. As can be seen in the figure, there is significant adhesive build up in the valley defined by slopes 2 and 3. Depending on the adhesive thickness this valley can be almost completely embedded in adhesive, which would result in an increase in punch through glare as shown in FIG. 15.

Figure 15:
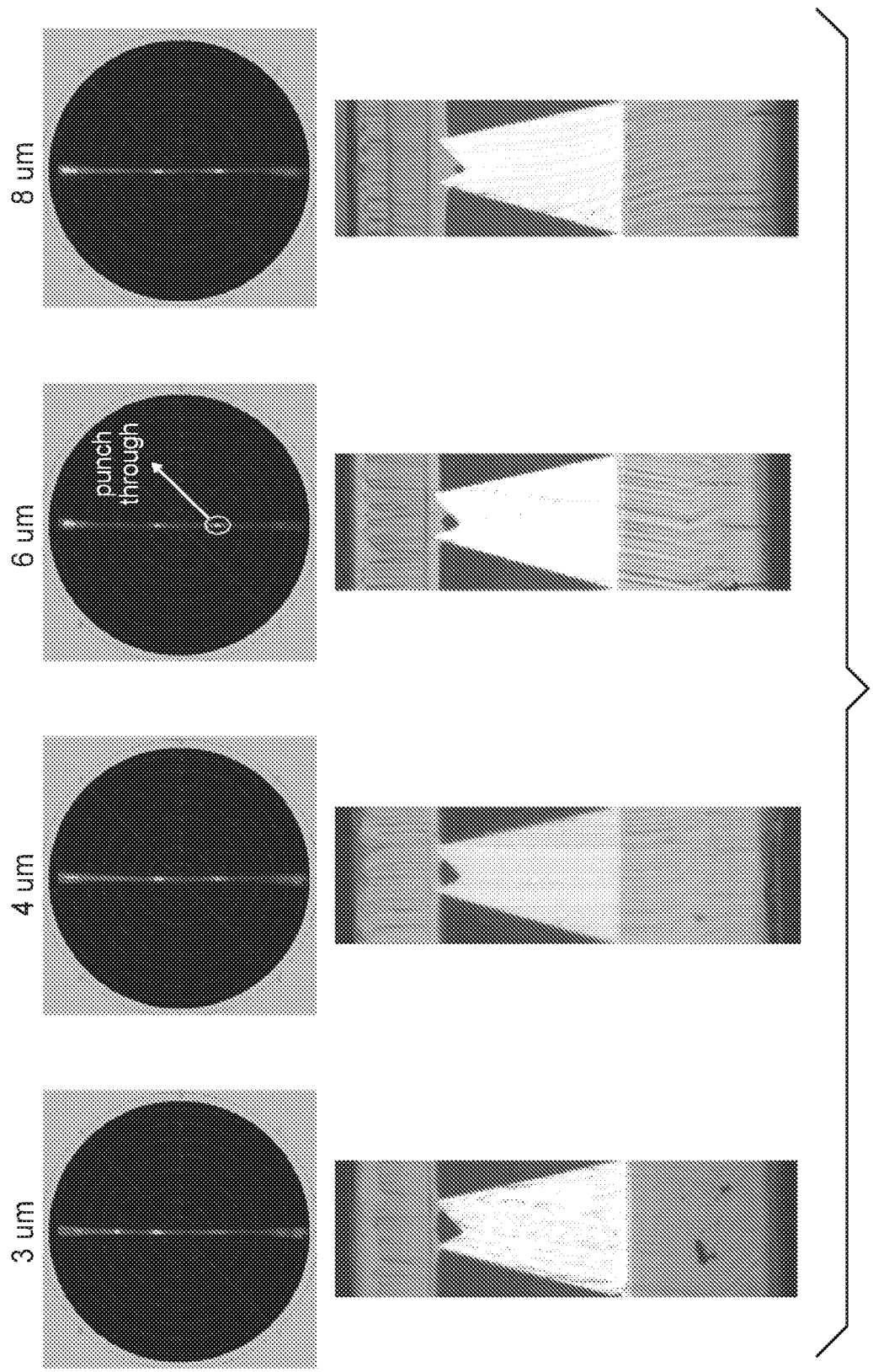
FIG. 15 shows photomicrographs illustrating the effect of adhesive thickness on the depth that microstructured prismatic elements are embedded in the adhesive and corresponding conoscopic plots illustrating increasing "punch through" with increasing adhesive thickness.
Figure 16:
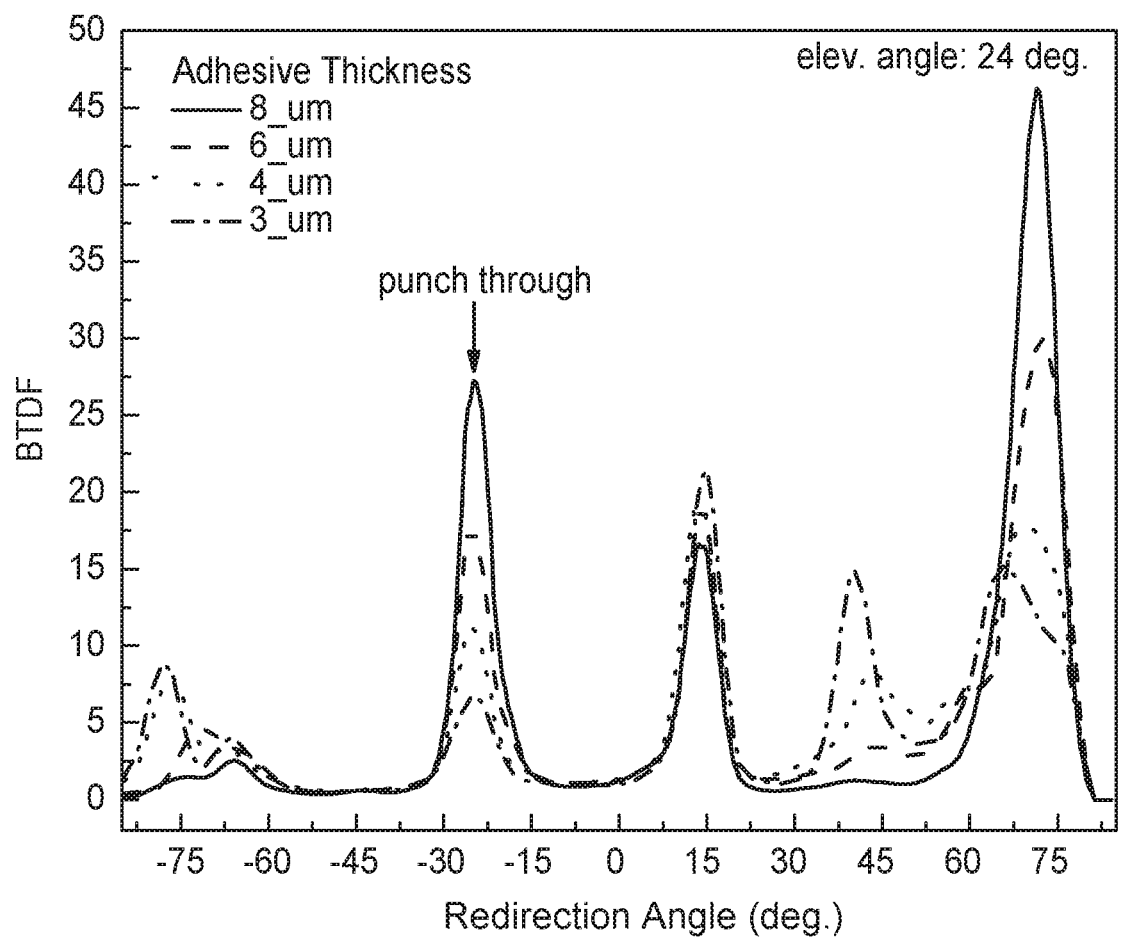
FIG. 16 illustrates the effect of microstructured prismatic element immersion in adhesive on "punch through".

Adhesive flow into the structure as a function of adhesive thickness ranging from 3 to 8 um is shown in FIG. 15. Using a 3 um thick adhesive, the structure is barely embedded in the adhesive, whereas with an 8 um thick adhesive, the valley is almost completely filled with adhesive. A corresponding increase in punch through is observed with increasing structure immersion as shown in the conoscopic plots of FIG. 15 and in FIG. 16.

Figure 17:
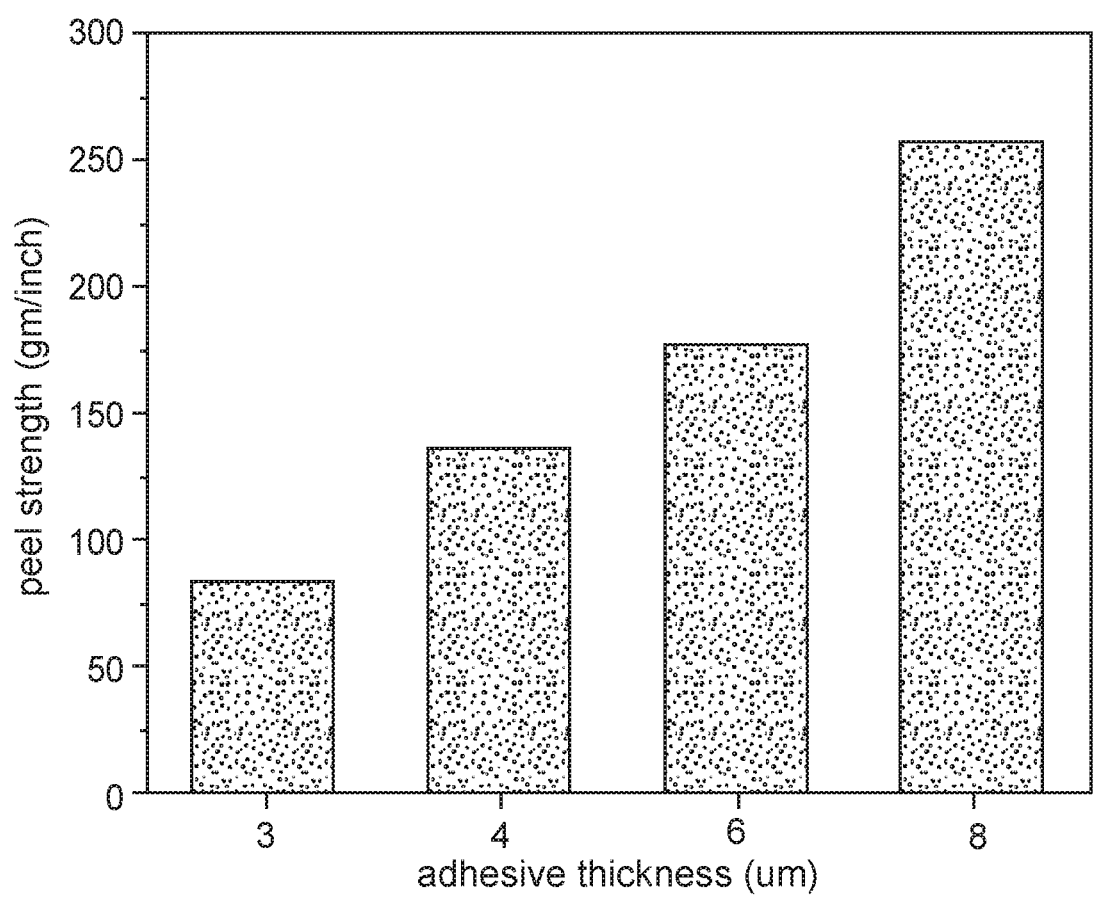
FIG. 17 illustrates the effect of microstructured prismatic element immersion in adhesive on peel strength.
Figure 20:
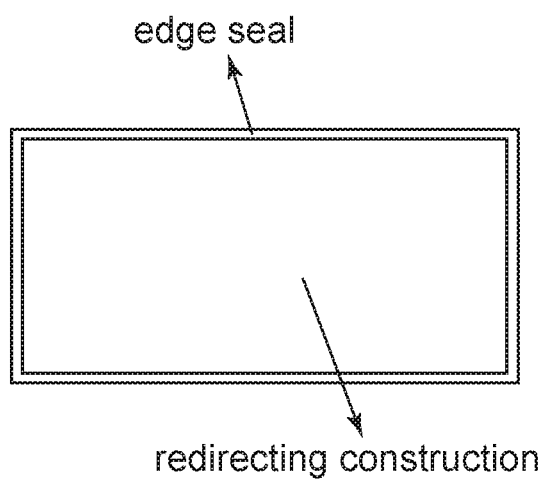
FIG. 20 shows a plano view of an embodiment of a light redirecting film construction that further comprises an edge seal.
Figure 21:
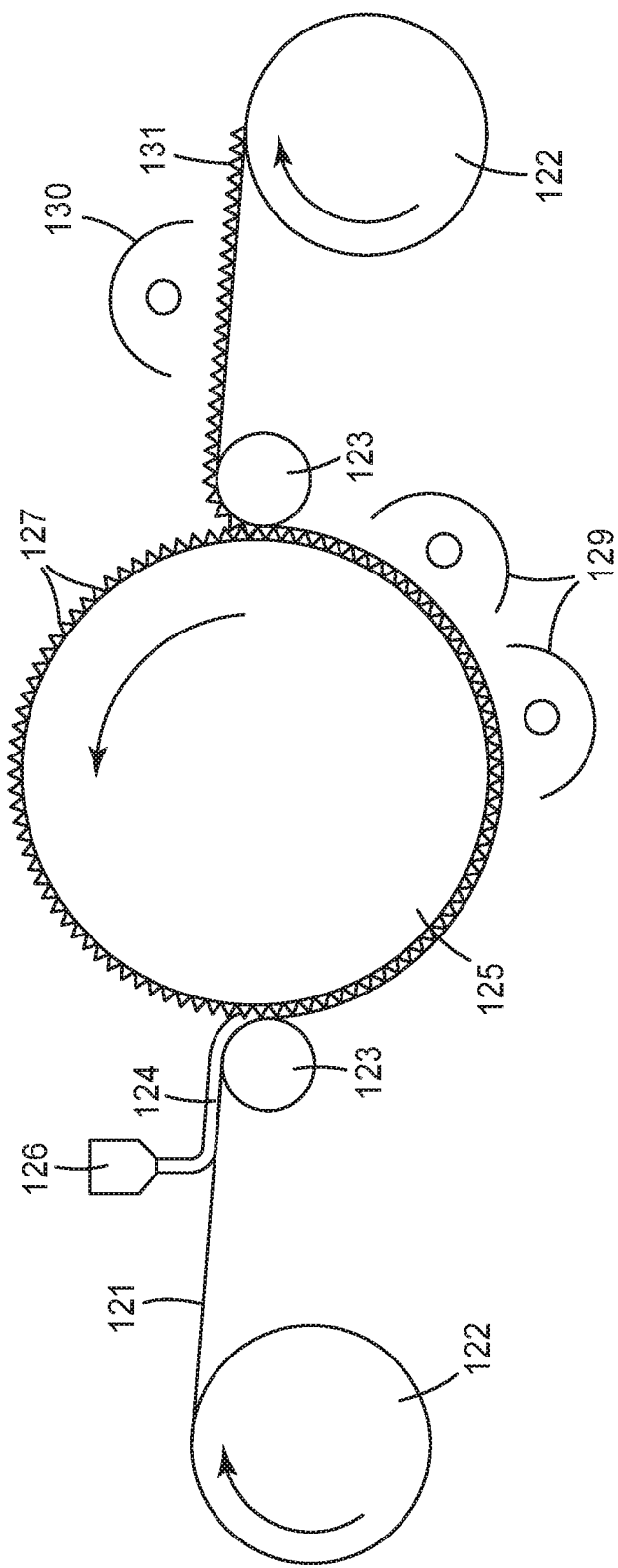
FIG. 21 illustrates a process that can be used to make a microstructured prismatic film.
Figure 22:
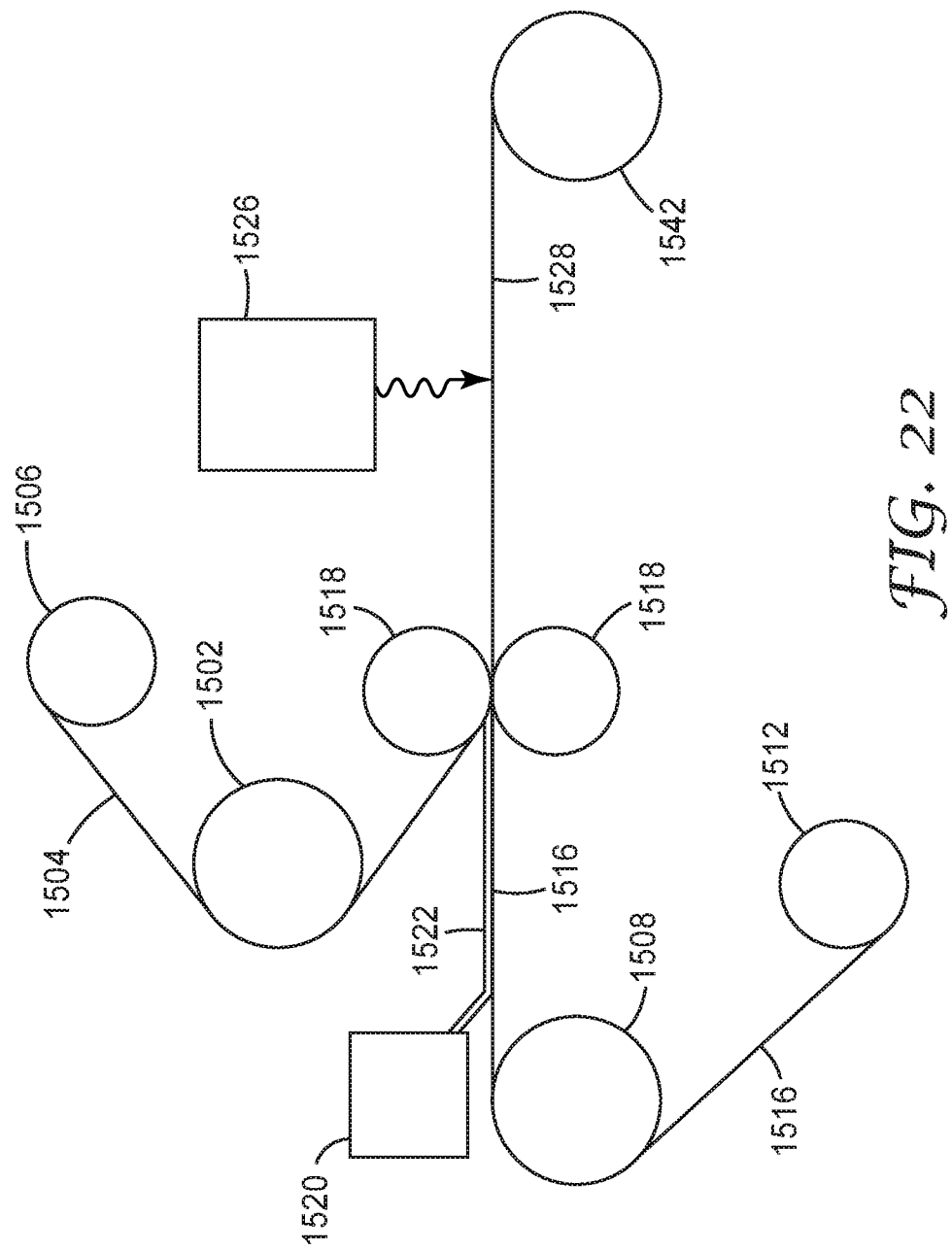
FIG. 22 illustrates a process that can be used to make a light redirecting film construction of the present invention.

However, while reducing tip immersion improves optics by reducing punch-through it comes at the price of reduced peel strength between the films in the laminate. Reduced peel strength can adversely affect durability of the film. The effect of tip immersion on peel force is shown in FIG. 17. As can be seen in that figure, the peel increases by more than a factor of three as the adhesive thickness increases from 3 um to 8 um.

Based on results from the inventor's model and observations from empirical testing, the inventors have determined certain guidelines regarding the design and orientation of microstructured prismatic elements suitable for lamination methods involving tip bonding when using asymmetric multi-peaked redirection microstructured prismatic elements:

1. It is preferable that only a single peak be immersed in the adhesive
2. It is preferable that the "steeper" peak (that is the peak with the smaller apex angle) should be immersed in the adhesive.

These concepts are illustrated in FIG. 18, which shows the base microstructured prismatic element from FIG. 14 in grey shading Two modified structures in darker shading are shown:
  a. A top (steeper) peak taller by 5 um
  b. Bottom (more gentle) peak taller by 5 um In both cases the structures were modeled to be immersed 4 um into the adhesive. The punch through glare was then calculated at various elevation angles as shown in FIG. 35

Figure 35:
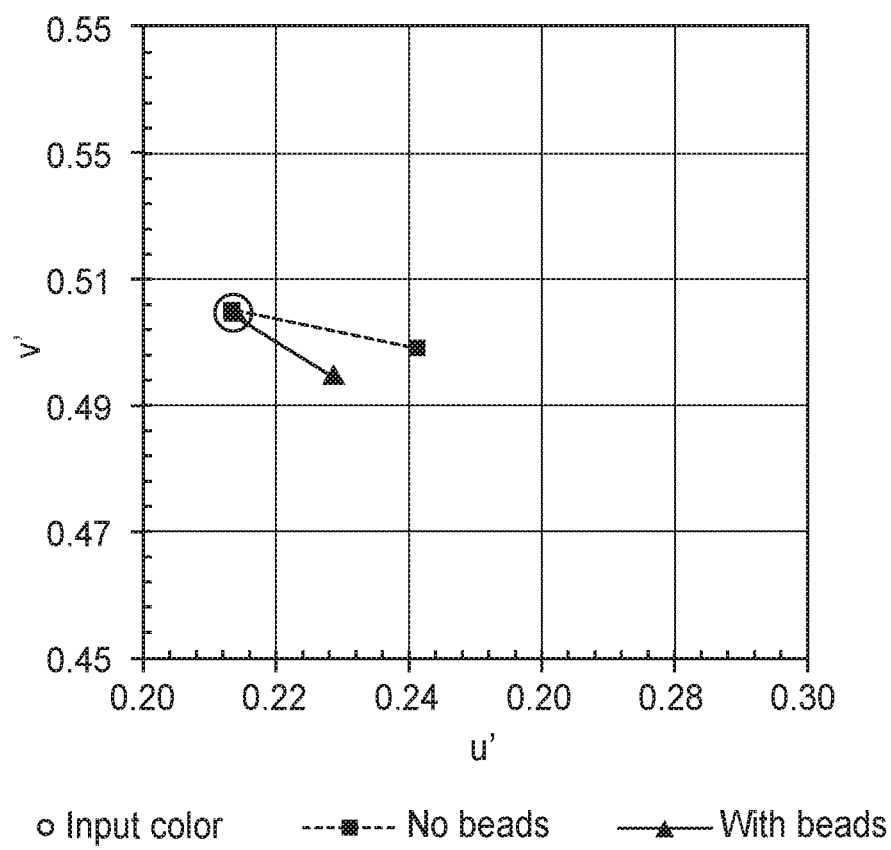
FIG. 35 shows the measured color coordinates of two embodiments of the invention relative to a window with no film installed. The length of the lines connecting each point to the original input color (circle) is equivalent to the color shift for each measurement.

As seen in FIG. 35, immersing the steeper, top peak results in significantly lower punch through glare at all of the elevation angles tested. Therefore, the inventors have determined additional guidelines to reduce punch through glare for the type of tip bonded film constructions of the present disclosure, concluding that it is preferable to:

a) Immerse the steepest peak in a multi-peaked asymmetrical redirecting microstructured prismatic element into the adhesive
  b) Avoid immersing the bottom peak into the adhesive. The inventors have found that the bottom facet is highly important in a redirecting microstructured prismatic element given that total internal reflection of the incoming light occurs at this surface. In the inventors view, the upper peaks/facets can be immersed into the adhesive with lesser impact on optical performance.

The inventors designed a steeper, upper (sun-facing, closer to ceiling) microstructured prismatic element with a peak 4 um taller than the lower, gentler peak. In a tip-bonded construction this peak would be partially immersed in the adhesive while the lower one would not be immersed. In this preferred orientation the impact of tip immersion on optical performance would be reduced. This is just one example of a microstructured prismatic element that could be used for tip-bonding film construction.

The type of construction proposed in this application may serve various purposes. For example, the assembly may protect the microstructured prismatic elements on the light redirecting film, the second film to which the light redirecting film is bonded may provide additional functionality, such as diffusion, infrared reflection, control of visible light transmission, etc., and the construction may also facilitate attachment of the light redirecting film to a mounting surface, such as a window.

Bonding the two films offers other significant advantages. For example, the resulting construction can have improved handling, rigidity, and provide the ability to attain thinner final constructions.

Basic Constructions

In some embodiments, the present disclosure is directed to film constructions as described below. In one embodiment, the disclosure is directed to a film construction comprising:
  a light redirecting film having a first major surface and a second major surface opposite the first major surface,
    wherein the first major surface of the light redirecting film comprises a plurality of microstructured prismatic elements,
    wherein one or more of the microstructured prismatic elements have a first peak and a second peak,
    wherein the first peak has a height H1 and the second peak has a height H2,
    wherein H3 is H1–H2, and H3 is equal or greater than 1 micron,
  an adhesive layer comprising an adhesive, wherein the adhesive layer has a first major surface and a second major surface opposite the first major surface,
  a cover film having a first major surface and a second major surface opposite the first major surface,
  wherein the first peak of one or more of the microstructured prismatic elements penetrates at least partially into the first major surface of the adhesive layer,
  wherein the second major surface of the adhesive layer is adjacent to the first major surface of the cover film.

In another embodiment, the disclosure is directed to a film construction comprising:
  a light redirecting film having a first major surface and a second major surface opposite the first major surface,
    wherein the first major surface of the light redirecting film comprises a plurality of microstructured prismatic elements,
    wherein one or more of the microstructured prismatic elements have a first peak and a second peak,
    wherein the first peak has a height H1 and the second peak has a height H2,
    wherein H3 is H1–H2, and H3 is from 1 microns to 8 microns,
  an adhesive layer comprising an adhesive, wherein the adhesive layer has a first major surface and a second major surface opposite the first major surface,
  a cover film having a first major surface and a second major surface opposite the first major surface,
  a diffusion layer,
  wherein when the film construction is in a vertical position, the first peak of the microstructured prismatic element is positionally located above the second peak,
  wherein the first peak has an apex angle B1 and the second peak has an apex angle B2, and wherein B1<B2,
  wherein the first peak of one or more of the microstructured prismatic elements penetrates at least partially into the first major surface of the adhesive layer,
  wherein the first major surface of the light redirecting film is bonded to the first major surface of the adhesive layer,
  wherein the second major surface of the adhesive layer is bonded to the first major surface of the cover film.

In another embodiment, the disclosure is directed to a film construction comprising:
  a light redirecting film having a first major surface and a second major surface opposite the first major surface,
    wherein the first major surface of the light redirecting film comprises a plurality of microstructured prismatic elements,
    wherein one or more of the microstructured prismatic elements have a first peak, a second peak, and a third peak,
    wherein the first peak has a height H1, the second peak has a height H2, the third peak has a height H3,
    wherein H1>H2 and H1>H3,
    wherein H4 is H1–H2, and H5 is H1–H3, and wherein H4 is from 2 microns to 10 microns and H5 is from 2 microns to 10 microns,
  an adhesive layer comprising an adhesive, wherein the adhesive layer has a first major surface and a second major surface opposite the first major surface,
  a cover film having a first major surface and a second major surface opposite the first major surface, wherein when the film construction is in a vertical position, the first peak of the microstructured prismatic element is: a) positionally located above the second peak, b) positionally located above the third peak, or positionally located above both the second peak and the third peak, wherein the first peak has an apex angle B1, the second peak has an apex angle B2, and the third peak has an apex angle B3, wherein B1<B2 and B1<B3, wherein the first peak of one or more of the microstructured prismatic elements penetrates at least partially into the first major surface of the adhesive layer, wherein the first major surface of the light redirecting film is bonded to the first major surface of the adhesive layer, wherein the second major surface of the adhesive layer is bonded to the first major surface of the cover film.

In another embodiment, the disclosure is directed to a film construction comprising:

a light redirecting film having a first major surface and a second major surface opposite the first major surface,
wherein the first major surface of the light redirecting film comprises a plurality of microstructured prismatic elements,
wherein one or more of the microstructured prismatic elements have three or more peaks,
wherein each of the peaks has a height,
wherein the first peak has a height larger than the height of each of the rest of the peaks,
wherein the difference between the height of the first peak and the height of each of the rest of the peaks is, independently from each other, from 2 microns to 10 microns, an adhesive layer comprising an adhesive, wherein the adhesive layer has a first major surface and a second major surface opposite the first major surface, a cover film having a first major surface and a second major surface opposite the first major surface, wherein when the film construction is in a vertical position, the first peak of the microstructured prismatic element is positionally located above at least one of the rest of the peaks, wherein each of the peaks has an apex angle, and wherein the apex angle of the first peak is smaller than the apex angle of each of the rest apex angles, wherein the first peak of one or more of the microstructured prismatic elements penetrates at least partially into the first major surface of the adhesive layer, wherein the first major surface of the light redirecting film is bonded to the first major surface of the adhesive layer, wherein the second major surface of the adhesive layer is bonded to the first major surface of the cover film.

Other embodiments of the film constructions of the present disclosure include the following:

A film construction comprising the following elements adjacent to each other in the specified order: (a) a diffusing layer, (b) a light redirecting film, (c) an adhesive layer, and (d) a cover film, A film construction comprising the following elements immediately adjacent to each other in the specified order: (a) a diffusing layer, (b) a light redirecting film, (c) an adhesive layer, and (d) a cover film, A film construction comprising the following elements adjacent to each other in the specified order: (a) a diffusing layer, (b) a light redirecting film, (c) an adhesive layer, (d) a cover film, (e) and a window film adhesive, A film construction comprising the following elements immediately adjacent to each other in the specified order: (a) a diffusing layer, (b) a light redirecting film, (c) an adhesive layer, (d) a cover film, (e) and a window film adhesive, A film construction comprising the following elements adjacent to each other in the specified order: (a) a diffusing layer, (b) a light redirecting film, (c) an adhesive layer, (d) a cover film, (e) a window film adhesive, and (f) a liner, A film construction comprising the following elements immediately adjacent to each other in the specified order: (a) a diffusing layer, (b) a light redirecting film, (c) an adhesive layer, (d) a cover film, (e) a window film adhesive, and (f) a liner, A film construction comprising the following elements adjacent to each other in the specified order: (a) a microreplicated diffuser coating, (b) a light redirecting film, (c) an adhesive layer, and (d) a cover film, A film construction comprising the following elements immediately adjacent to each other in the specified order: (a) a microreplicated diffuser coating, (b) a light redirecting film, (c) an adhesive layer, and (d) a cover film, A film construction comprising the following elements adjacent to each other in the specified order: (a) a microreplicated diffuser coating, (b) a light redirecting film, (c) an adhesive layer, (d) a cover film, (e) and a window film adhesive, A film construction comprising the following elements immediately adjacent to each other in the specified order: (a) a microreplicated diffuser coating, (b) a light redirecting film, (c) an adhesive layer, (d) a cover film, (e) and a window film adhesive, A film construction comprising the following elements adjacent to each other in the specified order: (a) a microreplicated diffuser coating, (b) a light redirecting film, (c) an adhesive layer, (d) a cover film, (e) a window film adhesive, and (f) a liner, A film construction comprising the following elements immediately adjacent to each other in the specified order: (a) a microreplicated diffuser coating, (b) a light redirecting film, (c) an adhesive layer, (d) a cover film, (e) a window film adhesive, and (f) a liner, A film construction comprising the following elements adjacent to each other in the specified order: (a) a coating with diffusing agents, (b) a light redirecting film, (c) an adhesive layer, and (d) a cover film, A film construction comprising the following elements immediately adjacent to each other in the specified order: (a) a coating with diffusing agents, (b) a light redirecting film, (c) an adhesive layer, and (d) a cover film, A film construction comprising the following elements adjacent to each other in the specified order: (a) a coating with diffusing agents, (b) a light redirecting film, (c) an adhesive layer, (d) a cover film, (e) and a window film adhesive, A film construction comprising the following elements immediately adjacent to each other in the specified order: (a) a coating with diffusing agents, (b) a light redirecting film, (c) an adhesive layer, (d) a cover film, (e) and a window film adhesive, A film construction comprising the following elements adjacent to each other in the specified order: (a) a coating with diffusing agents, (b) a light redirecting film, (c) an adhesive layer, (d) a cover film, (e) a window film adhesive, and (f) a liner, A film construction comprising the following elements immediately adjacent to each other in the specified order: (a) a coating with diffusing agents, (b) a light redirecting film, (c) an adhesive layer, (d) a cover film, (e) a window film adhesive, and (f) a liner, A film construction comprising the following elements adjacent to each other in the specified order: (a) a diffusing layer, (b) a light redirecting film, (c) an adhesive layer with diffusing agents, and (d) a cover film, A film construction comprising the following elements immediately adjacent to each other in the specified order: (a) a diffusing layer, (b) a light redirecting film, (c) an adhesive layer with diffusing agents, and (d) a cover film, A film construction comprising the following elements adjacent to each other in the specified order: (a) a diffusing layer, (b) a light redirecting film, (c) an adhesive layer with diffusing agents, (d) a cover film, (e) and a window film adhesive, A film construction comprising the following elements immediately adjacent to each other in the specified order: (a) a diffusing layer, (b) a light redirecting film, (c) an adhesive layer with diffusing agents, (d) a cover film, (e) and a window film adhesive, A film construction comprising the following elements adjacent to each other in the specified order: (a) a diffusing layer, (b) a light redirecting film, (c) an adhesive layer with diffusing agents, (d) a cover film, (e) a window film adhesive, and (f) a liner, A film construction comprising the following elements immediately adjacent to each other in the specified order: (a) a diffusing layer, (b) a light redirecting film, (c) an adhesive layer with diffusing agents, (d) a cover film, (e) a window film adhesive, and (f) a liner, A film construction comprising the following elements adjacent to each other in the specified order: (a) a microreplicated diffuser coating, (b) a light redirecting film, (c) an adhesive layer with diffusing agents, and (d) a cover film, A film construction comprising the following elements immediately adjacent to each other in the specified order: (a) a microreplicated diffuser coating, (b) a light redirecting film, (c) an adhesive layer with diffusing agents, and (d) a cover film, A film construction comprising the following elements adjacent to each other in the specified order: (a) a microreplicated diffuser coating, (b) a light redirecting film, (c) an adhesive layer with diffusing agents, (d) a cover film, (e) and a window film adhesive, A film construction comprising the following elements immediately adjacent to each other in the specified order: (a) a microreplicated diffuser coating, (b) a light redirecting film, (c) an adhesive layer with diffusing agents, (d) a cover film, (e) and a window film adhesive, A film construction comprising the following elements adjacent to each other in the specified order: (a) a microreplicated diffuser coating, (b) a light redirecting film, (c) an adhesive layer with diffusing agents, (d) a cover film, (e) a window film adhesive, and (f) a liner, A film construction comprising the following elements immediately adjacent to each other in the specified order: (a) a microreplicated diffuser coating, (b) a light redirecting film, (c) an adhesive layer with diffusing agents, (d) a cover film, (e) a window film adhesive, and (f) a liner, A film construction comprising the following elements adjacent to each other in the specified order: (a) a coating with diffusing agents, (b) a light redirecting film, (c) an adhesive layer with diffusing agents, and (d) a cover film, A film construction comprising the following elements immediately adjacent to each other in the specified order: (a) a coating with diffusing agents, (b) a light redirecting film, (c) an adhesive layer with diffusing agents, and (d) a cover film, A film construction comprising the following elements adjacent to each other in the specified order: (a) a coating with diffusing agents, (b) a light redirecting film, (c) an adhesive layer with diffusing agents, (d) a cover film, (e) and a window film adhesive, A film construction comprising the following elements immediately adjacent to each other in the specified order: (a) a coating with diffusing agents, (b) a light redirecting film, (c) an adhesive layer with diffusing agents, (d) a cover film, (e) and a window film adhesive, A film construction comprising the following elements adjacent to each other in the specified order: (a) a coating with diffusing agents, (b) a light redirecting film, (c) an adhesive layer with diffusing agents, (d) a cover film, (e) a window film adhesive, and (f) a liner, A film construction comprising the following elements immediately adjacent to each other in the specified order: (a) a coating with diffusing agents, (b) a light redirecting film, (c) an adhesive layer with diffusing agents, (d) a cover film, (e) a window film adhesive, and (f) a liner, A film construction comprising the following elements adjacent to each other in the specified order: (a) a light redirecting film with diffusing agents, (b) an adhesive layer, and (c) a cover film, A film construction comprising the following elements immediately adjacent to each other in the specified order: (a) a light redirecting film with diffusing agents, (b) an adhesive layer, and (c) a cover film, A film construction comprising the following elements adjacent to each other in the specified order: (a) a light redirecting film with diffusing agents, (b) an adhesive layer, (c) a cover film, (d) and a window film adhesive, A film construction comprising the following elements immediately adjacent to each other in the specified order: (a) a light redirecting film with diffusing agents, (b) an adhesive layer, (c) a cover film, (d) and a window film adhesive, A film construction comprising the following elements adjacent to each other in the specified order: (a) a light redirecting film with diffusing agents, (b) an adhesive layer, (c) a cover film, (d) a window film adhesive, and (e) a liner, A film construction comprising the following elements immediately adjacent to each other in the specified order: (a) a light redirecting film with diffusing agents, (b) an adhesive layer, (c) a cover film, (d) a window film adhesive, and (e) a liner, A film construction comprising the following elements adjacent to each other in the specified order: (a) a light redirecting film with diffusing agents, (b) an adhesive layer with diffusing agents, and (c) a cover film, A film construction comprising the following elements immediately adjacent to each other in the specified order: (a) a light redirecting film with diffusing agents, (b) an adhesive layer with diffusing agents, and (c) a cover film, A film construction comprising the following elements adjacent to each other in the specified order: (a) a light redirecting film with diffusing agents, (b) an adhesive layer with diffusing agents, (c) a cover film, (d) and a window film adhesive, A film construction comprising the following elements immediately adjacent to each other in the specified order: (a) a light redirecting film with diffusing agents, (b) an adhesive layer with diffusing agents, (c) a cover film, (d) and a window film adhesive, A film construction comprising the following elements adjacent to each other in the specified order: (a) a light redirecting film with diffusing agents, (b) an adhesive layer with diffusing agents, (c) a cover film, (d) a window film adhesive, and (e) a liner, and A film construction comprising the following elements immediately adjacent to each other in the specified order: (a) a light redirecting film with diffusing agents, (b) an adhesive layer with diffusing agents, (c) a cover film, (d) a window film adhesive, and (e) a liner.

Light Redirecting Films

The first optical film may be any suitable film that has high optical transparency in the visible light region of the spectrum. The first optical film may be a single layer film or a multilayer film construction. The first optical film has a first major surface and a second major surface. The first major surface comprises a microstructured surface. This microstructured surface comprises an ordered arrangement of a plurality of asymmetrical multi-peaked microstructured prismatic elements.

A variety of articles have been developed to redirect sunlight to provide illumination within rooms. For example, the following patents and patent applications describe various light redirecting films and light redirecting microstructures: US Patent Publication No. 2008/0291541, titled "Light Redirecting Solar Control Film", filed May 23, 2007 (Padiyath et al.) and U.S. Patent Applications Nos. 61/287,360, titled "Light Redirecting Constructions" filed Dec. 17, 2009 (Padiyath et al), and 61/287,354, titled "Light Redirecting Film Laminate" filed Dec. 17, 2009 (Padiyath et al.); PCT Application Publication No. WO 2012/134787, titled "Hybrid Light Redirecting and Light Diffusing Constructions", filed Mar. 12, 2012 (Padiyath et al.), U.S. Pat. No. 5,551,042, titled "Structured Films and Use Thereof for Daylight Illumination", issued Aug. 27, 1996 (Lea, et al.), US Patent Publication No. 2014/0211331, titled "Multiple Sequenced Daylight Redirecting Layers", filed Mar. 27, 2014 (Padiyath et al.), PCT application titled "Lighting sheet, lighting panel, roll-up lighting screen, and method for manufacturing lighting sheet" published as WO2014147793A1, U.S. Pat. No. 8,040,610 titled "Light Guiding Film", issued Oct. 18, 2011 (Ko, et al.), U.S. Pat. No. 8,107,164 titled "Window System and Light Guiding Film Therein", issued Jan. 31, 2012 (Tsai), U.S. Pat. No. 8,664,521 titled" "Window System and Light Guiding Film Therein", issued Mar. 4, 2014 (Tsai et al.), US Patent Publication No. 2014/0198390, titled "Dual-sided Daylight Redirecting Film", filed Mar. 27, 2014 (Padiyath, et al.), US Patent Publication No. 2008/0292820, titled "Light Diffusing Solar Control Film", filed May 23, 2007 (Padiyath, et al.), U.S. Pat. No. 6,456,437, titled "Optical Sheets Suitable for Spreading Light", issued Sep. 24, 2002 (Lea, et al.), PCT application titled "Room-Facing Light Redirecting Film with Reduced Glare," published as WO 2016/064667 and PCT application titled "Sun-Facing Light Redirecting Film with Reduced Glare," published as WO 2016/064621. The light redirecting films and light redirecting microstructures disclosed in the patents and patent applications in this paragraph are herein incorporated by reference. In general, any light redirecting film or layer, including those mentioned in this paragraph, and others known in the art, can be used in the constructions of this disclosure.

In certain embodiments, although the design of a given microstructured prismatic element shows sharp peaks (sharp apex angles), due to manufacturing effects, the actual manufactured microstructured prismatic element may have rounded peaks, as can be seen in FIGS. 14 and 15.

Diffusive Elements

While one of the main incentives for using light redirecting films is energy savings, visual comfort needs to be taken into account. As shown in FIG. 1, while most of the sunlight is directed upwards a fraction may go downwards. This downward light can cause glare for the occupants. Because sunlight is highly collimated with about 0.5 degree spread and appears as a solar disk, sometimes a light redirecting film spreads that light vertically to form a solar column.

Both the total fraction of downward directed light and brightness of the solar column contribute to glare (visual discomfort). The brightness of the solar column depends on its angular spread. One solution the inventors have found to reduce glare is to introduce one or more diffuser layers in the optical path. The diffuser helps to spread out the solar column. In addition, the diffusive element provides more uniform ceiling illumination by diffusing the upward directed light. The inventors have found that the use of the diffuser layer reduces glare and the visibility of the solar column significantly. The diffuser layer can also contribute other beneficial properties such as the reduction (or mitigation) optical artifacts such as moiré or color and the diffusion can also help hide cosmetic defects.

In some embodiments, diffusion may be accomplished by creating surface diffusers, bulk diffusers, and/or embedded diffusers. A diffusive element, also called a diffuser or a diffusing layer in this disclosure, may be a separate layer or coating having diffusive properties with respect to visible light or a surface treatment on a layer of the film constructions of the present disclosure that provides diffusive properties to the treated surface (e.g., a surface diffuser). For example, the diffusive element may be a separate layer (e.g., a bulk diffuser) that diffuses visible light and that is either coextruded, coated, or laminated to another layer of the film constructions of the present disclosure.

In some embodiments, bulk diffusion is accomplished by adding a diffusing agent, such as micro beads or nanoparticles to the coating or layer. In other embodiments, the diffusing agent is chosen from micro beads having average size from 0.1 microns to 100 microns, from 0.5 microns to 50 microns, 0.7 microns to 20 microns, and 1 micron to 5 microns.

A variety of diffusers have been developed and are known in the art. For example, the following patents and patent applications describe various type of diffusers: U.S. Patent Publication No. 2014/0104689, titled "Hybrid Light Redirecting and Light Diffusing Constructions, filed Dec. 5, 2013, (Padiyath, et al.); PCT Application Publication No. WO 2014/093119, titled "Brightness Enhancing Film with Embedded Diffuser", filed Dec. 5, 2013, (Boyd et al.); U.S. Pat. No. 6,288,172, titled "Light Diffusing Adhesive", issued Sep. 11, 2001 (Goetz, et al.); PCT Application Publication No. WO 2013/158475, titled "Brightness Enhancement Film with Substantially Non-imaging Embedded Diffuser", filed Apr. 12, 2013, (Boyd, et al.), US 2015/0293272 (Pham), US 2013/0236697 (Walker), PCT Application Publication No. WO2015/050750 titled "Microstructured diffuser comprising first microstructured layer and coating, optical stacks, and method", filed Sep. 24, 2014 (Naismith et al.), U.S. Patent Publication No. US20150293272 titled "Optical diffusing films and methods of making same", filed Nov. 19, 2013 (Pham, et al.). The diffusers disclosed in the patents and patent applications in this paragraph are herein incorporated by reference. In general, any diffuser or diffusive element, including those mentioned in this paragraph, and others known in the art, can be used in the constructions of this disclosure.

One option to combine the effect of a diffuser with a light redirecting film is to adhere the light redirecting film to the window and mount the diffuser to an added pane. The present disclosure presents a solution where the diffuser layer and the light redirecting film in a single construction.

In some embodiments, the diffusing properties can lie within the adhesive, the window film adhesive, or any of the substrates that may be part of the light redirecting construction. In certain embodiments, the diffusing properties of any of the elements mentioned in the preceding sentence may be modified by introducing surface roughness, bulk diffusion, or using embedded diffusers. In other embodiments, the diffusing properties In certain embodiments, the surface of a layer part of a light redirecting construction can be treated in such a manner that the layer diffuses visible light. Surface roughness to create diffusing properties in a layer can be accomplished by imparting a pattern on the surface of a layer that increases the angular spread of input light in a desired manner. Some methods used to impart such a pattern include embossing, replication, and coating.

In other embodiments, bulk diffusion can be accomplished by adding one or more diffusing agents to the window film adhesive. Diffusing agents can comprise particles or beads. Examples of diffusing agents include: polymeric or inorganic particles, spherical beads, and/or voids included in a layer.

As mentioned above, in some embodiments, the diffusive element comprises inorganic oxide nanoparticles, such as zirconia or silica nanoparticles. The size of the nanoparticles is chosen to avoid significant visible light back-scattering. In some embodiments, it may be desirable to employ a mixture of inorganic oxide particle types to obtain a specific optical or material property and/or to lower total composition cost.

In other embodiments, the diffusive element comprises surface modified colloidal nanoparticles, which can be inorganic oxide particles having a (e.g. unassociated) primary particle size or associated particle size of at least 1 nm or at least 5 nm. The primary or associated particle size is generally less than 100 nm, 75 nm, or 50 nm. Typically the primary or associated particle size is less than 40 nm, 30 nm, or 20 nm. It is preferred that the nanoparticles be unassociated. The nanoparticles measurements can be based on transmission electron miscroscopy (TEM). Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

In other embodiments, the diffusive element comprises embedded particles or beads. Particles typically have an average size that is greater than about 0.25 microns (250 nanometers), or greater than about 0.5 microns, or greater than about 0.75 microns, or greater than about 1 micron, or greater than about 1.25 microns, or greater than about 1.5 microns, or greater than about 1.75 microns, or greater than about 2 microns. Smaller particles are typical for diffusive elements that are relatively thin.

However, for embodiments wherein the diffusive element is thicker, the particles may have an average size up to 5 microns or 10 microns. The concentration of particles may range from at least 1 or 2 wt-% to about 5, 6, 7, 8, 9, or 10 wt-% or greater.

The diffusive elements disclosed in PCT Application Publication No. WO 2015/020750 are incorporated herein by reference.

In yet other embodiments, a substrate or a layer part of a light redirecting construction can contain embedded diffusers. In one embodiment, an embedded diffuser layer can be formed in between the light redirecting layer and the substrate. This layer may consist of a matrix with diffusing agents. Alternatively the layer may be a surface diffuser layer consisting of a material with a refractive index sufficiently different from the light redirecting layer to obtain a desired level of diffusion. In other embodiments, various types of diffusers may also be used in combination.

Figure 30:
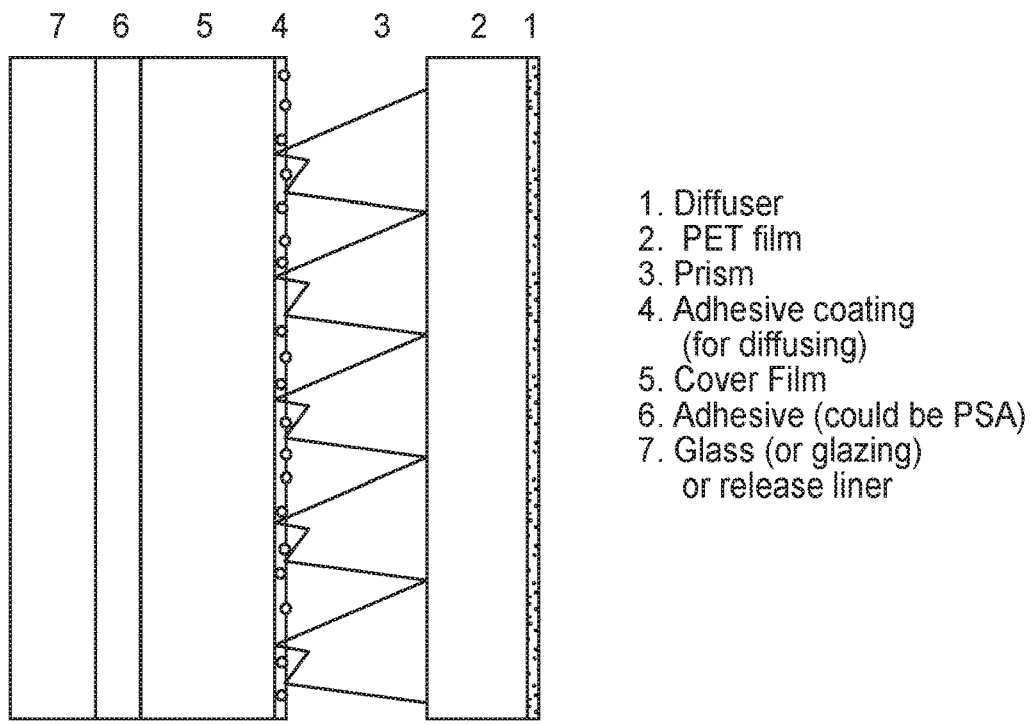
FIG. 30 shows another embodiment of a light redirecting film construction.
Figure 31:
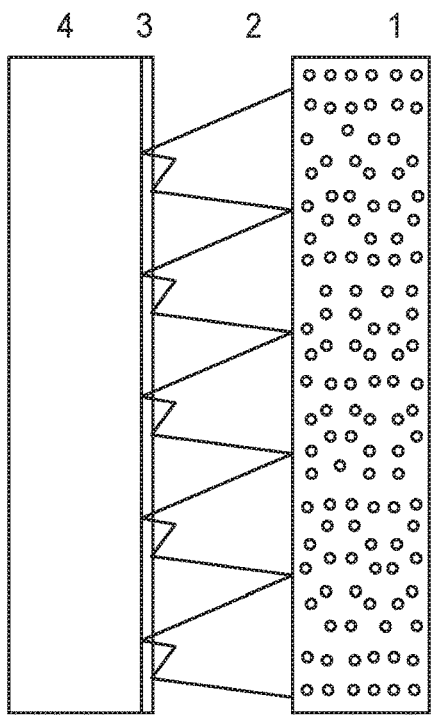
FIG. 31 shows another embodiment of a light redirecting film construction.
Figure 32:
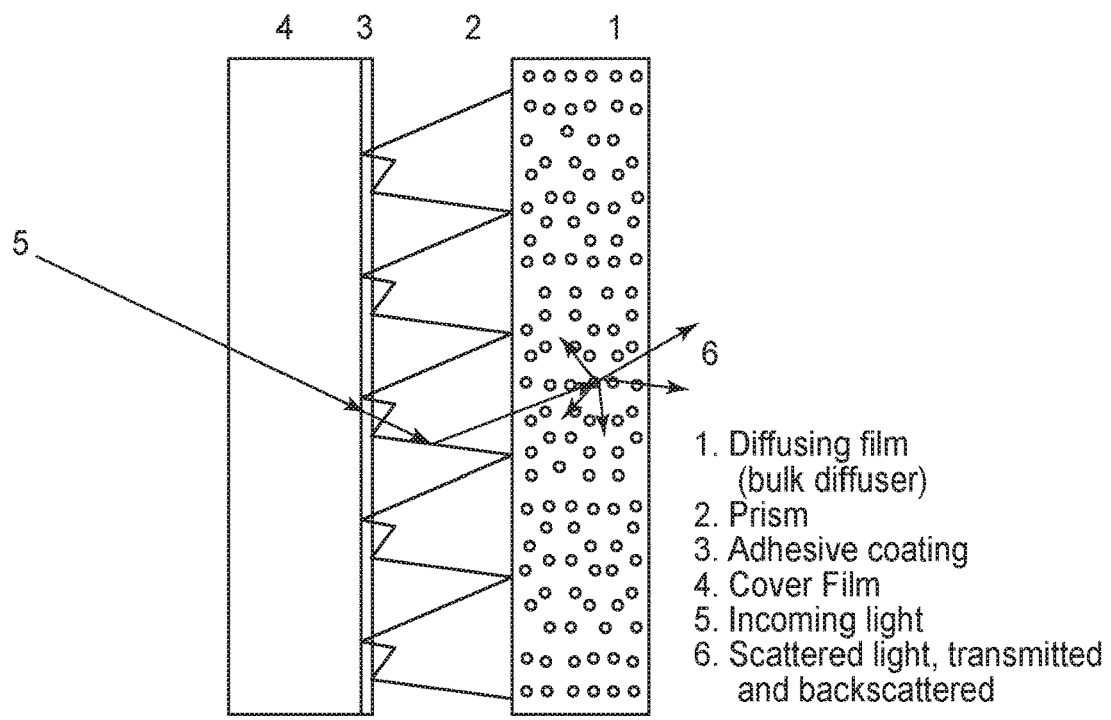
FIG. 32 shows another embodiment of a light redirecting film construction.

Diffusing agents (such as beads or particles) can be incorporated into a diffuser layer (e.g., a diffuser coating), a light redirecting substrate, the microstructured prismatic element, the adhesive layer, the cover film, or the window film adhesive, which correspond to layers 1,2,3,4,5 or 6 as shown in FIG. 30.

The beads (or particles) incorporated into a diffuser layer or the adhesive layer (layers 1 or 4 in FIG. 30) can be in the form of a thin film or a coating, such as a hardcoat or a layer comprising an adhesive. However, the diffuser layer can also be laminated to the light redirecting substrate. A diffusing coating can be prepared by adding beads (or particles), such as described in U.S. Pat. Nos. 6,778,240 and 7,190,525, which are incorporated herein by reference. In one embodiment, clear beads with appropriate refractive index, for example PMMA beads are used in an acrylate adhesive. These Index-matched beads incorporated into diffuser layer or the adhesive layer can modify the surface texture resulting in a surface diffuser. This thin layer can be described a "surface" diffuser.

Beads incorporated into the bulk of the light redirecting substrate, the microstructured prismatic element, the cover film, or the window film adhesive (layers 2,3,5, or 6 in FIG. 30) which have different refractive index can be scattering. Organic beads; for example polystyrene or inorganic particles, for example, TiO2 can be used. The different in refractive index in the bulk of the film can be described as a "bulk" diffuser. In general, bulk diffusers have lower light transmission than surface diffusers due to multiple scatterings and back-scattering of light.

In another embodiment, comprises fabricating a microtextured layer on the plano surface of light redirecting substrate (layer 2 of FIG. 29). In this configuration, element 1 represents the microtextured surface. This may be done, for example, by creating microstructures on the surface. Alternatively, element 1 can comprise a microtextured film that is laminated to element 2.

Cover Film

The film constructions of the present disclosure also comprise a second film, or cover film. In some embodiments, the cover film is an optical film. In general, the cover film has a first major surface and a second major surface. Typically, the second major surface of the second optical film is coated with an adhesive that makes contact with and is bonded to at least some of the microstructures on the surface of the first optical film.

The second film may be the made of the same material or materials as the first optical film, or it may be different. In some embodiments, the second film protects the microstructured surface and prevents the microstructured prismatic elements from becoming damaged, dirty or otherwise rendered incapable of redirecting light.

Besides being the protective layer for the microstructured surface, the second film can also provide additional functionality to the light redirecting laminate. For example, the second optical film can be a multilayer film that can reflect infrared light. In this way the light redirecting film construction can also help to keep the undesirable infrared light (heat) out of the building while allowing the desirable visible light into the building. Examples of suitable multilayer films useful as the cover film, include those disclosed, for example, in U.S. Pat. Nos. 6,049,419, 5,223,465, 5,882,774, 6,049,419, RE 34,605, 5,579,162 and 5,360,659, which films are incorporated herein by reference as possible cover films useful in the film constructions of the present invention.

In some embodiments, the cover film is a multilayer film in which the alternating polymeric layers cooperate to reflect infrared light. In some embodiments, at least one of the polymeric layers is a birefringent polymer layer.

In some embodiments, when the first major surface of the second optical film is exposed to the inside of the room, it may be desirable to have additional coatings on the exposed major surface of the cover film. For example, the surface may contain a protective coating such as a hardcoat to prevent the surface from scratches and marks as well as to protect the surface from damage from surface cleaners, or to make the surface graffiti-resistant or easier to clean. Examples of suitable coatings include, for example, hardcoats, anti-scratch coatings, low surface energy coatings or easy clean coatings.

Typically, the second optical film or second multilayer optical film, is prepared from polymeric materials that permit the film to be optically clear. Examples of suitable polymeric materials include, for example, polyolefins such as polyethylene and polypropylene, polyvinyl chloride, polyesters such as polyethylene terephthalate, polyamides, polyurethanes, cellulose acetate, ethyl cellulose, polyacrylates, polycarbonates, silicones, and combinations or blends thereof.

The optical film may contain other components besides the polymeric material, such as fillers, stabilizers, antioxidants, plasticizers and the like. In some embodiments, the optical film may comprise a stabilizer such as a UV absorber (UVA).

Adhesives

Typically, the second major surface of the second film (cover film) contacts the adhesive layer, which in turn contacts at least the tops of the refractive microstructured prismatic elements. Bonding occurs at the areas of contact between the second film and the adhesive. Similarly, there is bonding between the tops of the microstructured prismatic elements and the adhesive.

In certain embodiments, this bonding may take a variety of forms useful for laminating together two polymeric units, including adhesive bonding, heat lamination, ultrasonic welding and the like. For example, in one embodiment, the second film could be heated to soften the film and the film contacted to the microstructured surface of the first optical film. The heated film, upon cooling, forms bonds to the contacted portions of the micro structured layer of the first optical film. Similarly, the second film could be dry laminated to the microstructured surface of the first optical film and then heat, either directly or indirectly, could be applied to produce the laminated article. Alternatively, an ultrasonic welder could be applied to the dry laminate construction. However, typically, adhesive bonding is used. When adhesive bonding is used, either a heat activated adhesive or a pressure sensitive adhesive can be used. Generally, pressure sensitive adhesives are used, especially the optically clear pressure sensitive adhesives.

To effect the adhesive bonding, the adhesive may be applied either to the microstructured surface of the first optical film, or to the second major surface of the second optical film. Typically, the adhesive is applied to the second major surface of the second optical film. The applied adhesive coating may be continuous or discontinuous.

The adhesive coating may be applied through any of a variety of coating techniques including knife coating, roll coating, gravure coating, rod coating, curtain coating, air knife coating, or a printing technique such as screen printing or inkjet printing. The adhesive may be applied as aqueous or solvent based (e.g., solution, dispersion, suspension), or 100% solids composition. If aqueous or solvent-based adhesive compositions are used, typically, the coating is dried prior to lamination by air drying or at elevated temperatures using, for example, an oven such as a forced air oven. The adhesive coated cover film can then be laminated to the microstructured surface of the first optical film. The lamination process should be well controlled to provide uniform and even contact on the tips of the microstructured prisms described above.

In certain embodiments, the adhesives used to laminate the two films in constructions according to this disclosure, have the following characteristics:

a) the adhesive (after drying) flows into the microstructured prismatic elements under suitable conditions, for example those used to laminate the two films. Suitable conditions, such as lamination, typically include heat, pressure, and, if performed in roll-to-roll operations, a certain line speed. The flow properties and thickness of the adhesive relative to the microstructured prismatic elements may be adjusted as needed. Adhesive properties that could influence flow include molecular weight, cross link density, and additives, such as plasticizers;

b) the adhesive is resistant to "creep" under the conditions used to store, apply, and use the product; and c) the adhesive is durable under UV exposure and thermal conditions encountered. In some embodiments, UV stabilizers, such as a UV absorber (UVA) or hindered amine light stabilizer (HALS), may be added to the adhesive.

In certain embodiments, the adhesive in the adhesive layer is chosen from a pressure sensitive adhesive, a thermoset adhesive, hot melt adhesive, and a UV-curable adhesive.

Suitable adhesives can be or include any optical adhesive that may be desirable in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly(meth)acrylates or silicones.

As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

In some cases, an optical adhesive layer can be or include a structural adhesive. Generally, useful structural adhesives contain reactive materials that cure to form a strong adhesive bond. The structural adhesive may cure spontaneously upon mixing (such as a 2 part epoxy adhesive) or upon exposure to air (such as a cyanoacrylate adhesive) or curing may be effected by the application of heat or radiation (such as UV light). Examples of suitable structural adhesives include epoxies, acrylates, cyanoacrylates, urethanes, and the like.

Other exemplary pressure sensitive adhesives for use in the articles of the present disclosure include crosslinked tackified acrylic pressure-sensitive adhesives. Other pressure sensitive adhesives such as blends of natural or synthetic rubber and resin, silicone or other polymer systems, with or without additives can be used in the film constructions of this disclosure.

Acrylic Acid and Meth(acrylic) Acid Esters: The acrylic esters are present at ranges of from about 65 to about 99 parts by weight, for example from about 78 to about 98 parts by weight, and in some embodiments from about 90 to about 98 parts by weight. Useful acrylic esters include at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylates or methacrylate esters generally have, as homopolymers, glass transition temperatures below about −25° C. A higher amount of this monomer relative to the other comonomers affords the PSA higher tack at low temperatures.

Examples of acrylate or methacrylate ester monomers include, but are not limited to, those selected from the group consisting of n-butyl acrylate (BA), n-butyl methacrylate, isobutyl acrylate, 2-methyl butyl acrylate, 2-ethylhexyl acrilate, n-octyl acrylate, isooctyl acrylate (IOA), isooctyl methacrylate, isononyl acrylate, isodecyl acrylate, and mixtures thereof.

In some embodiments, the acrylates include those selected from the group consisting of isooctyl acrylate, n-butyl acrylate, 2-methyl butyl acrylate, 2-ethylhexyl acrylate, and mixtures thereof.

Polar Monomers: Low levels of (typically about 1 to about 10 parts by weight) of a polar monomer such as a carboxylic acid can be used to increase the cohesive strength of the pressure-sensitive adhesive. At higher levels, these polar monomers tend to diminish tack, increase glass transition temperature and decrease low temperature performance.

Useful copolymerizable acidic monomers include, but are not limited to, those selected from the group consisting of ethylenically unsaturated carboxylic acids, ethylenically unsaturated sulfonic acids, and ethylenically unsaturated phosphonic acids. Examples of such monomers include those selected from the group consisting of acrylic acid (AA), methacrylic acid, itaconic acid, fumaric acid, crotonic acid, citraconic acid, maleic acid, beta-carboxyethyl acrylate, sulfoethyl methacrylate, and the like, and mixtures thereof.

Other useful copolymerizable monomers include, but are not limited to, (meth)acrylamides, N,N-dialkyl substituted (meth)acrylamides, N-vinyl lactams, and N,N-dialkylaminoalkyl(meth)acrylates. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, N-vinyl pyrrolidone, N-vinyl caprolactam, and the like, and mixtures thereof.

Non-polar Ethylenically Unsaturated Monomers: The non-polar ethylenically unsaturated monomer is a monomer whose homopolymer has a solubility parameter as measured by the Fedors method (see Polymer Handbook, Bandrup and Immergut) of not greater than 10.50 and a Tg greater than 15° C. The non-polar nature of this monomer tends to improve the low energy surface adhesion of the adhesive. These non-polar ethylenically unsaturated monomers are selected from the group consisting of alkyl(meth)acrylates, N-alkyl(meth)acrylamides, and combinations thereof. Illustrative examples include, but are not limited to, 3,3,5-trimethylcyclohexyl acrylate, 3,3,5-trimethylcyclohexyl methacrylate, cyclohexyl acrylate, cyclohexyl methacrylate, isobornyl acrylate, isobornyl methacrylate, N-octyl acrylamide, N-octyl methacrylamide or combinations thereof. Optionally, from 0 to 25 parts by weight of a non-polar ethylenically unsaturated monomer may be added.

Tackifiers: In some embodiments, tackifiers are added to the adhesive and can include terpene phenolics, rosins, rosin esters, esters of hydrogenated rosins, synthetic hydrocarbon resins and combinations thereof. These provide good bonding characteristics on low energy surfaces. Hydrogenated rosin esters and hydrogenated C9 aromatic resins are useful tackifiers in some embodiments, because of performance advantages that include high levels of "tack", outdoor durability, oxidation resistance, and limited interference in post crosslinking of acrylic PSAs.

Tackifiers may be added at a level of about 1 to about 65 parts per 100 parts of the monofunctional acrylate or methacrylate ester of a non-tertiary alkyl alcohol, the polar monomer, and the nonpolar ethylenically unsaturated monomer to achieve desired "tack". Preferably, the tackifier has a softening point of about 65 to about 100.degree. C. However, the addition of tackifiers can reduce shear or cohesive strength and raise the Tg of the acrylic PSA, which is undesirable for cold temperature performance.

Crosslinkers: In one embodiment, crosslinkers are added to the adhesive. In order to increase the shear or cohesive strength of acrylic pressure-sensitive adhesives, a crosslinking additive may be incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "bisamide". Such chemical crosslinkers can be added into solvent-based PSAs after polymerization and activated by heat during oven drying of the coated adhesive.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals, which bring about a crosslinking reaction of the polymer. A common free radical generating reagent is benzoyl peroxide. Free radical generators are required only in small quantities, but generally require higher temperatures to complete the crosslinking reaction than those required for the bisamide reagent.

In certain embodiments, the adhesive can be a heat-activated adhesive, such as hot-melt adhesive. Heat-activated adhesives are non-tacky at room temperature but become tacky and capable of bonding to a substrate at elevated temperatures. These adhesives usually have a glass transition temperature (Tg) or melting point (Tm) above room temperature. When the temperature is increased above the Tg or Tm, the storage modulus usually decreases and the adhesive becomes tacky.

In some embodiments, the adhesive diffuses visible light. As mentioned before, diffusion can be accomplished by creating surface diffusers, bulk diffusers, and embedded diffusers.

Ultraviolet Absorbers

In certain embodiments, the adhesives and other layers or elements of the film constructions of the present disclosure may contain ultraviolet absorbers. In certain preferred embodiments, the UV absorbers are incorporated in the window film PSA which is the first layer of the LRF exposed to sunlight, thereby protecting the other layers of the redirecting film assembly. Ultraviolet absorbers function by preferentially absorbing ultraviolet radiation and dissipating it as thermal energy. Suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones. Suitable benzophenones include, CYASORB UV-9 (2-hydroxy-4-methoxybenzophenone, CHIMASSORB 81 (or CYASORB UV 531) (2 hyroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2, 4-dimethylphenyl)-1,3,5-triazin-2yl]-5(oxctyloxy) phenol (an exemplary triazine) and CYASORB 3638 (an exemplary benzoxiazine).

Hindered amine light stabilizers (HALS) are efficient stabilizers against light-induced degradation of most polymers. HALS do not generally absorb UV radiation, but act to inhibit degradation of the polymer. HALS typically include tetra alkyl piperidines, such as 2,2,6,6-tetramethyl-4-piperidinamine and 2,2,6,6-tetramethyl-4-piperidinol. Other suitable HALS include compounds available from Ciba, Tarrytown, N.Y. as TINUVIN 123, 144, and 292.

The UVAs and HALS disclosed explicitly here are intended to be examples of materials corresponding to each of these two categories of additives. The present inventors contemplate that other materials not disclosed here but known to those skilled in the art for their properties as UV absorbers or hindered amine light stabilizers can be used in the constructions of this disclosure.

Light Redirecting Film Configurations

Room-Facing Configurations

Figure 29A:
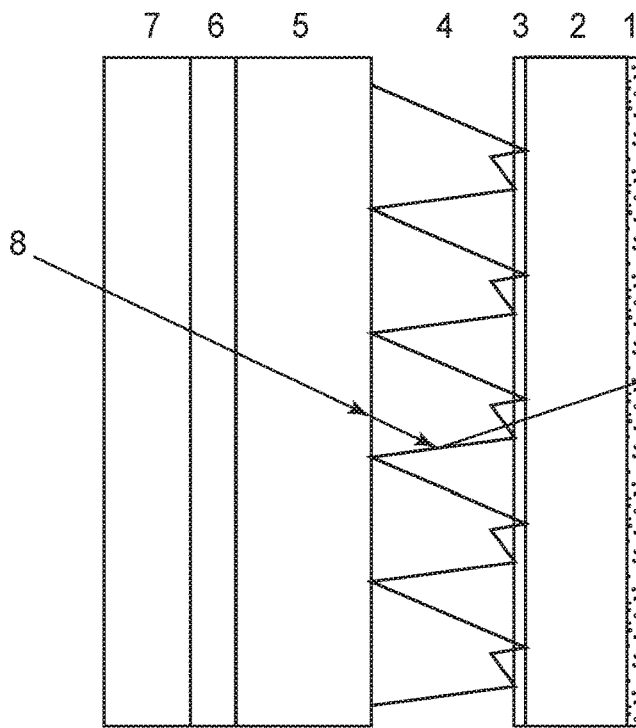
FIG. 29(a) shows an embodiment of a light redirecting film construction having room-facing microstructured prismatic elements.

A room-facing light redirecting assembly is shown in FIG. 29(a). In this embodiment, the redirecting film with the structures oriented towards the room is bonded to the cover film. The cover film may include diffusing properties depending on the optical performance of the light redirecting microstructure. The diffuser may be surface, bulk, or embedded diffuser. Diffusion may also be included in the adhesive. The assembly may be mounted to a window or glazing using window film adhesive.

Sun-Facing Configurations

Figure 29B:
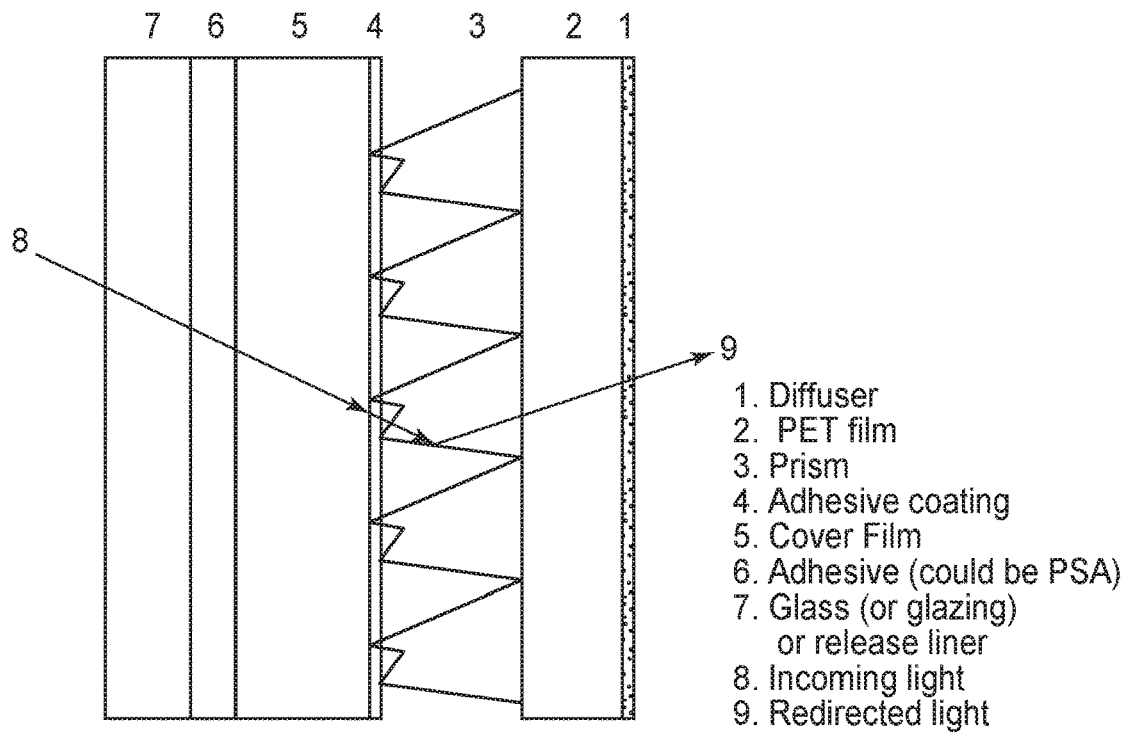
FIG. 29(b) shows an embodiment of a light redirecting film construction having sun-facing microstructured prismatic elements.

A sun-facing light redirecting configuration is shown in FIG. 29(b). In that embodiment, the microstructured prismatic elements are oriented towards the incoming sunlight. In this embodiment, the microstructure substrate may also have diffusing properties integrated into it. In certain embodiments, diffusive properties can be achieved by coating a surface diffuser on the substrate side opposing the microstructured prismatic elements. This substrate could also include bulk diffusion properties. This substrate may have a window film adhesive coated on the opposing face to attach to a glazing.

In some embodiments, the present disclosure is directed to a window comprising any of the films described above.

In certain embodiments, such as in the above room-facing and sun-facing constructions, diffusion may be incorporated in the substrates and/or adhesives. Diffusers may be surface, bulk, or embedded diffusers.

In some embodiments, the window film adhesive diffuses visible light. As mentioned before, diffusion can be accomplished by creating surface diffusers, bulk diffusers, and embedded diffusers.

In other embodiments, the shape of the construction is circular or ellipsoidal shape and the edge of the construction is sealed all around. As mentioned before, the sealing can occur: by the use of a sealing agent, by the adhesive layer as described above, by using an edge sealing tape, or by using pressure, temperature, or some combination of both, including the use of a hot knife.

In yet other embodiments constructions as described in the preceding paragraph may have a diffuser (bulk, surface, or embedded) on what originally was a see-through region.

Edge Sealing

One potential limitation of tip-bonded constructions is that they may not be fully sealed at the edges. The microstructures described above may be linear. Bonding such structures at the tips to the cover film leaves air channels in the construction. Under certain circumstance, these air channels can act as micro capillaries. Water introduced at the edges either during wet lamination during installation or condensation may be drawn into the air channels immersing the microstructures. Such edge ingress degrades optical performance and may be visually unacceptable.

To overcome this, in certain embodiments, tip-bonded constructions may be sealed at the edges to prevent ingress of contaminants such as moisture and dirt. In those embodiments, one option to seal at least a portion of the edge is for the adhesive layer to fill the space between at least two immediately adjacent microstructured prismatic elements. In other embodiments, the entire edge can be sealed in this manner if the adhesive fills the space between the microstructured prismatic elements near the edge.

In some embodiments, the construction has a rectangular or square shape and the edge of one or more sides, up to all four sides, is sealed. In certain embodiments, the sealing can occur: by the use of a sealing agent, by the use of an adhesive layer on the edge of the film constructions, by using an edge sealing tape, caulk, thick PSAs, curable formulations (e.g. super glue), or by using pressure, temperature, or some combination of both, including the use of a hot knife. A sealing agent would typically be a liquid adhesive that is applied after the film construction is cut. For UV stability, acrylate or silicone adhesives would be preferred.

EXAMPLES

These examples are merely for illustrative purposes only and not meant to be limiting on the scope of the appended claims. All parts, percentages, ratios, etc., in the examples and the rest of the specification are by weight unless otherwise indicated.

TABLE 1

Materials.

| Component | Supplier | Description | % Solids |
|---|---|---|---|
| Polyacrylate PSA | 3M Company (St. Paul MN) | Terpolymer of isooctyl acrylate (50%), ethyl acrylate (40%), and acrylic acid (10%) having an intrinsic viscosity of 1.9. | 21.2 |
| Uvacure 1500 | Cytec Industries (Woodland Park NJ) | Cycloaliphatic Diepoxide | 100 |
| DEP | Thirumalai Chemicals (Mumbai, India) | Diethyl phthalate | 100 |
| Toluene | Aldrich Chemical (Milwaukee WI) | Solvent | 0 |
| Methanol | Aldrich Chemical (Milwaukee WI) | Solvent | 0 |
| Ethyl Acetate | Aldrich Chemical (Milwaukee WI) | Solvent | 0 |
| Uvacure 1600 | Cytec Industries (Woodland Park NJ) | Diaryl Iodonium Hexafluoroantimonate Salt, Cationic Photoinitiator | 100 |
| Additol ITX | Cytec Industries (Woodland Park NJ) | Isopropylthioxanthone | 100 |
| MX300 | Soken Chemical (Japan) | Crosslinked poly(methyl methacrylate) spherical beads. The beads have a nominal diameter of 3 microns. | 100 |
| PHOTOMER 6210 (R1) | IGM Resins Charlotte, NC | Aliphatic urethane diacrylate | |
| SR238 (R2) | Sartomer Americas Exton, PA | Hexanediol diacrylate | |
| CN2920 (R3) | Sartomer Americas Exton, PA | Aliphatic urethane acrylate oligomer | |
| SR9003 (R4) | Sartomer Americas Exton, PA | Propoxylated neopentyl glycol diacrylate | |
| SR351 (R5) | Sartomer Americas Exton, PA | Trimethylolpropane triacrylate | |
| RHOPLEX 3208 (AP1) | Dow Chemical Company, Midland, MI | Acrylic Primer | |
| IRGACURE 4265 (PI2) | BASF Corp. Florham Park, NJ | Photoinitiator | |
| TPO | | Photoinitiator | |

Figure 6:
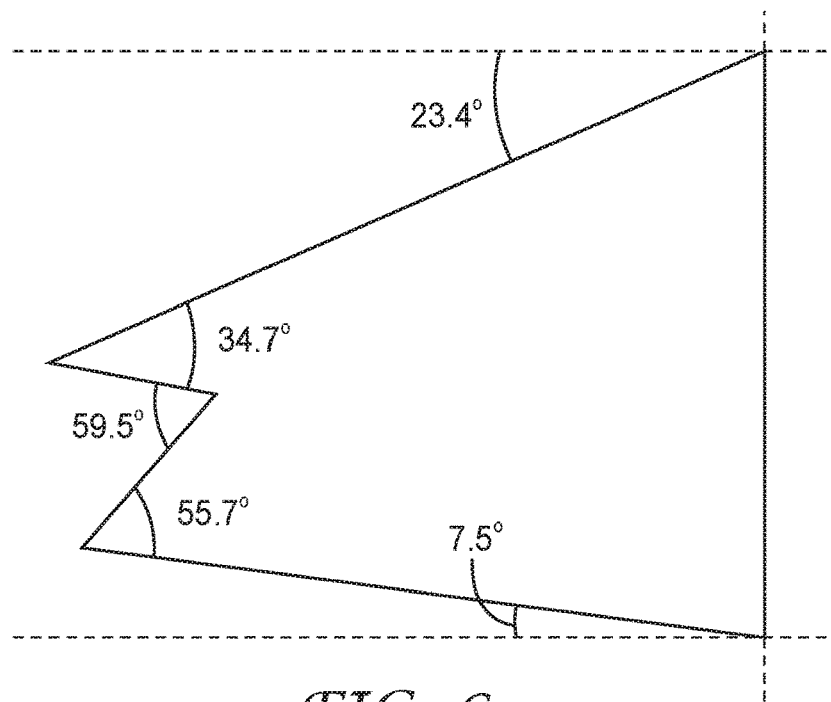
FIG. 6 shows a cross-section of an embodiment of a room-facing microstructured prismatic element.
Figure 6A:
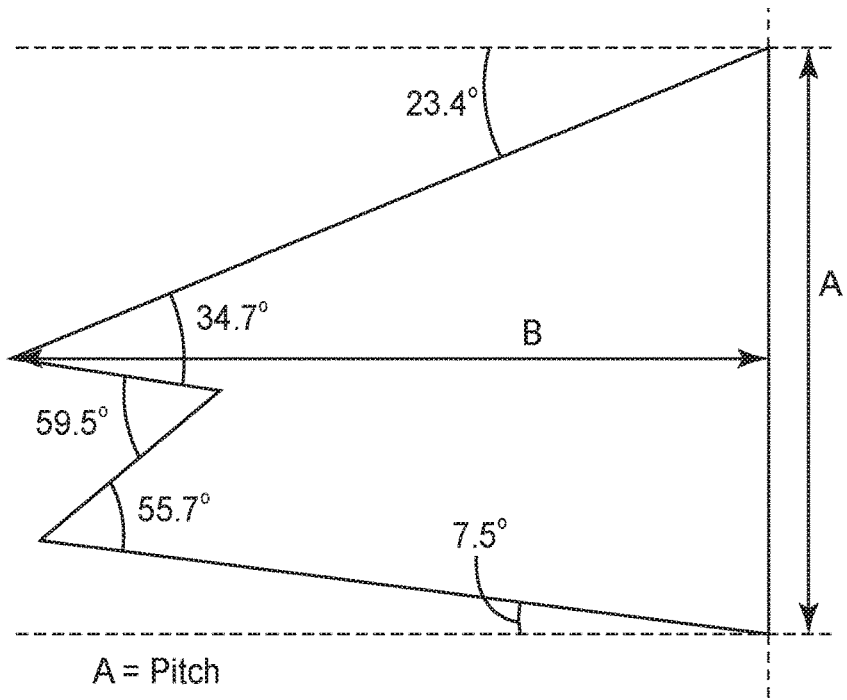
FIG. 6(a) shows the room-facing microstructured prismatic element of FIG. 6 with the pitch, height, and aspect ratio of 1.23 as indicated.

Microstructured Optical Films Used in the Examples:

Film A is a microstructured film made according to the process described in U.S. Pat. No. 5,763,049, incorporated herein by reference, using a master tool produced according to the process described in US2009/0041553, incorporated herein by reference. The microstructured prismatic elements are aligned linearly in the down-web (machine direction) and are shaped in cross-section as shown in FIG. 6. The plano side of the polyester substrate is primed to promote adhesion.

Figure 7:
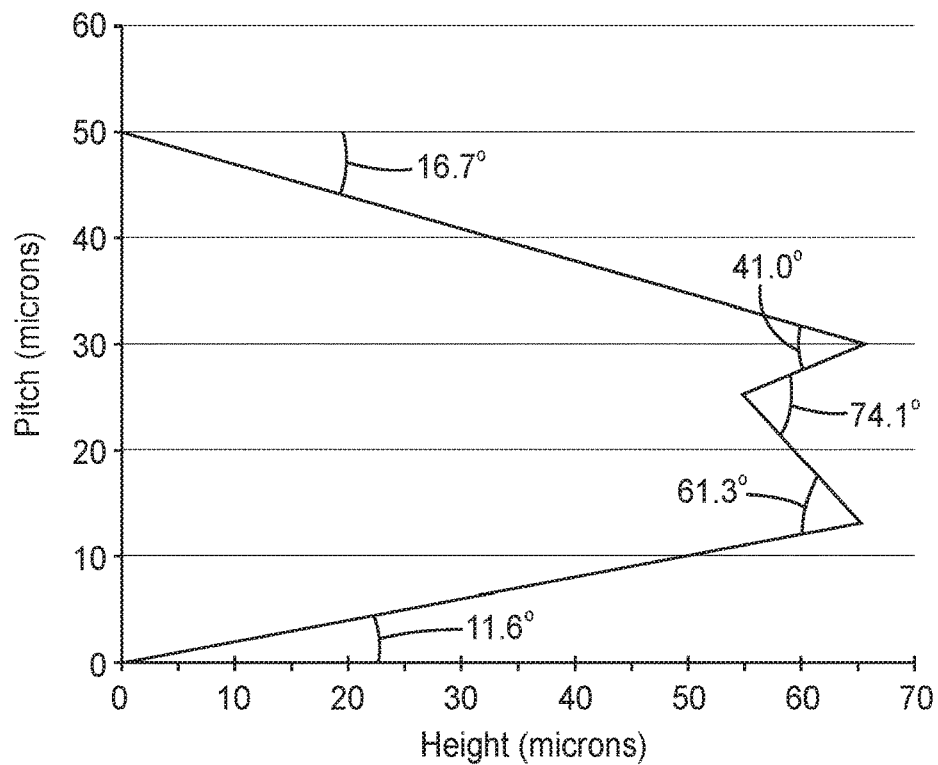
FIG. 7 shows a cross-section of another embodiment of a room-facing microstructured prismatic element with aspect ratio of 1.31.

Film B is a microstructured film made according to the process described in U.S. Pat. No. 5,763,049 using a master tool produced according to the process described in US2009/0041553. The microstructured prismatic elements are aligned linearly in the down-web (machine direction) and are shaped in cross-section as shown in FIG. 7. The plano side of the polyester substrate is primed to promote adhesion.

Figure 8:
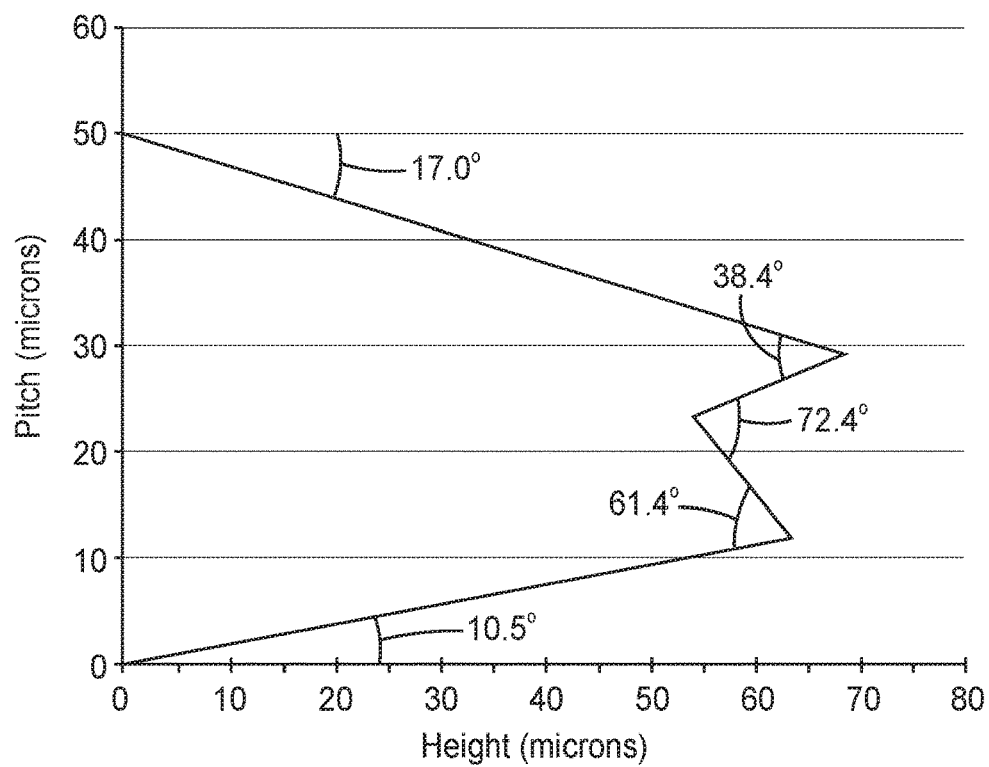
FIG. 8 shows a cross-section of another embodiment of a room-facing microstructured prismatic element with aspect ratio of 1.36

Film C is a microstructured film made according to the process described in U.S. Pat. No. 5,763,049 using a master tool produced according to the process described in US2009/0041553. The microstructured prismatic elements are aligned linearly in the down-web (machine direction) and are shaped in cross-section as shown in FIG. 8. The plano side of the polyester substrate is primed to promote adhesion.

Figure 9:
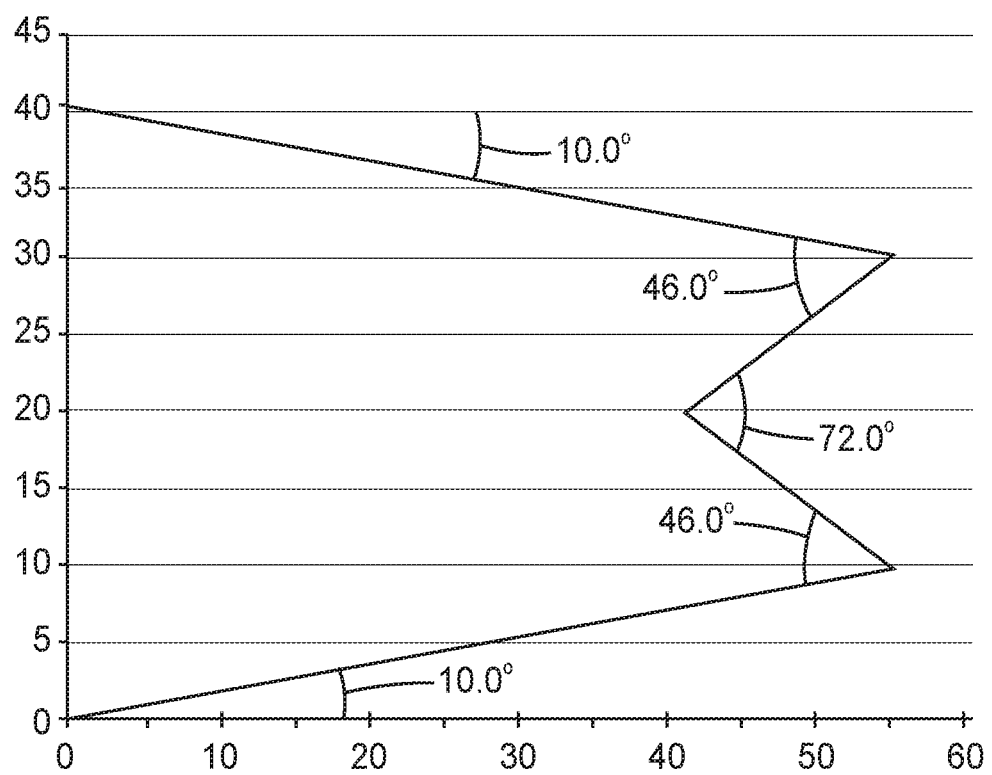
FIG. 9 shows a cross-section of another embodiment of a room-facing microstructured prismatic element with aspect ratio of 1.38.

Film D is a microstructured film made according to the process described in U.S. Pat. No. 5,763,049 using a master tool produced according to the process described in US2009/0041553. The microstructured prismatic elements are aligned linearly in the down-web (machine direction) and are shaped in cross-section as shown in FIG. 9. The plano side of the polyester substrate is primed to promote adhesion.

Figure 23:
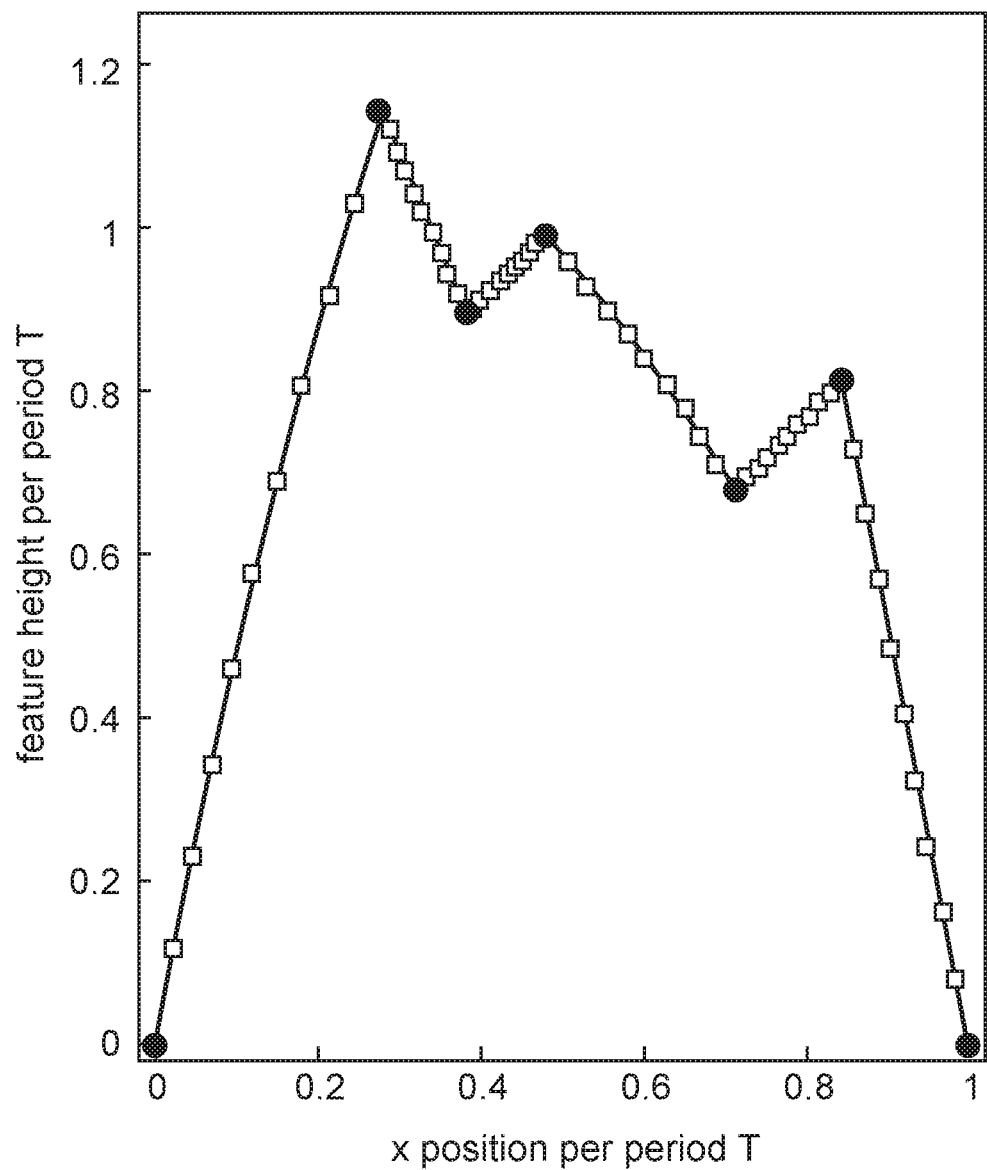
FIG. 23 shows a cross-section of another embodiment of a room-facing microstructured prismatic element having three peaks.

Film E (prophetic) is a microstructured film that can be made according to the process described in U.S. Pat. No. 5,763,049 using a master tool produced according to the process described in US2009/0041553. The microstructured prismatic elements are shaped in cross-section as shown in FIG. 23, as described in U.S. patent application 62/094,626, filed 19 Dec. 2014, which is incorporated herein by reference. The plano side of the polyester substrate is primed to promote adhesion.

Figure 24:
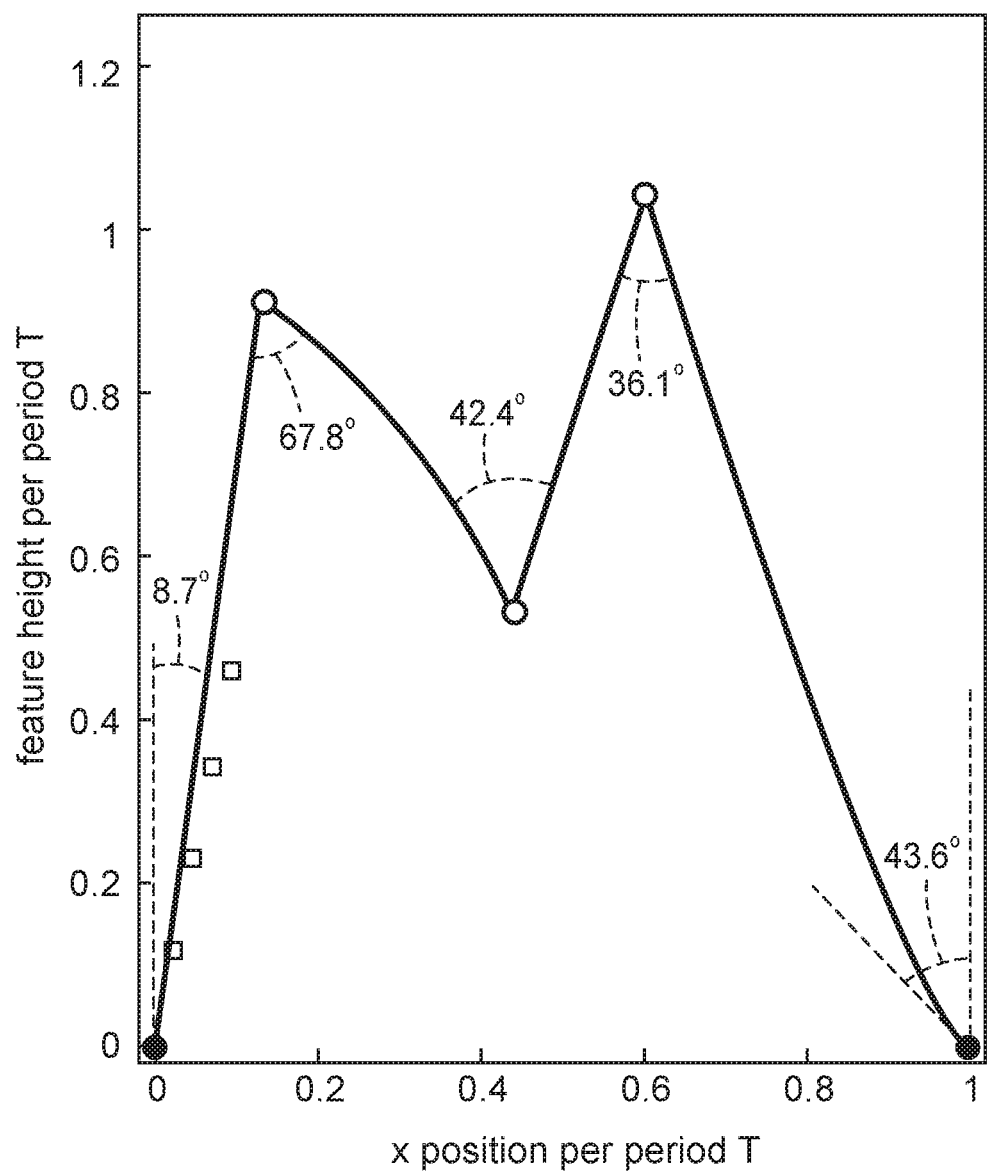
FIG. 24 shows a cross-section of another embodiment of a room-facing microstructured prismatic element having curved facets.

Film F (prophetic) is a microstructured film that can be made according to the process described in U.S. Pat. No. 5,763,049 using a master tool produced according to the process described in US2009/0041553. The microstructured prismatic elements are shaped in cross-section as shown in FIG. 24, as described in U.S. patent application 62/094,626, filed 19 Dec. 2014. The plano side of the polyester substrate is primed to promote adhesion.

Figure 25:
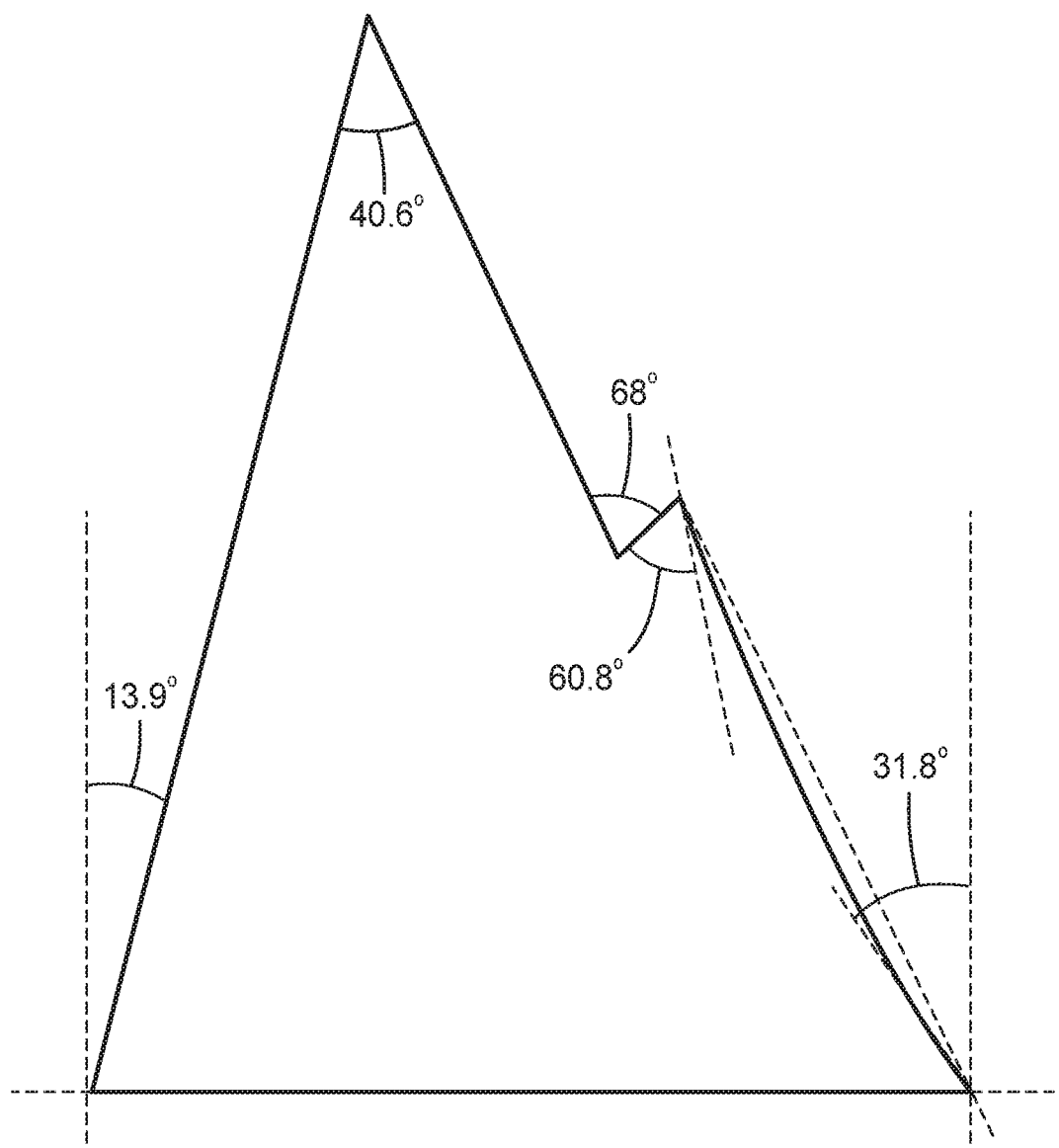
FIG. 25 shows a cross-section of another embodiment of a room-facing microstructured prismatic element having a curved facets.
Figure 26:
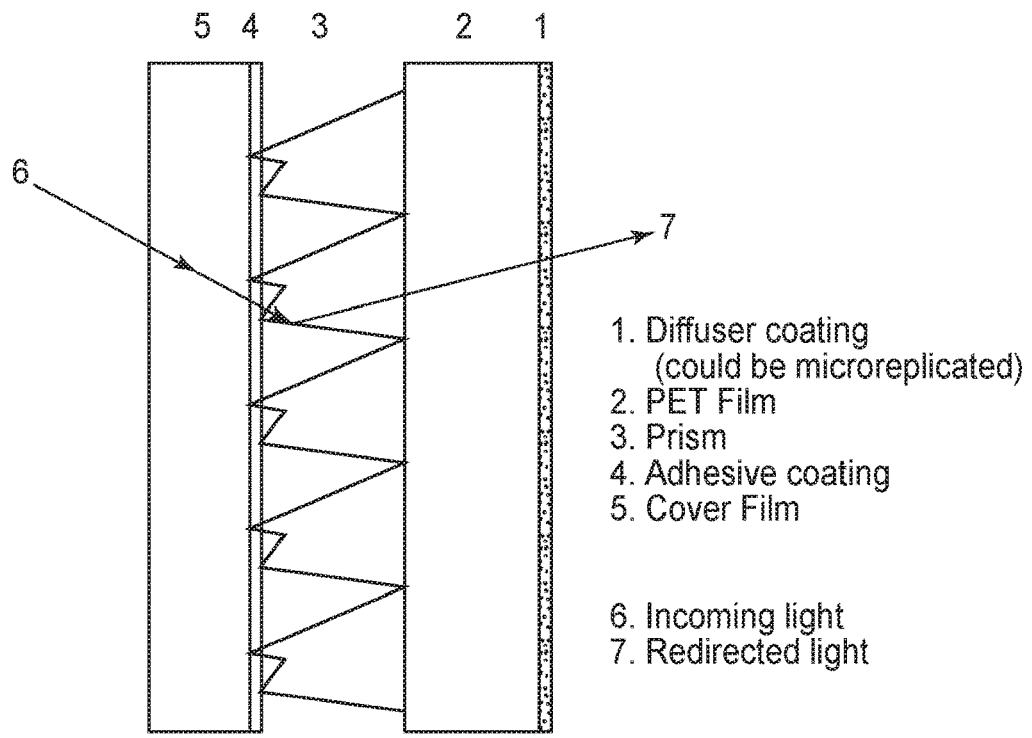
FIG. 26 shows another embodiment of a light redirecting film construction.
Figure 27:
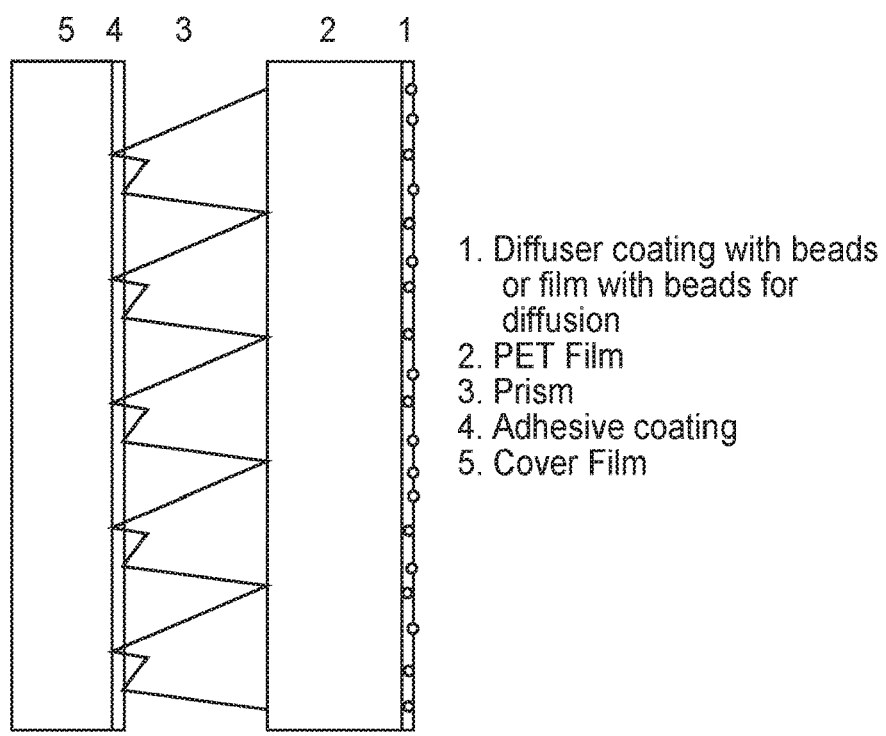
FIG. 27 shows another embodiment of a light redirecting film construction.
Figure 28:
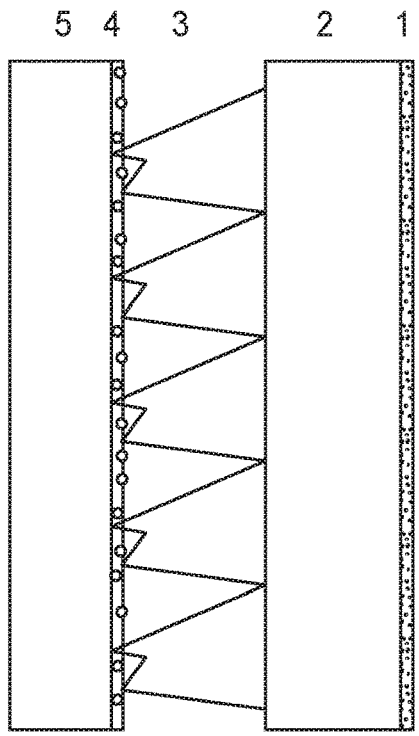
FIG. 28 shows another embodiment of a light redirecting film construction.

Film G (prophetic) is a microstructured film that can be made according to the process described in U.S. Pat. No. 5,763,049 The microstructured prismatic elements are shaped in cross-section as shown in FIG. 25, as described in U.S. patent application 62/094,626, filed 19 Dec. 2014. The plano side of the polyester substrate is primed to promote adhesion.

Fabrication of a Cover Film Having a Microstructured Diffusing Layer

A microreplicated diffusing layer was applied to a 2 mil PET substrate as described in U.S. Pat. No. 8,657,472, which is incorporated herein by reference in its entirety. The diffusing layer was fabricated from a resin comprising 60 wt % R1, 20 wt % R2, and 20 wt % R5. To this resin mixture, 0.5 wt % TPO photoinitiator was added based on the combined resin weight. The diffusing layer was applied by coating the substrate with the resin, contacting a microstructured tool with the resin, and curing the resin while in contact with the tool using a UV lamp. The resulting cover film had a thickness of 57.6 microns, the visible light transmission was 93.3%, the haze was 33.1%, and the clarity was 15.5%.

Light Redirecting Microstructured Prismatic Film B

The supporting substrate was a 2-mil biaxially-oriented PET film having an adhesion promoting primer coating comprising AP1 applied to both sides. The replicating resing comprised 60 wt % Photomer 6010, 20 wt % SR602, 4 wt % SR601, 8 wt % SR351, 8 wt % Etermer 201. Irgacture 4265 was added as photoinitiator at 0.5 wt % of the total resin weight. The replicating resin was applied to the PET substrate in a manner and rate such that the resin was evenly distributed across the region to be replicated. Replication of the resin was conducted at 30 feet per minute (fpm) on a tool heated to 125° F. The tool, having the same but complimentary shape as the desired daylight redirecting structure, had been previously fabricated using a diamond-turning process. The desired periodic structure comprised two peaks and four facets per period with one facet per side of the function.

The resulting light redirecting prismatic structure is described in FIG. 7. Radiation from a Fusion "D" lamp operating at 600 W/in was transmitted through the film to cure the resin while in contact with the tool. The replicated Daylight Redirection Microstructured Template Film (replicated resin on PET substrate) was then removed from the tool and wound into a roll in preparation for further processing.

Light Redirecting Microstructured Prismatic Film A

The supporting substrate used was a 2-mil biaxially-oriented PET film having an adhesion promoting primer coating comprising AP1 applied to both sides. The replicating resin was a 75/25 blend of R1 and R2 with 0.5% photoinitator PI2. The replicating resin was applied to the PET substrate in a manner and rate such that the resin was evenly distributed across the region to be replicated. Replication of the resin was conducted at 30 fpm on a tool heated to 125° F. The tool, having the same but complimentary shape as the desired daylight redirecting structure, had been previously fabricated using a diamond-turning process. The desired periodic structure comprised two peaks and four facets per period with one facet per side of the function.

The resulting daylight redirecting film is further described in Example No. 2 of U.S. provisional application No. 62/066,302 titled "Sun-Facing Light Redirecting Film with Reduced Glare," filed on Oct. 20, 2014. Diffuser Films (WO20164621A1) which is hereby incorporated herein by reference in its entirety. Radiation from a Fusion "D" lamp operating at 600 W/in was transmitted through the film to cure the resin while in contact with the tool. The replicated Daylight Redirection Microstructured Template Film (replicated resin on PET substrate) was then removed from the tool and wound into a roll in preparation for further processing.

Method of Making a Daylight Redirecting Film Assembly
Adhesive Solution 1 (Containing No Diffusion Beads):

An adhesive solution was prepared by mixing the components in Table 2. The adhesive solutions consisted of 11% solids.

TABLE 2

Adhesive formulation.

| Component | Weight (Kg) |
|---|---|
| Ethyl Acetate | 57.18 |
| Toluene | 19.68 |
| Methanol | 14.09 |
| Polyacrylate PSA solution | 46.32 |
| Uvacure 1500 | 4.545 |
| Uvacure 1600 | 0.636 |
| Additol ITX | 0.0182 |
| DEP | 0.755 |

This adhesive solution represents a solvent based adhesive that upon drying may be cured by exposure to actinic radiation to form an interpenetrating network (IPN). The composition of the adhesive on a dry basis is provided in Table 3.

TABLE 3

Adhesive formulation in weight percent.

| Component | Weight (%) |
|---|---|
| Polyacrylate PSA | 62.3% |
| Uvacure 1500 | 28.8% |
| Uvacure 1600 | 4.03% |
| Additol ITX | 0.115% |
| DEP | 4.78% |

Adhesive Solution 2 (Containing 5 wt % Diffusion Beads):

An adhesive solution was prepared by mixing the components shown in Table 4. The adhesive solution was 11% solids.

TABLE 4

Adhesive formulation.

| Component | Weight (Kg) |
|---|---|
| Ethyl Acetate | 70.55 |
| Toluene | 19.68 |
| Methanol | 14.09 |
| Polyacrylate PSA solution | 46.32 |
| Uvacure 1500 | 4.545 |
| Uvacure 1600 | 0.636 |
| Additol ITX | 0.0182 |
| DEP | 0.755 |
| MX300 | 0.827 |

This adhesive solution represents a solvent based adhesive that upon drying may be cured by exposure to actinic radiation to form an interpenetrating network (IPN). The composition of the adhesive on a dry basis is provided in Table 5.

TABLE 5

Adhesive formulation in weight percent.

| Component | Weight (%) |
|---|---|
| Polyacrylate PSA | 59.1% |
| Uvacure 1500 | 27.4% |
| Uvacure 1600 | 3.83% |
| Additol ITX | 0.110% |
| DEP | 4.55% |
| MX300 | 4.98% |

Adhesive Solution 3 (Containing 9.5 wt % Diffusion Beads):

An adhesive solution was prepared by mixing the components shown in Table 6. The adhesive solution was 11% solids.

TABLE 6

Adhesive formulation.

| Component | Weight (Kg) |
|---|---|
| Ethyl Acetate | 70.55 |
| Toluene | 19.68 |
| Methanol | 14.09 |
| Polyacrylate PSA solution | 46.32 |
| Uvacure 1500 | 4.545 |
| Uvacure 1600 | 0.636 |
| Additol ITX | 0.0182 |
| DEP | 0.755 |
| MX300 | 1.655 |

This adhesive solution represents a solvent based adhesive that upon drying may be cured by exposure to actinic radiation to form an interpenetrating network (IPN). The composition of the adhesive on a dry basis is provided in Table 7.

TABLE 7

Adhesive formulation in weight percent.

| Component | Weight (%) |
|---|---|
| Polyacrylate PSA | 56.34% |
| Uvacure 1500 | 26.08% |
| Uvacure 1600 | 3.65% |
| Additol ITX | 0.10% |
| DEP | 4.33% |
| MX300 | 9.49% |

Coating and Lamination Process for Making a Daylight Redirecting Film Assembly

Example 1

Adhesive solution 1 prepared above was coated onto the plano side of a 50 micron (2 mil) PET cover film which was primed on both plano sides. The adhesive solution was coated on the cover film using a slot-type die at a width of 8 in (20.32 cm) and a web speed of 25 ft/min (7.62 m/min). The adhesive solution was delivered using a gear driven pump at specified flow rates to provide coatings of desired thickness. Samples with dry adhesive coating thickness of 3, 4, 6, and 8 micron were produced. Residual solvent was removed from the coated film in a convection oven maintained at a temperature of 150° F. (65.6° C.); the oven length was 30 ft (9.14 m).

Microstructured film B was conveyed to a lamination station and laminated to the adhesive side of the PET cover film with the microstructured prismatic element side of the film in direct contact with the adhesive coating. The laminator was configured with a rubber roll (Shore A Durometer of 68) nipped against a steel roll; the nip pressure was maintained at approximately 60 psi.

The laminate was conveyed to a UV curing station, where it was exposed to actinic radiation. The radiation source was positioned so that the adhesive was irradiated through the film comprising the microstructured prismatic elements. The curing station was comprised of a Fusion F600 (Fusion UV Systems, Gaithersburg Md.) and a temperature controlled steel backup roll. The Fusion UV source was configured with a D Bulb and an aluminum reflector with power setting range of 60-100%. The results are provided in FIGS. 14-17.

Example 2

Adhesive solution 1 was coated using a slot-type die onto the plano side of a 35.5 micron thick (1.4 mil) PET cover film which was primed on both plano sides. The adhesive solution was delivered using a gear driven pump at specified flow rates to provide coatings of desired thickness. Samples with dry adhesive coating thickness of 3.0 micron, 3.4 micron and 4.5 micron were produced. Residual solvent was removed from the coated film in a convection oven maintained at a temperature of 150° F. (65.6° C.); the oven length was 30 ft (9.14 m).

Microstructured film A was conveyed to a lamination station and laminated to the adhesive side of the PET cover film with the microstructured prismatic element side of the film in direct contact with the adhesive coating. The laminator was configured with a rubber roll (Shore A Durometer of 80) nipped against a steel roll; the nip pressure was adjusted to 90 psi to imbed the microstructured prismatic elements into the adhesive.

The laminate was conveyed to a UV curing station, where it was exposed to actinic radiation. The radiation source was positioned so that the adhesive was irradiated through the film comprising the microstructured prismatic elements. The curing station was comprised of a Fusion UV System (Gaithersburg Md.) and a temperature controlled steel backup roll. The Fusion UV source was configured with a D Bulb and an aluminum reflector with power setting range of 70%. The UV backup roll was maintained at a temperature of 70° F. (21.1° C.).

TABLE 8

Peel strength and Glare of Example 2 at different adhesive thickness.

| Adhesive thickness (microns) | Peel strength (gram/inch) | Max Direct Glare (% of incident) |
|---|---|---|
| 3.0 | 174 | 20.1 |
| 3.4 | 203 | 16.1 |
| 4.5 | 240 | 14.6 |

Example 3

A window film pressure sensitive adhesive was coated on the first plano side of a DuPont Melinex 454 PET cover film which was 75 micron (3 mil) thick and a release liner was then laminated to the window film adhesive to produce a 3-layer laminate.

Adhesive solution 1 was coated on the second surface of the Melinex 454 film of the 3-layer laminate using a slot-type die. The adhesive solution was delivered using a gear driven pump at specified flow rate to provide a 4.5 micron dry adhesive coating thickness. Residual solvent was removed from the coated film in a convection oven maintained at a temperature of 150° F. (65.6° C.); the oven length was 30 ft (9.14 m).

Microstructured film A was conveyed to a lamination station and laminated to the adhesive side of the PET cover film with the microstructured prismatic element side of the film in direct contact with the adhesive coating. The laminator was configured with a rubber roll (Shore A Durometer of 80) nipped against a steel roll; the nip pressure was adjusted to 90 psi to imbed the microstructured prismatic elements into the adhesive.

The laminate was conveyed to a UV curing station, where it was exposed to actinic radiation. The radiation source was positioned so that the adhesive was irradiated through the film comprising the microstructured prismatic elements. The curing station was comprised of a Fusion UV System (Gaithersburg Md.) and a temperature controlled steel backup roll. The Fusion UV source was configured with a D Bulb and an aluminum reflector with power setting range of 70%. The UV backup roll was maintained at a temperature of 70° F. (21.1° C.).

Example 4

A window film adhesive was coated on the first major plano side of a DuPont Melinex 454 PET cover film which was 75 micron (3 mil) thick and a release liner was laminated to the window film adhesive to produce a 3-layer laminate.

Adhesive solution 2 was coated on the second surface of the Melinex 454 film of the 3-layer laminate using a slot-type die. The solution was delivered using a gear driven pump at specified flow rate to provide a 4.5 micron dry adhesive coating thickness. Residual solvent was removed from the coated film in a convection oven maintained at a temperature of 150° F. (65.6° C.); the oven length was 30 ft (9.14 m).

Microstructured film A was conveyed to a lamination station and laminated to the adhesive side of the PET cover film with the microstructured prismatic element side of the film in direct contact with the adhesive coating. The laminator was configured with a rubber roll (Shore A Durometer of 80) nipped against a steel roll; the nip pressure was adjusted to 90 psi to imbed the microstructured prismatic elements into the adhesive.

The laminate was conveyed to a UV curing station, where it was exposed to actinic radiation. The radiation source was positioned so that the adhesive was irradiated through the film comprising the microstructured prismatic elements. The curing station was comprised of a Fusion UV System (Gaithersburg Md.) and a temperature controlled steel backup roll. The Fusion UV source was configured with a D Bulb and an aluminum reflector with power setting range of 70%. The UV backup roll was maintained at a temperature of 70° F. (21.1° C.).

Example 5

A window film adhesive was coated on the first major plano side of a DuPont Melinex 454 PET cover film which was 75 micron (3 mil) thick and a release liner was laminated to the window film adhesive to produce a 3-layer laminate.

Adhesive solution 3 was coated on the second surface of the Melinex 454 film of the 3-layer laminate using a slot-type die. The solution was delivered using a gear driven pump at specified flow rate to provide a 5.5 micron dry adhesive coating thickness. Residual solvent was removed from the coated film in a convection oven maintained at a temperature of 150° F. (65.6° C.); the oven length was 30 ft (9.14 m).

Microstructured film A was conveyed to a lamination station and laminated to the adhesive side of the PET cover film with the microstructured prismatic element side of the film in direct contact with the adhesive coating. The laminator was configured with a rubber roll (Shore A Durometer of 80) nipped against a steel roll; the nip pressure was adjusted to 90 psi to imbed the microstructured prismatic elements into the adhesive.

The laminate was conveyed to a UV curing station, where it was exposed to actinic radiation. The radiation source was positioned so that the adhesive was irradiated through the film comprising the microstructured prismatic elements. The curing station was comprised of a Fusion UV System (Gaithersburg Md.) and a temperature controlled steel backup roll. The Fusion UV source was configured with a D Bulb and an aluminum reflector with power setting range of 70%. The UV backup roll was maintained at a temperature of 70° F. (21.1° C.). Results are in Tables 9 and 10.

Testing and Aging of Daylight Redirecting Film Assembly:
Measurement of Interlayer Peel Strength of Daylight Redirecting Film Assembly:

Peel force was measured using an IMASS SP-2000 tester (available from IMASS Inc., Accord Mass.). Test strips 1 inch (2.54 cm) wide and approximately 10 in (25.4 cm) long were cut parallel and perpendicular to the prism orientation of the bottom prism film. Laminate strips were adhered to the tester platform using 1 inch (2.54 cm) wide Scotch double-coated tape (available as Scotch 665 from 3M Company, St. Paul Minn.). The tester was configured to measure the 180 degree peel force. Samples were oriented so that the plano side of the bottom prism film was adhered to the tester platform and the top film was attached to the force balance. The load cell capacity was 10 lbf (44.5 N). Peel force was measured at a rate of 12 in/min (30.5 cm/min). Data were collected after an initial delay of 2 seconds. Measurements were then averaged over a test period of 20 seconds. For each sample, at least three test strips with each of the parallel and perpendicular microstructured prismatic element orientations were tested.

Measurement of Haze and Clarity:

Haze and clarity values disclosed herein were measured using a Haze-Gard Plus haze meter (BYK-Gardiner, Silver Springs, Md.) according to the procedure described in ASTM D1003. Optical haze, as used herein, is defined as the ratio of the transmitted light that deviates from the normal direction by more than 4 degrees to the total transmitted light. Optical clarity is defined as $(T_1-T_2)/(T_1+T_2)$, where $T_1$ is the transmitted light that deviates from the normal direction between zero and 0.7 degrees, and $T_2$ is the transmitted light that lies between 1.6 and 2 degrees from the normal direction. In all cases, the optical films were measured with the cover film of the laminate toward the light source.

Environmental Aging of Daylight Redirecting Film Assembly:

To test the environmental performance, the daylight redirecting film assemblies, were placed in an environmental chamber (Envirotronics, Grand Rapids Mich.). The chamber was maintained at 65° C. and 95% RH. Samples were typically aged for a specified period. Unaged and aged daylight redirecting film assemblies were cut and characterized according to the testing procedures previously defined.

Glare Measurement Data

The optical performance of various light redirecting structures as a function of illumination (input) angle was measured using an imaging sphere for scatter and appearance measurement (IS-SA) from Radiant Vision Systems (Richmond, Wash.) model IS-SA-13-1. For each design, the hemispherical angular distribution of the transmitted light (BTDF-Bidirectional Transmission Distribution Function) was measured for illumination elevation angles between 0 (normal, head on) and 75 degrees in 5 degree increment. For this measurement, the azimuth of illumination was constrained to be 0 deg with respect to the surface normal of the window to which the light redirecting structures are attached.

The redirected light was measured as a function of the output angles $\theta_x$ and $\theta_y$, the Cartesian components of spherical coordinates $\theta\phi$ and $\theta\phi$ where the x and y subscripts refer to the horizontal and vertical directions respectively. ($\theta_x = \theta\phi \cos\theta$ and $\theta_y = \theta\phi \sin\theta$ and $\theta = 0$ by definition when the output angle falls on the positive x axis.)

Light going over and under the horizon is more or less useful and so we define zones to group light that is similarly useful. We define each zone by maximum and minimum limits on $\theta_y$. Then the zonal transmittance can be defined to be the integral of the BTDF over the solid angle defined by that zone, that is, for all $\theta_x$ for each $\theta_y$ between $\theta_{y\ min}$ and $\theta_{y\ max}$. The resulting integrand is called the zonal transmission and is a fraction of the total amount of light incident on the structures.

In particular, light that is directed below horizontal is undesirable. If it is directed down at a steep angle, it is wasted on the floor close to the window. If it is directed down but at a less steep angle, it is not only wasted but it becomes glare, which is bothersome to room occupants.

Figure 33:
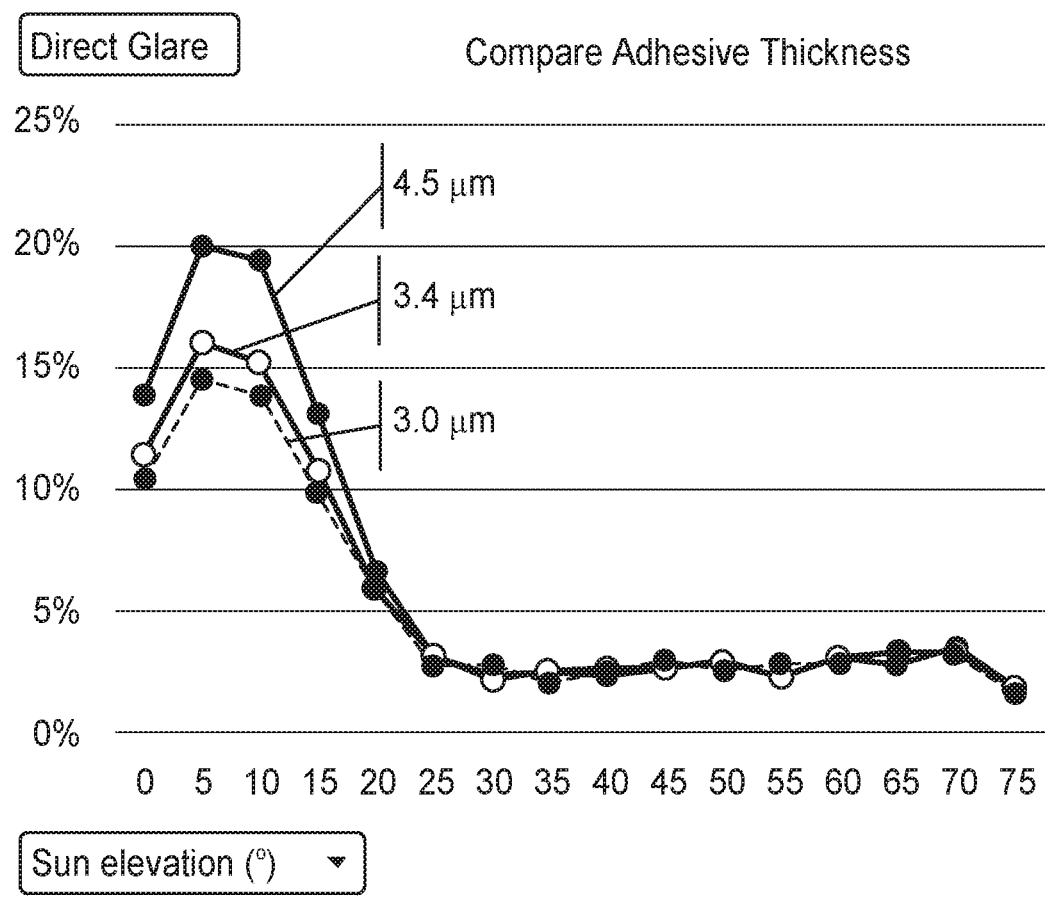
FIG. 33 shows the effect of adhesive thickness on the amount of direct glare produced as a function of sun elevation angle.
Figure 34:
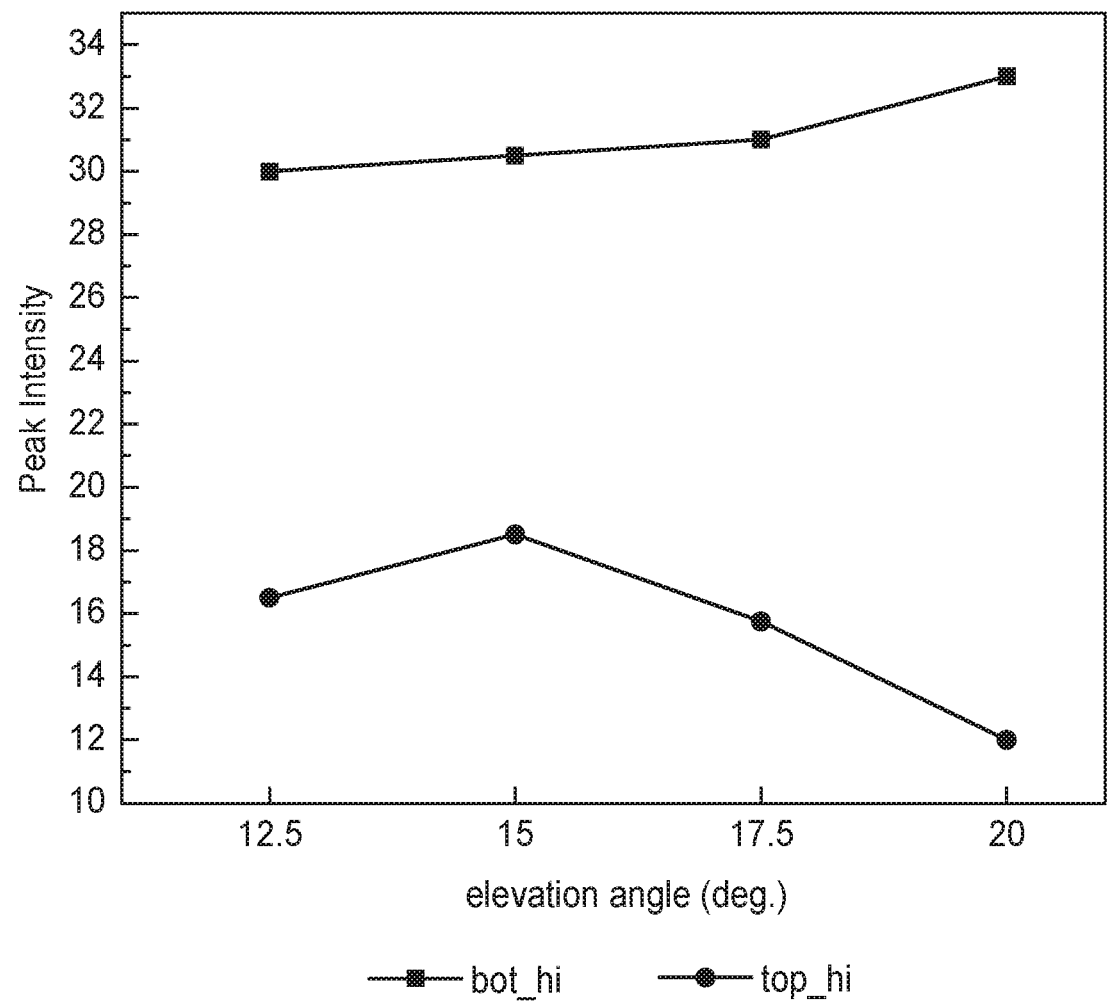
FIG. 34 shows modeled punch-through glare vs. sun elevation angle for the two microstructured prismatic elements described in FIG. 18.

Direct Glare is defined as the fraction of light transmitted between 0 and 15 deg downwards and was determined for each structure and illumination elevation angle from the measured BTDF. FIG. 33 shows the amount of Direct Glare as function of sun elevation for three light directing films with varying adhesive thickness. As the adhesive thickness is increased, the Direct Glare also increases. Also, as shown in Table 4, as the adhesive thickness is increased, the interlayer peel strength increased.

Color Measurement Data

We choose to quantify the color shift as the distance between the input color and the transmitted color as plotted on the perceptively uniform CIE 1976 UCS Chromaticity Diagram, which has the coordinates u' and v'. For example we can measure the color of the input illumination with a Minolta CS-100 Chroma Meter as scattered by a flat white object and compare that chromaticity vs. the chromaticity at a particular output angle by calculating the color shift as the distance between the two coordinates. We define $\Delta u'v' = \sqrt{(u'-u'_0)^2+(v'-v'_0)^2}$ where $u'_0$ and $v'_0$ are the measured chromaticity of the light transmitted through the window but not through the light redirecting films and as scattered from a flat-white object. Therefore $S_0$ describes the color shift away from the color of the input light.

For example Table 9 contains measurements comparing two types of light redirecting films mounted in a south facing window. At the time of the measurement the sun elevation was 60.91 deg and the sun azimuth was 197.43 deg. The films were observed from 25 ft away from the windows. The measurement spot was 9 ft above the floor. The measurement of the input color is listed at the bottom as the "Window transmission" and the last column shows the calculated color shift from this color. The "Left DRF" has a larger color shift than the "Right DRF." These chromaticity measurements are plotted in FIG. 35. Lines connect the two measured points. The length of these lines are equal to $\Delta u'v'$.

TABLE 9

Peel strength at different bead loading %.

| Adhesive Thickness (microns) | % Beads | Average Peel (g/inch) |
|---|---|---|
| 4.5 | 0 | 362 |
| 4.5 | 5 | 182 |
| 5.5 | 10 | 223 |

TABLE 10

Color measurements at different bead loading %.

| | Y | u' | v' | $\Delta u'v'$ |
|---|---|---|---|---|
| No beads | 9010 | 0.242 | 0.498 | 0.028474 |
| 5% beads | 7110 | 0.229 | 0.494 | 0.018092 |
| Window transmission* | 4690 | 0.214 | 0.504 | 0 |

*as scattered from a flat white surface an hour later.

Exemplary Embodiments: Film Construction A

1. A film construction A comprising:
   a light redirecting film having a first major surface and a second major surface opposite the first major surface,
   wherein the first major surface of the light redirecting film comprises a plurality of microstructured prismatic elements,
   wherein one or more of the microstructured prismatic elements have a first peak and a second peak,
   wherein the first peak has a height H1 and the second peak has a height H2,
   wherein H3 is H1–H2, and H3 is equal or greater than 1 micron,
   an adhesive layer comprising an adhesive, wherein the adhesive layer has a first major surface and a second major surface opposite the first major surface,
   a cover film having a first major surface and a second major surface opposite the first major surface,
   wherein the first peak of one or more of the microstructured prismatic elements penetrates at least partially into the first major surface of the adhesive layer,
   wherein the second major surface of the adhesive layer is adjacent to the first major surface of the cover film.
2. The film construction according to any of the preceding embodiments directed to film construction A, wherein H3 is from 1 micron to 30 microns.
3. The film construction according to any of the preceding embodiments directed to film construction A, wherein H3 is from 1 micron to 20 microns.
4. The film construction according to any of the preceding embodiments directed to film construction A, wherein H3 is from 1 micron to 10 microns.

5. The film construction according to any of the preceding embodiments directed to film construction A, wherein the first major surface of the light redirecting film is bonded to the first major surface of the adhesive layer,
6. The film construction according to any of the preceding embodiments directed to film construction A, wherein the second major surface of the adhesive layer is bonded to the first major surface of the cover film
7. The film construction according to any of the preceding embodiments directed to film construction A, wherein H3 is from 2 microns to 8 microns.
8. The film construction according to any of the preceding embodiments directed to film construction A, wherein H3 is from 2 microns to 5 microns.
9. The film construction according to any of the preceding embodiments directed to film construction A, wherein the ratio H1/H2 is less than or equal to 5.
10. The film construction according to any of the preceding embodiments directed to film construction A, wherein the second major surface of the adhesive layer is immediately adjacent to the first major surface of the film.
11. The film construction according to any of the preceding embodiments directed to film construction A, wherein when the film construction is in a vertical position, the first peak of the microstructured prismatic element is positionally located above the second peak.
12. The film construction according to any of the preceding embodiments directed to film construction A, wherein at least 50% of the microstructured prismatic elements have a first peak and a second peak.
13. The film construction according to any of the preceding embodiments directed to film construction A, wherein at least 75% of the microstructured prismatic elements have a first peak and a second peak.
14. The film construction according to any of the preceding embodiments directed to film construction A, wherein at least 90% of the microstructured prismatic elements have a first peak and a second peak.
15. The film construction according to any of the preceding embodiments directed to film construction A, wherein at least 95% of the microstructured prismatic elements have a first peak and a second peak.
16. The film construction according to any of the preceding embodiments directed to film construction A, wherein at least 98% of the microstructured prismatic elements have a first peak and a second peak.
17. The film construction according to any of the preceding embodiments directed to film construction A, wherein at least 99% of the microstructured prismatic elements have a first peak and a second peak.
18. The film construction according to any of the preceding embodiments directed to film construction A, wherein the microstructured prismatic elements are arranged in contiguous rows on the first major surface of the light redirecting film, and wherein every other microstructured prismatic element within a row has a first peak and a second peak.
19. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is an integer from 3 to 25.
20. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 3.
21. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 5.
22. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 10.
23. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 13.
24. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 15.
25. The film construction according to any of the preceding embodiments directed to film construction A, wherein the microstructured prismatic elements are arranged in contiguous rows on the first major surface of the light redirecting film, and wherein every nth microstructured prismatic element within a row has a first peak and a second peak, wherein n is 20.
26. The film construction according to any of the preceding embodiments directed to film construction A, wherein the peel strength of the construction between the light redirecting layer and the cover film is 30 gr/inch or more.
27. The film construction according to any of the preceding embodiments directed to film construction A, wherein the peel strength of the construction between the light redirecting layer and the cover film is from 30 gr/inch to 1000 gr/inch.
28. The film construction according to any of the preceding embodiments directed to film construction A, wherein the peel strength of the construction between the light redirecting layer and the cover film is from 50 gr/inch to 1000 gr/inch.
29. The film construction according to any of the preceding embodiments directed to film construction A, wherein the peel strength of the construction between the light redirecting layer and the cover film is from 100 gr/inch to 1000 gr/inch.
30. The film construction according to any of the preceding embodiments directed to film construction A, wherein the peel strength of the construction between the light redirecting layer and the cover film is from 30 gr/inch to 500 gr/inch.
31. The film construction according to any of the preceding embodiments directed to film construction A, wherein the peel strength of the construction between the light redirecting layer and the cover film is from 50 gr/inch to 500 gr/inch.

32. The film construction according to any of the preceding embodiments directed to film construction A, wherein the peel strength of the construction between the light redirecting layer and the cover film is from 100 gr/inch to 500 gr/inch.

33. The film construction according to any of the preceding embodiments directed to film construction A, wherein the peel strength of the construction between the light redirecting layer and the cover film is from 150 gr/inch to 500 gr/inch.

34. The film construction according to any of the preceding embodiments directed to film construction A, wherein the peel strength of the construction between the light redirecting layer and the cover film is from 200 gr/inch to 500 gr/inch.

35. The film construction according to any of the preceding embodiments directed to film construction A, wherein the peel strength of the construction between the light redirecting layer and the cover film is from 250 gr/inch to 500 gr/inch.

36. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 55±3 microns;
the valley angle is 72±2 degrees;
the angle alpha is 17±2 degrees; and
the angle beta is 10±2 degrees.

37. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 50±3 microns;
the height is 68±3 microns;
the valley angle is 72±2 degrees;
the angle alpha is 17±2 degrees; and
the angle beta is 10±2 degrees.

38. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 15 to 25 degrees; and
the angle beta is from 5 to 15 degrees.

39. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 40 to 72 microns;
the aspect ratio is from 1.1 to 1.3;
the valley angle is from 50 to 70 degrees;
the angle alpha is from 18 to 28 degrees; and
the angle beta is from 4 to 12 degrees.

40. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 50±3 microns;
the valley angle is 60±2 degrees;
the angle alpha is 23±2 degrees; and
the angle beta is 7±2 degrees.

41. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 61±2 microns;
the valley angle is 60±2 degrees;
the angle alpha is 23±2 degrees; and
the angle beta is 7±2 degrees.

42. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 5 to 15 degrees; and
the angle beta is from 5 to 15 degrees.

43. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 55±2 microns;
the valley angle is 72±2 degrees;
the angle alpha is 10±2 degrees; and
the angle beta is 10±2 degrees.

44. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 69±2 microns;
the valley angle is 72±2 degrees;
the angle alpha is 10±2 degrees; and
the angle beta is 10±2 degrees.

45. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.4;

the valley angle is from 60 to 80 degrees;
the angle alpha is from 10 to 25 degrees; and
the angle beta is from 5 to 16 degrees.
46. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 52±2 microns;
the valley angle is 74±2 degrees;
the angle alpha is 17±2 degrees; and
the angle beta is 12±2 degrees.
47. The film construction according to any of the preceding embodiments directed to film construction A, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 66±2 microns;
the valley angle is 74±2 degrees;
the angle alpha is 17±2 degrees; and
the angle beta is 12±2 degrees.
48. The film construction according to any of the preceding embodiments directed to film construction A, wherein H1>H2>H3>0 microns, and wherein H3 is less than 10 microns.
49. The film construction according to any of the preceding embodiments directed to film construction A, wherein H1>H2>H3>0 microns, and wherein H3 is less than 8 microns.
50. The film construction according to any of the preceding embodiments directed to film construction A, wherein H1>H2>H3>0 microns, and wherein H3 is less than 6 microns.
51. The film construction according to any of the preceding embodiments directed to film construction A, wherein H1>H2>H3>0 microns, and wherein H3 is less than 4 microns.
52. The film construction according to any of the preceding embodiments directed to film construction A, wherein the first peak has an apex angle B1 and the second peak has an apex angle B2, and wherein B1<B2.
53. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate.
54. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the material of the light redirecting substrate is different from the material of plurality of microstructured prismatic elements.
55. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the material of the light redirecting substrate is the same as the material of plurality of microstructured prismatic elements.
56. The film construction according to any of the preceding embodiments directed to film construction A, wherein the material of the plurality of microstructured prismatic elements has refractive index from 1.25 to 1.65.
57. The film construction according to any of the preceding embodiments directed to film construction A, wherein the material of the plurality of microstructured prismatic elements has refractive index from 1.35 to 1.65
58. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the light redirecting substrate diffuses visible light.
59. The film construction according to any of the preceding embodiments directed to film construction A, wherein the film construction further comprises a diffuser chosen from bulk diffusers, surface diffusers, embedded diffusers, and combinations thereof
60. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the surface roughness of the second major surface of the light redirecting substrate diffuses visible light.
61. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the surface roughness of the first major surface of the light redirecting substrate diffuses visible light.
62. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer adjacent the first major surface of the light redirecting substrate.
63. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer immediately adjacent the first major surface of the light redirecting substrate.
64. The film construction according to any of the preceding embodiments directed to film construction A, wherein the film construction further comprises a diffusing layer adjacent the second major surface of the cover film.
65. The film construction according to any of the preceding embodiments directed to film construction A, wherein the film construction further comprises a diffusing layer immediately adjacent the second major surface of the cover film.
66. The film construction according to any of the preceding embodiments directed to film construction A, wherein the adhesive in the adhesive layer is chosen from a pressure sensitive adhesive, a thermoset adhesive, hot melt adhesive, a UV-curable adhesive, or a combination thereof.
67. The film construction according to any of the preceding embodiments directed to film construction A, wherein the adhesive in the adhesive layer is an UV-curable pressure sensitive adhesive.
68. The film construction according to any of the preceding embodiments directed to film construction A, wherein the adhesive layer comprises one or more UV stabilizers.
69. The film construction according to any of the preceding embodiments directed to film construction A, wherein the adhesive in the adhesive layer is an UV-curable pressure sensitive adhesive, and wherein, after the adhesive has been UV-cured, the adhesive does not creep.
70. The film construction according to any of the preceding embodiments directed to film construction A, wherein the adhesive in the adhesive layer comprises a diffusing agent.
71. The film construction according to any of the preceding embodiments directed to film construction A, wherein the adhesive in the adhesive layer comprises a diffusing agent and the diffusing agent is chosen from micro beads and nanoparticles.
72. The film construction according to any of the preceding embodiments directed to film construction A, wherein the adhesive in the adhesive layer comprises a diffusing agent and the diffusing agent is chosen from micro beads having average size from 0.1 microns to 100 microns.
73. The film construction according to any of the preceding embodiments directed to film construction A, wherein the adhesive in the adhesive layer comprises a diffusing agent and the diffusing agent is chosen from micro beads having average size from 0.5 microns to 50 microns.
74. The film construction according to any of the preceding embodiments directed to film construction A, wherein the adhesive in the adhesive layer comprises a diffusing agent and the diffusing agent is chosen from micro beads having average size from 0.7 microns to 20 microns.
75. The film construction according to any of the preceding embodiments directed to film construction A, wherein the adhesive in the adhesive layer comprises a diffusing agent and the diffusing agent is chosen from micro beads having average size from 1 micron to 5 microns.
76. The film construction according to any of the preceding embodiments directed to film construction A, wherein the adhesive in the adhesive layer comprises a diffusing agent and the diffusing agent is chosen from nanoparticles having average size from 1 nm to 100 nm.
77. The film construction according to any of the preceding embodiments directed to film construction A, wherein the adhesive in the adhesive layer comprises a diffusing agent and the diffusing agent is chosen from nanoparticles having average size from 5 nm to 50 nm.
78. The film construction according to any of the preceding embodiments directed to film construction A, wherein the adhesive in the adhesive layer comprises a diffusing agent and the diffusing agent is chosen from nanoparticles having average size from 5 nm to 30 nm.
79. The film construction according to any of the preceding embodiments directed to film construction A, wherein the adhesive in the adhesive layer comprises a diffusing agent and the diffusing agent is chosen from nanoparticles having average size from 1 nm to 20 nm.
80. The film construction according to any of the preceding embodiments directed to film construction A, wherein the thickness of the adhesive layer is from 1 micron to 30 microns.
81. The film construction according to any of the preceding embodiments directed to film construction A, wherein the thickness of the adhesive layer is from 1 micron to 20 microns.
82. The film construction according to any of the preceding embodiments directed to film construction A, wherein the thickness of the adhesive layer is from 1 micron to 10 microns.
83. The film construction according to any of the preceding embodiments directed to film construction A, wherein the thickness of the adhesive layer is from 1 micron to 5 microns.
84. The film construction according to any of the preceding embodiments directed to film construction A, wherein the thickness of the adhesive layer is from 2 micron to 10 microns.
85. The film construction according to any of the preceding embodiments directed to film construction A, wherein the first peak of one or more of the microstructured prismatic elements penetrates from 1 micron to 10 microns into the first major surface of the adhesive layer.
86. The film construction according to any of the preceding embodiments directed to film construction A, wherein the first peak of one or more of the microstructured prismatic elements penetrates from 1 micron to 8 microns into the first major surface of the adhesive layer.
87. The film construction according to any of the preceding embodiments directed to film construction A, wherein the first peak of one or more of the microstructured prismatic elements penetrates from 1 micron to 6 microns into the first major surface of the adhesive layer.
88. The film construction according to any of the preceding embodiments directed to film construction A, wherein the first peak of one or more of the microstructured prismatic elements penetrates from 1 micron to 5 microns into the first major surface of the adhesive layer.
89. The film construction according to any of the preceding embodiments directed to film construction A, wherein the first peak of one or more of the microstructured prismatic elements penetrates from 1 micron to 4 microns into the first major surface of the adhesive layer.
90. The film construction according to any of the preceding embodiments directed to film construction A, wherein the one or more of the microstructured prismatic elements have one or more curved facets.
91. The film construction according to any of the preceding embodiments directed to film construction A, wherein the film construction has a visible light transmission from 10 to 100%.
92. The film construction according to any of the preceding embodiments directed to film construction A, wherein the film construction has a visible light transmission from 20 to 100%.
93. The film construction according to any of the preceding embodiments directed to film construction A, wherein the film construction has a visible light transmission from 20 to 95%.
94. The film construction according to any of the preceding embodiments directed to film construction A, wherein the film construction has a visible light transmission from 20 to 85%.

95. The film construction according to any of the preceding embodiments directed to film construction A, wherein the film construction has a visible light transmission from 30 to 80%.
96. The film construction according to any of the preceding embodiments directed to film construction A, wherein the cover film is an optical film.
97. The film construction according to any of the preceding embodiments directed to film construction A, wherein the cover film is an infrared-reflecting film.
98. The film construction according to any of the preceding embodiments directed to film construction A, wherein the cover film diffuses visible light.
99. The film construction according to any of the preceding embodiments directed to film construction A, wherein the cover film diffuses visible light by having a diffuser chosen from bulk diffusers, surface diffusers, embedded diffusers, and combinations thereof.
100. The film construction according to any of the preceding embodiments directed to film construction A, wherein the second major surface of the cover film comprises a coating.
101. The film construction according to any of the preceding embodiments directed to film construction A, wherein the second major surface of the cover film comprises a coating chosen from hardcoats, anti-scratch coatings, low-surface energy coatings, easy-clean coatings, anti-glare coatings, and combinations thereof
102. The film construction according to any of the preceding embodiments directed to film construction A, wherein the film construction has a rectangular or square shape and the edge of at least one side is sealed with a sealing agent.
103. The film construction according to any of the preceding embodiments directed to film construction A, wherein the film construction has a rectangular or square shape and the edge of at least one side is sealed with an edge sealing tape.
104. The film construction according to any of the preceding embodiments directed to film construction A, wherein the film construction has a circular or ellipsoidal shape and the edge of the film construction is sealed all around.
105. The film construction according to any of the preceding embodiments directed to film construction A, wherein the film construction has a circular or ellipsoidal shape and at least a portion of the edge of the film construction is sealed with a sealing agent.
106. The film construction according to any of the preceding embodiments directed to film construction A, wherein the film construction has a circular or ellipsoidal shape and at least a portion of the edge of the film construction is sealed with an edge sealing tape.
107. The film construction according to any of the preceding embodiments directed to film construction A, wherein the light redirecting film comprises a light redirecting substrate having first and second major surfaces, and wherein the plurality of the microstructured prismatic elements are on the second major surface of the light redirecting substrate, and wherein the film construction further comprises a window film adhesive layer adjacent the first major surface of the light redirecting substrate.
108. The film construction according to any of the preceding embodiments directed to film construction A, wherein the film construction further comprises a window film adhesive layer adjacent the second major surface of the cover film.
109. The film construction according to any of the preceding embodiments directed to film construction A, wherein the film construction further comprises a window film adhesive layer, and the window film adhesive layer comprises one or more UV stabilizers.
110. A window film comprising a film construction as claimed as in any of the preceding embodiments directed to film construction A.
111. A glazing unit comprising a film construction as claimed as in any of the preceding embodiments directed to film construction A.

Exemplary Embodiments: Film Construction B

1. A film construction B comprising:
    a light redirecting film having a first major surface and a second major surface opposite the first major surface,
        wherein the first major surface of the light redirecting film comprises a plurality of microstructured prismatic elements,
        wherein one or more of the microstructured prismatic elements have a first peak and a second peak,
        wherein the first peak has a height H1 and the second peak has a height H2,
        wherein H3 is H1–H2, and H3 is from 1 microns to 8 microns,
    an adhesive layer comprising an adhesive, wherein the adhesive layer has a first major surface and a second major surface opposite the first major surface,
    a cover film having a first major surface and a second major surface opposite the first major surface,
    a diffusion layer,
    wherein when the film construction is in a vertical position, the first peak of the microstructured prismatic element is positionally located above the second peak,
    wherein the first peak has an apex angle B1 and the second peak has an apex angle B2, and wherein B1<B2,
    wherein the first peak of one or more of the microstructured prismatic elements penetrates at least partially into the first major surface of the adhesive layer,
    wherein the first major surface of the light redirecting film is bonded to the first major surface of the adhesive layer,
    wherein the second major surface of the adhesive layer is bonded to the first major surface of the cover film.
2. The film construction according to any of the preceding embodiments directed to film construction B, wherein the first major surface of the light redirecting film is bonded to the first major surface of the adhesive layer,
3. The film construction according to any of the preceding embodiments directed to film construction B, wherein the second major surface of the adhesive layer is bonded to the first major surface of the cover film
4. The film construction according to any of the preceding embodiments directed to film construction B, wherein H3 is from 2 microns to 8 microns.
5. The film construction according to any of the preceding embodiments directed to film construction B, wherein H3 is from 2 microns to 5 microns.
6. The film construction according to any of the preceding embodiments directed to film construction B, wherein the ratio H1/H2 is less than or equal to 5.
7 The film construction according to any of the preceding embodiments directed to film construction B, wherein the second major surface of the adhesive layer is immediately adjacent to the first major surface of the film.
8. The film construction according to any of the preceding embodiments directed to film construction B, wherein when the film construction is in a vertical position, the first peak of the microstructured prismatic element is positionally located above the second peak.
9. The film construction according to any of the preceding embodiments directed to film construction B, wherein at least 50% of the microstructured prismatic elements have a first peak and a second peak.
10. The film construction according to any of the preceding embodiments directed to film construction B, wherein at least 75% of the microstructured prismatic elements have a first peak and a second peak.
11. The film construction according to any of the preceding embodiments directed to film construction B, wherein at least 90% of the microstructured prismatic elements have a first peak and a second peak.
12. The film construction according to any of the preceding embodiments directed to film construction B, wherein at least 95% of the microstructured prismatic elements have a first peak and a second peak.
13. The film construction according to any of the preceding embodiments directed to film construction B, wherein at least 98% of the microstructured prismatic elements have a first peak and a second peak.
14. The film construction according to any of the preceding embodiments directed to film construction B, wherein at least 99% of the microstructured prismatic elements have a first peak and a second peak.
15. The film construction according to any of the preceding embodiments directed to film construction B, wherein the microstructured prismatic elements are arranged in contiguous rows on the first major surface of the light redirecting film, and wherein every other microstructured prismatic element within a row has a first peak and a second peak.
16. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is an integer from 3 to 25.
17. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 3.
18. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 5.
19. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 10.
20. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 13.
21. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 15.
22. The film construction according to any of the preceding embodiments directed to film construction B, wherein the microstructured prismatic elements are arranged in contiguous rows on the first major surface of the light redirecting film, and wherein every nth microstructured prismatic element within a row has a first peak and a second peak, wherein n is 20.
23. The film construction according to any of the preceding embodiments directed to film construction B, wherein the peel strength of the construction between the light redirecting layer and the cover film is 30 gr/inch or more.
24. The film construction according to any of the preceding embodiments directed to film construction B, wherein the peel strength of the construction between the light redirecting layer and the cover film is from 30 gr/inch to 1000 gr/inch.
25. The film construction according to any of the preceding embodiments directed to film construction B, wherein the peel strength of the construction between the light redirecting layer and the cover film is from 50 gr/inch to 1000 gr/inch.
26. The film construction according to any of the preceding embodiments directed to film construction B, wherein the peel strength of the construction between the light redirecting layer and the cover film is from 100 gr/inch to 1000 gr/inch.
27. The film construction according to any of the preceding embodiments directed to film construction B, wherein the peel strength of the construction between the light redirecting layer and the cover film is from 30 gr/inch to 500 gr/inch.
28. The film construction according to any of the preceding embodiments directed to film construction B, wherein the peel strength of the construction between the light redirecting layer and the cover film is from 50 gr/inch to 500 gr/inch.
29. The film construction according to any of the preceding embodiments directed to film construction B, wherein the peel strength of the construction between the light redirecting layer and the cover film is from 100 gr/inch to 500 gr/inch.
30. The film construction according to any of the preceding embodiments directed to film construction B, wherein the peel strength of the construction between the light redirecting layer and the cover film is from 150 gr/inch to 500 gr/inch.
31. The film construction according to any of the preceding embodiments directed to film construction B, wherein the peel strength of the construction between the light redirecting layer and the cover film is from 200 gr/inch to 500 gr/inch.
32. The film construction according to any of the preceding embodiments directed to film construction B, wherein the peel strength of the construction between the light redirecting layer and the cover film is from 250 gr/inch to 500 gr/inch.
33. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 55±3 microns;
the valley angle is 72±2 degrees;
the angle alpha is 17±2 degrees; and
the angle beta is 10±2 degrees.

34. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 50±3 microns;
the height is 68±3 microns;
the valley angle is 72±2 degrees;
the angle alpha is 17±2 degrees; and
the angle beta is 10±2 degrees.

35. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 15 to 25 degrees; and
the angle beta is from 5 to 15 degrees.

36. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 40 to 72 microns;
the aspect ratio is from 1.1 to 1.3;
the valley angle is from 50 to 70 degrees;
the angle alpha is from 18 to 28 degrees; and
the angle beta is from 4 to 12 degrees.

37. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 50±3 microns;
the valley angle is 60±2 degrees;
the angle alpha is 23±2 degrees; and
the angle beta is 7±2 degrees.

38. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 61±2 microns;
the valley angle is 60±2 degrees;
the angle alpha is 23±2 degrees; and
the angle beta is 7±2 degrees.

39. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 5 to 15 degrees; and
the angle beta is from 5 to 15 degrees.

40. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 55±2 microns;
the valley angle is 72±2 degrees;
the angle alpha is 10±2 degrees; and
the angle beta is 10±2 degrees.

41. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 69±2 microns;
the valley angle is 72±2 degrees;
the angle alpha is 10±2 degrees; and
the angle beta is 10±2 degrees.

42. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.4;
the valley angle is from 60 to 80 degrees;
the angle alpha is from 10 to 25 degrees; and
the angle beta is from 5 to 16 degrees.

43. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 52±2 microns;
the valley angle is 74±2 degrees;
the angle alpha is 17±2 degrees; and
the angle beta is 12±2 degrees.

44. The film construction according to any of the preceding embodiments directed to film construction B, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 66±2 microns;
the valley angle is 74±2 degrees;
the angle alpha is 17±2 degrees; and the angle beta is 12±2 degrees.
45. The film construction according to any of the preceding embodiments directed to film construction B, wherein H1>H2>H3>0 microns, and wherein H3 is less than 10 microns.
46. The film construction according to any of the preceding embodiments directed to film construction B, wherein H1>H2>H3>0 microns, and wherein H3 is less than 8 microns.
47. The film construction according to any of the preceding embodiments directed to film construction B, wherein H1>H2>H3>0 microns, and wherein H3 is less than 6 microns.
48. The film construction according to any of the preceding embodiments directed to film construction B, wherein H1>H2>H3>0 microns, and wherein H3 is less than 4 microns.
49. The film construction according to any of the preceding embodiments directed to film construction B, wherein the first peak has an apex angle B1 and the second peak has an apex angle B2, and wherein B1<B2.
50. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate.
51. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the material of the light redirecting substrate is different from the material of plurality of microstructured prismatic elements.
52. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the material of the light redirecting substrate is the same as the material of plurality of microstructured prismatic elements.
53. The film construction according to any of the preceding embodiments directed to film construction B, wherein the material of the plurality of microstructured prismatic elements has refractive index from 1.25 to 1.65.
54. The film construction according to any of the preceding embodiments directed to film construction B, wherein the material of the plurality of microstructured prismatic elements has refractive index from 1.35 to 1.65
55. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the light redirecting substrate diffuses visible light.
56. The film construction according to any of the preceding embodiments directed to film construction B, wherein the film construction further comprises a diffuser chosen from bulk diffusers, surface diffusers, embedded diffusers, and combinations thereof.
57. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the surface roughness of the second major surface of the light redirecting substrate diffuses visible light.
58. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the surface roughness of the first major surface of the light redirecting substrate diffuses visible light.
59. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer adjacent the first major surface of the light redirecting substrate.
60. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer immediately adjacent the first major surface of the light redirecting substrate.
61. The film construction according to any of the preceding embodiments directed to film construction B, wherein the film construction further comprises a diffusing layer adjacent the second major surface of the cover film.
62. The film construction according to any of the preceding embodiments directed to film construction B, wherein the film construction further comprises a diffusing layer immediately adjacent the second major surface of the cover film.
63. The film construction according to any of the preceding embodiments directed to film construction B, wherein the adhesive in the adhesive layer is chosen from a pressure sensitive adhesive, a thermoset adhesive, hot melt adhesive, a UV-curable adhesive, or a combination thereof.
64. The film construction according to any of the preceding embodiments directed to film construction B, wherein the adhesive in the adhesive layer is an UV-curable pressure sensitive adhesive.
65. The film construction according to any of the preceding embodiments directed to film construction B, wherein the adhesive layer comprises one or more UV stabilizers.
66. The film construction according to any of the preceding embodiments directed to film construction B, wherein the adhesive in the adhesive layer is an UV-curable pressure sensitive adhesive, and wherein, after the adhesive has been UV-cured, the adhesive does not creep.
67. The film construction according to any of the preceding embodiments directed to film construction B, wherein the adhesive in the adhesive layer comprises a diffusing agent.

68. The film construction according to any of the preceding embodiments directed to film construction B, wherein the adhesive in the adhesive layer comprises a diffusing agent and the diffusing agent is chosen from micro beads and nanoparticles.
69. The film construction according to any of the preceding embodiments directed to film construction B, wherein the adhesive in the adhesive layer comprises a diffusing agent and the diffusing agent is chosen from micro beads having average size from 0.1 microns to 100 microns.
70. The film construction according to any of the preceding embodiments directed to film construction B, wherein the adhesive in the adhesive layer comprises a diffusing agent and the diffusing agent is chosen from micro beads having average size from 0.5 microns to 50 microns.
71. The film construction according to any of the preceding embodiments directed to film construction B, wherein the adhesive in the adhesive layer comprises a diffusing agent and the diffusing agent is chosen from micro beads having average size from 0.7 microns to 20 microns.
72. The film construction according to any of the preceding embodiments directed to film construction B, wherein the adhesive in the adhesive layer comprises a diffusing agent and the diffusing agent is chosen from micro beads having average size from 1 micron to 5 microns.
73. The film construction according to any of the preceding embodiments directed to film construction B, wherein the adhesive in the adhesive layer comprises a diffusing agent and the diffusing agent is chosen from nanoparticles having average size from 1 nm to 100 nm.
74. The film construction according to any of the preceding embodiments directed to film construction B, wherein the adhesive in the adhesive layer comprises a diffusing agent and the diffusing agent is chosen from nanoparticles having average size from 5 nm to 50 nm.
75. The film construction according to any of the preceding embodiments directed to film construction B, wherein the adhesive in the adhesive layer comprises a diffusing agent and the diffusing agent is chosen from nanoparticles having average size from 5 nm to 30 nm.
76. The film construction according to any of the preceding embodiments directed to film construction B, wherein the adhesive in the adhesive layer comprises a diffusing agent and the diffusing agent is chosen from nanoparticles having average size from 1 nm to 20 nm.
77. The film construction according to any of the preceding embodiments directed to film construction B, wherein the thickness of the adhesive layer is from 1 micron to 30 microns.
78. The film construction according to any of the preceding embodiments directed to film construction B, wherein the thickness of the adhesive layer is from 1 micron to 20 microns.
79. The film construction according to any of the preceding embodiments directed to film construction B, wherein the thickness of the adhesive layer is from 1 micron to 10 microns.
80. The film construction according to any of the preceding embodiments directed to film construction B, wherein the thickness of the adhesive layer is from 1 micron to 5 microns.
81. The film construction according to any of the preceding embodiments directed to film construction B, wherein the thickness of the adhesive layer is from 2 micron to 10 microns.
82. The film construction according to any of the preceding embodiments directed to film construction B, wherein the first peak of one or more of the microstructured prismatic elements penetrates from 1 micron to 10 microns into the first major surface of the adhesive layer.
83. The film construction according to any of the preceding embodiments directed to film construction B, wherein the first peak of one or more of the microstructured prismatic elements penetrates from 1 micron to 8 microns into the first major surface of the adhesive layer.
84. The film construction according to any of the preceding embodiments directed to film construction B, wherein the first peak of one or more of the microstructured prismatic elements penetrates from 1 micron to 6 microns into the first major surface of the adhesive layer.
85. The film construction according to any of the preceding embodiments directed to film construction B, wherein the first peak of one or more of the microstructured prismatic elements penetrates from 1 micron to 5 microns into the first major surface of the adhesive layer.
86. The film construction according to any of the preceding embodiments directed to film construction B, wherein the first peak of one or more of the microstructured prismatic elements penetrates from 1 micron to 4 microns into the first major surface of the adhesive layer.
87. The film construction according to any of the preceding embodiments directed to film construction B, wherein the one or more of the microstructured prismatic elements have one or more curved facets.
88. The film construction according to any of the preceding embodiments directed to film construction B, wherein the film construction has a visible light transmission from 10 to 100%.
89. The film construction according to any of the preceding embodiments directed to film construction B, wherein the film construction has a visible light transmission from 20 to 100%.
90. The film construction according to any of the preceding embodiments directed to film construction B, wherein the film construction has a visible light transmission from 20 to 95%.
91. The film construction according to any of the preceding embodiments directed to film construction B, wherein the film construction has a visible light transmission from 20 to 85%.
92. The film construction according to any of the preceding embodiments directed to film construction B, wherein the film construction has a visible light transmission from 30 to 80%.
93. The film construction according to any of the preceding embodiments directed to film construction B, wherein the cover film is an optical film.
94. The film construction according to any of the preceding embodiments directed to film construction B, wherein the cover film is an infrared-reflecting film.
95. The film construction according to any of the preceding embodiments directed to film construction B, wherein the cover film diffuses visible light.
96. The film construction according to any of the preceding embodiments directed to film construction B, wherein the cover film diffuses visible light by having a diffuser chosen from bulk diffusers, surface diffusers, embedded diffusers, and combinations thereof.
97. The film construction according to any of the preceding embodiments directed to film construction B, wherein the second major surface of the cover film comprises a coating.
98. The film construction according to any of the preceding embodiments directed to film construction B, wherein the second major surface of the cover film comprises a coating chosen from hardcoats, anti-scratch coatings, low-surface energy coatings, easy-clean coatings, anti-glare coatings, and combinations thereof.

99. The film construction according to any of the preceding embodiments directed to film construction B, wherein the film construction has a rectangular or square shape and the edge of at least one side is sealed with a sealing agent.

100. The film construction according to any of the preceding embodiments directed to film construction B, wherein the film construction has a rectangular or square shape and the edge of at least one side is sealed with an edge sealing tape.

101. The film construction according to any of the preceding embodiments directed to film construction B, wherein the film construction has a circular or ellipsoidal shape and the edge of the film construction is sealed all around.

102. The film construction according to any of the preceding embodiments directed to film construction B, wherein the film construction has a circular or ellipsoidal shape and at least a portion of the edge of the film construction is sealed with a sealing agent.

103. The film construction according to any of the preceding embodiments directed to film construction B, wherein the film construction has a circular or ellipsoidal shape and at least a portion of the edge of the film construction is sealed with an edge sealing tape.

104. The film construction according to any of the preceding embodiments directed to film construction B, wherein the light redirecting film comprises a light redirecting substrate having first and second major surfaces, and wherein the plurality of the microstructured prismatic elements are on the second major surface of the light redirecting substrate, and wherein the film construction further comprises a window film adhesive layer adjacent the first major surface of the light redirecting substrate.

105. The film construction according to any of the preceding embodiments directed to film construction B, wherein the film construction further comprises a window film adhesive layer adjacent the second major surface of the cover film.

106. The film construction according to any of the preceding embodiments directed to film construction B, wherein the film construction further comprises a window film adhesive layer, and the window film adhesive layer comprises one or more UV stabilizers.

107. A window film comprising a film construction as claimed as in any of the preceding embodiments directed to film construction B.

108. A glazing unit comprising a film construction as claimed as in any of the preceding embodiments directed to film construction B.

Exemplary Embodiments: Film Construction C

1. A film construction C comprising:
    a light redirecting film having a first major surface and a second major surface opposite the first major surface, wherein the first major surface of the light redirecting film comprises a plurality of microstructured prismatic elements,
        wherein one or more of the microstructured prismatic elements have a first peak, a second peak, and a third peak,
        wherein the first peak has a height H1, the second peak has a height H2, the third peak has a height H3, wherein H1>H2 and H1>H3,
        wherein H4 is H1−H2, and H5 is H1−H3, and wherein H4 is from 1 microns to 10 microns and H5 is from 1 microns to 10 microns,
    an adhesive layer comprising an adhesive, wherein the adhesive layer has a first major surface and a second major surface opposite the first major surface,
    a cover film having a first major surface and a second major surface opposite the first major surface,
    wherein when the film construction is in a vertical position, the first peak of the microstructured prismatic element is: a) positionally located above the second peak, b) positionally located above the third peak, or positionally located above both the second peak and the third peak,
    wherein the first peak has an apex angle B1, the second peak has an apex angle B2, and the third peak has an apex angle B3, wherein B1<B2 and B1<B3,
    wherein the first peak of one or more of the microstructured prismatic elements penetrates at least partially into the first major surface of the adhesive layer,
    wherein the first major surface of the light redirecting film is bonded to the first major surface of the adhesive layer,
    wherein the second major surface of the adhesive layer is bonded to the first major surface of the cover film.

2. The film construction according to any of the preceding embodiments directed to film construction C, wherein H3 is from 1 micron to 30 microns.

3. The film construction according to any of the preceding embodiments directed to film construction C, wherein H3 is from 1 micron to 20 microns.

4. The film construction according to any of the preceding embodiments directed to film construction C, wherein H3 is from 1 micron to 10 microns.

5. The film construction according to any of the preceding embodiments directed to film construction C, wherein the first major surface of the light redirecting film is bonded to the first major surface of the adhesive layer, 6. The film construction according to any of the preceding embodiments directed to film construction C, wherein the second major surface of the adhesive layer is bonded to the first major surface of the cover film 7. The film construction according to any of the preceding embodiments directed to film construction C, wherein H3 is from 2 microns to 8 microns.

8. The film construction according to any of the preceding embodiments directed to film construction C, wherein H3 is from 2 microns to 5 microns.

9. The film construction according to any of the preceding embodiments directed to film construction C, wherein the ratio H1/H2 is less than or equal to 5.

10. The film construction according to any of the preceding embodiments directed to film construction C, wherein the second major surface of the adhesive layer is immediately adjacent to the first major surface of the film.

11. The film construction according to any of the preceding embodiments directed to film construction C, wherein when the film construction is in a vertical position, the first peak of the microstructured prismatic element is positionally located above the second peak.

12. The film construction according to any of the preceding embodiments directed to film construction C, wherein at least 50% of the microstructured prismatic elements have a first peak and a second peak.

13. The film construction according to any of the preceding embodiments directed to film construction C, wherein at least 75% of the microstructured prismatic elements have a first peak and a second peak.

14. The film construction according to any of the preceding embodiments directed to film construction C, wherein at least 90% of the microstructured prismatic elements have a first peak and a second peak.
15. The film construction according to any of the preceding embodiments directed to film construction C, wherein at least 95% of the microstructured prismatic elements have a first peak and a second peak.
16. The film construction according to any of the preceding embodiments directed to film construction C, wherein at least 98% of the microstructured prismatic elements have a first peak and a second peak.
17. The film construction according to any of the preceding embodiments directed to film construction C, wherein at least 99% of the microstructured prismatic elements have a first peak and a second peak.
18. The film construction according to any of the preceding embodiments directed to film construction C, wherein the microstructured prismatic elements are arranged in contiguous rows on the first major surface of the light redirecting film, and wherein every other microstructured prismatic element within a row has a first peak and a second peak.
19. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is an integer from 3 to 25.
20. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 3.
21. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 5.
22. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 10.
23. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 13.
24. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 15.
25. The film construction according to any of the preceding embodiments directed to film construction C, wherein the microstructured prismatic elements are arranged in contiguous rows on the first major surface of the light redirecting film, and wherein every nth microstructured prismatic element within a row has a first peak and a second peak, wherein n is 20.
26. The film construction according to any of the preceding embodiments directed to film construction C, wherein the peel strength of the construction between the light redirecting layer and the cover film is 30 gr/inch or more.
27. The film construction according to any of the preceding embodiments directed to film construction C, wherein the peel strength of the construction between the light redirecting layer and the cover film is from 30 gr/inch to 1000 gr/inch.
28. The film construction according to any of the preceding embodiments directed to film construction C, wherein the peel strength of the construction between the light redirecting layer and the cover film is from 50 gr/inch to 1000 gr/inch.
29. The film construction according to any of the preceding embodiments directed to film construction C, wherein the peel strength of the construction between the light redirecting layer and the cover film is from 100 gr/inch to 1000 gr/inch.
30. The film construction according to any of the preceding embodiments directed to film construction C, wherein the peel strength of the construction between the light redirecting layer and the cover film is from 30 gr/inch to 500 gr/inch.
31. The film construction according to any of the preceding embodiments directed to film construction C, wherein the peel strength of the construction between the light redirecting layer and the cover film is from 50 gr/inch to 500 gr/inch.
32. The film construction according to any of the preceding embodiments directed to film construction C, wherein the peel strength of the construction between the light redirecting layer and the cover film is from 100 gr/inch to 500 gr/inch.
33. The film construction according to any of the preceding embodiments directed to film construction C, wherein the peel strength of the construction between the light redirecting layer and the cover film is from 150 gr/inch to 500 gr/inch.
34. The film construction according to any of the preceding embodiments directed to film construction C, wherein the peel strength of the construction between the light redirecting layer and the cover film is from 200 gr/inch to 500 gr/inch.
35. The film construction according to any of the preceding embodiments directed to film construction C, wherein the peel strength of the construction between the light redirecting layer and the cover film is from 250 gr/inch to 500 gr/inch.
36. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 55±3 microns;
the valley angle is 72±2 degrees;
the angle alpha is 17±2 degrees; and
the angle beta is 10±2 degrees.
37. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 50±3 microns;
the height is 68±3 microns;
the valley angle is 72±2 degrees;
the angle alpha is 17±2 degrees; and
the angle beta is 10±2 degrees.

38. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 15 to 25 degrees; and
the angle beta is from 5 to 15 degrees.

39. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 40 to 72 microns;
the aspect ratio is from 1.1 to 1.3;
the valley angle is from 50 to 70 degrees;
the angle alpha is from 18 to 28 degrees; and
the angle beta is from 4 to 12 degrees.

40. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 50±3 microns;
the valley angle is 60±2 degrees;
the angle alpha is 23±2 degrees; and
the angle beta is 7±2 degrees.

41. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 61±2 microns;
the valley angle is 60±2 degrees;
the angle alpha is 23±2 degrees; and
the angle beta is 7±2 degrees.

42. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 5 to 15 degrees; and
the angle beta is from 5 to 15 degrees.

43. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 55±2 microns;
the valley angle is 72±2 degrees;
the angle alpha is 10±2 degrees; and
the angle beta is 10±2 degrees.

44. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 69±2 microns;
the valley angle is 72±2 degrees;
the angle alpha is 10±2 degrees; and
the angle beta is 10±2 degrees.

45. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.4;
the valley angle is from 60 to 80 degrees;
the angle alpha is from 10 to 25 degrees; and
the angle beta is from 5 to 16 degrees.

46. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 52±2 microns;
the valley angle is 74±2 degrees;
the angle alpha is 17±2 degrees; and
the angle beta is 12±2 degrees.

47. The film construction according to any of the preceding embodiments directed to film construction C, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 66±2 microns;
the valley angle is 74±2 degrees;
the angle alpha is 17±2 degrees; and
the angle beta is 12±2 degrees.

48. The film construction according to any of the preceding embodiments directed to film construction C, wherein H1>H2>H3>0 microns, and wherein H3 is less than 10 microns.

49. The film construction according to any of the preceding embodiments directed to film construction C, wherein H1>H2>H3>0 microns, and wherein H3 is less than 8 microns.

50. The film construction according to any of the preceding embodiments directed to film construction C, wherein H1>H2>H3>0 microns, and wherein H3 is less than 6 microns.
51. The film construction according to any of the preceding embodiments directed to film construction C, wherein H1>H2>H3>0 microns, and wherein H3 is less than 4 microns.
52. The film construction according to any of the preceding embodiments directed to film construction C, wherein the first peak has an apex angle B1 and the second peak has an apex angle B2, and wherein B1<B2.
53. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate.
54. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the material of the light redirecting substrate is different from the material of plurality of microstructured prismatic elements.
55. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the material of the light redirecting substrate is the same as the material of plurality of microstructured prismatic elements.
56. The film construction according to any of the preceding embodiments directed to film construction C, wherein the material of the plurality of microstructured prismatic elements has refractive index from 1.25 to 1.65.
57. The film construction according to any of the preceding embodiments directed to film construction C, wherein the material of the plurality of microstructured prismatic elements has refractive index from 1.35 to 1.65
58. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the light redirecting substrate diffuses visible light.
59. The film construction according to any of the preceding embodiments directed to film construction C, wherein the film construction further comprises a diffuser chosen from bulk diffusers, surface diffusers, embedded diffusers, and combinations thereof
60. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the surface roughness of the second major surface of the light redirecting substrate diffuses visible light.
61. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the surface roughness of the first major surface of the light redirecting substrate diffuses visible light.
62. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer adjacent the first major surface of the light redirecting substrate.
63. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer immediately adjacent the first major surface of the light redirecting substrate.
64. The film construction according to any of the preceding embodiments directed to film construction C, wherein the film construction further comprises a diffusing layer adjacent the second major surface of the cover film.
65. The film construction according to any of the preceding embodiments directed to film construction C, wherein the film construction further comprises a diffusing layer immediately adjacent the second major surface of the cover film.
66. The film construction according to any of the preceding embodiments directed to film construction C, wherein the adhesive in the adhesive layer is chosen from a pressure sensitive adhesive, a thermoset adhesive, hot melt adhesive, a UV-curable adhesive, or a combination thereof
67. The film construction according to any of the preceding embodiments directed to film construction C, wherein the adhesive in the adhesive layer is an UV-curable pressure sensitive adhesive.
68. The film construction according to any of the preceding embodiments directed to film construction C, wherein the adhesive layer comprises one or more UV stabilizers.
69. The film construction according to any of the preceding embodiments directed to film construction C, wherein the adhesive in the adhesive layer is an UV-curable pressure sensitive adhesive, and wherein, after the adhesive has been UV-cured, the adhesive does not creep.
70. The film construction according to any of the preceding embodiments directed to film construction C, wherein the adhesive in the adhesive layer comprises a diffusing agent.
71. The film construction according to any of the preceding embodiments directed to film construction C, wherein the adhesive in the adhesive layer comprises a diffusing agent and the diffusing agent is chosen from micro beads and nanoparticles.
72. The film construction according to any of the preceding embodiments directed to film construction C, wherein the adhesive in the adhesive layer comprises a diffusing agent and the diffusing agent is chosen from micro beads having average size from 0.1 microns to 100 microns.

73. The film construction according to any of the preceding embodiments directed to film construction C, wherein the adhesive in the adhesive layer comprises a diffusing agent and the diffusing agent is chosen from micro beads having average size from 0.5 microns to 50 microns.
74. The film construction according to any of the preceding embodiments directed to film construction C, wherein the adhesive in the adhesive layer comprises a diffusing agent and the diffusing agent is chosen from micro beads having average size from 0.7 microns to 20 microns.
75. The film construction according to any of the preceding embodiments directed to film construction C, wherein the adhesive in the adhesive layer comprises a diffusing agent and the diffusing agent is chosen from micro beads having average size from 1 micron to 5 microns.
76. The film construction according to any of the preceding embodiments directed to film construction C, wherein the adhesive in the adhesive layer comprises a diffusing agent and the diffusing agent is chosen from nanoparticles having average size from 1 nm to 100 nm.
77. The film construction according to any of the preceding embodiments directed to film construction C, wherein the adhesive in the adhesive layer comprises a diffusing agent and the diffusing agent is chosen from nanoparticles having average size from 5 nm to 50 nm.
78. The film construction according to any of the preceding embodiments directed to film construction C, wherein the adhesive in the adhesive layer comprises a diffusing agent and the diffusing agent is chosen from nanoparticles having average size from 5 nm to 30 nm.
79. The film construction according to any of the preceding embodiments directed to film construction C, wherein the adhesive in the adhesive layer comprises a diffusing agent and the diffusing agent is chosen from nanoparticles having average size from 1 nm to 20 nm.
80. The film construction according to any of the preceding embodiments directed to film construction C, wherein the thickness of the adhesive layer is from 1 micron to 30 microns.
81. The film construction according to any of the preceding embodiments directed to film construction C, wherein the thickness of the adhesive layer is from 1 micron to 20 microns.
82. The film construction according to any of the preceding embodiments directed to film construction C, wherein the thickness of the adhesive layer is from 1 micron to 10 microns.
83. The film construction according to any of the preceding embodiments directed to film construction C, wherein the thickness of the adhesive layer is from 1 micron to 5 microns.
84. The film construction according to any of the preceding embodiments directed to film construction C, wherein the thickness of the adhesive layer is from 2 micron to 10 microns.
85. The film construction according to any of the preceding embodiments directed to film construction C, wherein the first peak of one or more of the microstructured prismatic elements penetrates from 1 micron to 10 microns into the first major surface of the adhesive layer.
86. The film construction according to any of the preceding embodiments directed to film construction C, wherein the first peak of one or more of the microstructured prismatic elements penetrates from 1 micron to 8 microns into the first major surface of the adhesive layer.
87. The film construction according to any of the preceding embodiments directed to film construction C, wherein the first peak of one or more of the microstructured prismatic elements penetrates from 1 micron to 6 microns into the first major surface of the adhesive layer.
88. The film construction according to any of the preceding embodiments directed to film construction C, wherein the first peak of one or more of the microstructured prismatic elements penetrates from 1 micron to 5 microns into the first major surface of the adhesive layer.
89. The film construction according to any of the preceding embodiments directed to film construction C, wherein the first peak of one or more of the microstructured prismatic elements penetrates from 1 micron to 4 microns into the first major surface of the adhesive layer.
90. The film construction according to any of the preceding embodiments directed to film construction C, wherein the one or more of the microstructured prismatic elements have one or more curved facets.
91. The film construction according to any of the preceding embodiments directed to film construction C, wherein the film construction has a visible light transmission from 10 to 100%.
92. The film construction according to any of the preceding embodiments directed to film construction C, wherein the film construction has a visible light transmission from 20 to 100%.
93. The film construction according to any of the preceding embodiments directed to film construction C, wherein the film construction has a visible light transmission from 20 to 95%.
94. The film construction according to any of the preceding embodiments directed to film construction C, wherein the film construction has a visible light transmission from 20 to 85%.
95. The film construction according to any of the preceding embodiments directed to film construction C, wherein the film construction has a visible light transmission from 30 to 80%.
96. The film construction according to any of the preceding embodiments directed to film construction C, wherein the cover film is an optical film.
97. The film construction according to any of the preceding embodiments directed to film construction C, wherein the cover film is an infrared-reflecting film.
98. The film construction according to any of the preceding embodiments directed to film construction C, wherein the cover film diffuses visible light.
99. The film construction according to any of the preceding embodiments directed to film construction C, wherein the cover film diffuses visible light by having a diffuser chosen from bulk diffusers, surface diffusers, embedded diffusers, and combinations thereof
100. The film construction according to any of the preceding embodiments directed to film construction C, wherein the second major surface of the cover film comprises a coating.
101. The film construction according to any of the preceding embodiments directed to film construction C, wherein the second major surface of the cover film comprises a coating chosen from hardcoats, anti-scratch coatings, low-surface energy coatings, easy-clean coatings, anti-glare coatings, and combinations thereof.
102. The film construction according to any of the preceding embodiments directed to film construction C, wherein the film construction has a rectangular or square shape and the edge of at least one side is sealed with a sealing agent.
103. The film construction according to any of the preceding embodiments directed to film construction C, wherein the film construction has a rectangular or square shape and the edge of at least one side is sealed with an edge sealing tape.
104. The film construction according to any of the preceding embodiments directed to film construction C, wherein the film construction has a circular or ellipsoidal shape and the edge of the film construction is sealed all around.
105. The film construction according to any of the preceding embodiments directed to film construction C, wherein the film construction has a circular or ellipsoidal shape and at least a portion of the edge of the film construction is sealed with a sealing agent.
106. The film construction according to any of the preceding embodiments directed to film construction C, wherein the film construction has a circular or ellipsoidal shape and at least a portion of the edge of the film construction is sealed with an edge sealing tape.
107. The film construction according to any of the preceding embodiments directed to film construction C, wherein the light redirecting film comprises a light redirecting substrate having first and second major surfaces, and wherein the plurality of the microstructured prismatic elements are on the second major surface of the light redirecting substrate, and wherein the film construction further comprises a window film adhesive layer adjacent the first major surface of the light redirecting substrate.
108. The film construction according to any of the preceding embodiments directed to film construction C, wherein the film construction further comprises a window film adhesive layer adjacent the second major surface of the cover film.
109. The film construction according to any of the preceding embodiments directed to film construction C, wherein the film construction further comprises a window film adhesive layer, and the window film adhesive layer comprises one or more UV stabilizers.
110. A window film comprising a film construction as claimed as in any of the preceding embodiments directed to film construction C.
111. A glazing unit comprising a film construction as claimed as in any of the preceding embodiments directed to film construction C.

Exemplary Embodiments: Film Construction D

1. A film construction D comprising:
   a light redirecting film having a first major surface and a second major surface opposite the first major surface, wherein the first major surface of the light redirecting film comprises a plurality of microstructured prismatic elements,
   wherein one or more of the microstructured prismatic elements have three or more peaks,
   wherein each of the peaks has a height,
   wherein the first peak has a height larger than the height of each of the rest of the peaks,
   wherein the difference between the height of the first peak and the height of each of the rest of the peaks is, independently from each other, from 2 microns to 10 microns,
   an adhesive layer comprising an adhesive, wherein the adhesive layer has a first major surface and a second major surface opposite the first major surface,
   a cover film having a first major surface and a second major surface opposite the first major surface,
   wherein when the film construction is in a vertical position, the first peak of the microstructured prismatic element is positionally located above at least one of the rest of the peaks,
   wherein each of the peaks has an apex angle, and wherein the apex angle of the first peak is smaller than the apex angle of each of the rest apex angles,
   wherein the first peak of one or more of the microstructured prismatic elements penetrates at least partially into the first major surface of the adhesive layer,
   wherein the first major surface of the light redirecting film is bonded to the first major surface of the adhesive layer,
   wherein the second major surface of the adhesive layer is bonded to the first major surface of the cover film.
2. The film construction according to any of the preceding embodiments directed to film construction D, wherein the first major surface of the light redirecting film is bonded to the first major surface of the adhesive layer,
3. The film construction according to any of the preceding embodiments directed to film construction D, wherein the second major surface of the adhesive layer is bonded to the first major surface of the cover film
4. The film construction according to any of the preceding embodiments directed to film construction D, wherein H3 is from 2 microns to 8 microns.
5. The film construction according to any of the preceding embodiments directed to film construction D, wherein H3 is from 2 microns to 5 microns.
6. The film construction according to any of the preceding embodiments directed to film construction D, wherein the ratio H1/H2 is less than or equal to 5.
7. The film construction according to any of the preceding embodiments directed to film construction D, wherein the second major surface of the adhesive layer is immediately adjacent to the first major surface of the film.
8. The film construction according to any of the preceding embodiments directed to film construction D, wherein when the film construction is in a vertical position, the first peak of the microstructured prismatic element is positionally located above the second peak.
9. The film construction according to any of the preceding embodiments directed to film construction D, wherein at least 50% of the microstructured prismatic elements have a first peak and a second peak.
10. The film construction according to any of the preceding embodiments directed to film construction D, wherein at least 75% of the microstructured prismatic elements have a first peak and a second peak.
11. The film construction according to any of the preceding embodiments directed to film construction D, wherein at least 90% of the microstructured prismatic elements have a first peak and a second peak.
12. The film construction according to any of the preceding embodiments directed to film construction D, wherein at least 95% of the microstructured prismatic elements have a first peak and a second peak.
13. The film construction according to any of the preceding embodiments directed to film construction D, wherein at least 98% of the microstructured prismatic elements have a first peak and a second peak.
14. The film construction according to any of the preceding embodiments directed to film construction D, wherein at least 99% of the microstructured prismatic elements have a first peak and a second peak.
15. The film construction according to any of the preceding embodiments directed to film construction D, wherein the microstructured prismatic elements are arranged in contiguous rows on the first major surface of the light redirecting film, and wherein every other microstructured prismatic element within a row has a first peak and a second peak.

16. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is an integer from 3 to 25.

17. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 3.

18. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 5.

19. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 10.

20. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 13.

21. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 15.

22. The film construction according to any of the preceding embodiments directed to film construction D, wherein the microstructured prismatic elements are arranged in contiguous rows on the first major surface of the light redirecting film, and wherein every nth microstructured prismatic element within a row has a first peak and a second peak, wherein n is 20.

23. The film construction according to any of the preceding embodiments directed to film construction D, wherein the peel strength of the construction between the light redirecting layer and the cover film is 30 gr/inch or more.

24. The film construction according to any of the preceding embodiments directed to film construction D, wherein the peel strength of the construction between the light redirecting layer and the cover film is from 30 gr/inch to 1000 gr/inch.

25. The film construction according to any of the preceding embodiments directed to film construction D, wherein the peel strength of the construction between the light redirecting layer and the cover film is from 50 gr/inch to 1000 gr/inch.

26. The film construction according to any of the preceding embodiments directed to film construction D, wherein the peel strength of the construction between the light redirecting layer and the cover film is from 100 gr/inch to 1000 gr/inch.

27. The film construction according to any of the preceding embodiments directed to film construction D, wherein the peel strength of the construction between the light redirecting layer and the cover film is from 30 gr/inch to 500 gr/inch.

28. The film construction according to any of the preceding embodiments directed to film construction D, wherein the peel strength of the construction between the light redirecting layer and the cover film is from 50 gr/inch to 500 gr/inch.

29. The film construction according to any of the preceding embodiments directed to film construction D, wherein the peel strength of the construction between the light redirecting layer and the cover film is from 100 gr/inch to 500 gr/inch.

30. The film construction according to any of the preceding embodiments directed to film construction D, wherein the peel strength of the construction between the light redirecting layer and the cover film is from 150 gr/inch to 500 gr/inch.

31. The film construction according to any of the preceding embodiments directed to film construction D, wherein the peel strength of the construction between the light redirecting layer and the cover film is from 200 gr/inch to 500 gr/inch.

32. The film construction according to any of the preceding embodiments directed to film construction D, wherein the peel strength of the construction between the light redirecting layer and the cover film is from 250 gr/inch to 500 gr/inch.

33. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 55±3 microns;
the valley angle is 72±2 degrees;
the angle alpha is 17±2 degrees; and
the angle beta is 10±2 degrees.

34. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 50±3 microns;
the height is 68±3 microns;
the valley angle is 72±2 degrees;
the angle alpha is 17±2 degrees; and
the angle beta is 10±2 degrees.

35. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;

the angle alpha is from 15 to 25 degrees; and
the angle beta is from 5 to 15 degrees.
36. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 40 to 72 microns;
the aspect ratio is from 1.1 to 1.3;
the valley angle is from 50 to 70 degrees;
the angle alpha is from 18 to 28 degrees; and
the angle beta is from 4 to 12 degrees.
37. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 40±3 microns;
the height is 50±3 microns;
the valley angle is 60±2 degrees;
the angle alpha is 23±2 degrees; and
the angle beta is 7±2 degrees.
38. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 61±2 microns;
the valley angle is 60±2 degrees;
the angle alpha is 23±2 degrees; and
the angle beta is 7±2 degrees.
39. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.5;
the valley angle is from 60 to 80 degrees;
the angle alpha is from 5 to 15 degrees; and
the angle beta is from 5 to 15 degrees.
40. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 55±2 microns;
the valley angle is 72±2 degrees;
the angle alpha is 10±2 degrees; and
the angle beta is 10±2 degrees.
41. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 69±2 microns;
the valley angle is 72±2 degrees;
the angle alpha is 10±2 degrees; and
the angle beta is 10±2 degrees.
42. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is from 35 to 55 microns;
the height is from 45 to 78 microns;
the aspect ratio is from 1.2 to 1.4;
the valley angle is from 60 to 80 degrees;
the angle alpha is from 10 to 25 degrees; and
the angle beta is from 5 to 16 degrees.
43. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 40±2 microns;
the height is 52±2 microns;
the valley angle is 74±2 degrees;
the angle alpha is 17±2 degrees; and
the angle beta is 12±2 degrees.
44. The film construction according to any of the preceding embodiments directed to film construction D, wherein one or more of the microstructured prismatic elements that have a first peak and a second peak, each has a pitch, a height, and a valley angle, a first included angle (alpha), and a second included angle (beta), wherein:
the pitch is 50±2 microns;
the height is 66±2 microns;
the valley angle is 74±2 degrees;
the angle alpha is 17±2 degrees; and
the angle beta is 12±2 degrees.
45. The film construction according to any of the preceding embodiments directed to film construction D, wherein H1>H2>H3>0 microns, and wherein H3 is less than 10 microns.
46. The film construction according to any of the preceding embodiments directed to film construction D, wherein H1>H2>H3>0 microns, and wherein H3 is less than 8 microns.
47. The film construction according to any of the preceding embodiments directed to film construction D, wherein H1>H2>H3>0 microns, and wherein H3 is less than 6 microns.
48. The film construction according to any of the preceding embodiments directed to film construction D, wherein H1>H2>H3>0 microns, and wherein H3 is less than 4 microns.
49. The film construction according to any of the preceding embodiments directed to film construction D, wherein the first peak has an apex angle B1 and the second peak has an apex angle B2, and wherein B1<B2.
50. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate.
51. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the material of the light redirecting substrate is different from the material of plurality of microstructured prismatic elements.
52. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the material of the light redirecting substrate is the same as the material of plurality of microstructured prismatic elements.
53. The film construction according to any of the preceding embodiments directed to film construction D, wherein the material of the plurality of microstructured prismatic elements has refractive index from 1.25 to 1.65.
54. The film construction according to any of the preceding embodiments directed to film construction D, wherein the material of the plurality of microstructured prismatic elements has refractive index from 1.35 to 1.65.
55. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the light redirecting substrate diffuses visible light.
56. The film construction according to any of the preceding embodiments directed to film construction D, wherein the film construction further comprises a diffuser chosen from bulk diffusers, surface diffusers, embedded diffusers, and combinations thereof
57. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the surface roughness of the second major surface of the light redirecting substrate diffuses visible light.
58. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the surface roughness of the first major surface of the light redirecting substrate diffuses visible light.
59. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer adjacent the first major surface of the light redirecting substrate.
60. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the film construction further comprises a diffusing layer immediately adjacent the first major surface of the light redirecting substrate.
61. The film construction according to any of the preceding embodiments directed to film construction D, wherein the film construction further comprises a diffusing layer adjacent the second major surface of the cover film.
62. The film construction according to any of the preceding embodiments directed to film construction D, wherein the film construction further comprises a diffusing layer immediately adjacent the second major surface of the cover film.
63. The film construction according to any of the preceding embodiments directed to film construction D, wherein the adhesive in the adhesive layer is chosen from a pressure sensitive adhesive, a thermoset adhesive, hot melt adhesive, a UV-curable adhesive, or a combination thereof.
64. The film construction according to any of the preceding embodiments directed to film construction D, wherein the adhesive in the adhesive layer is an UV-curable pressure sensitive adhesive.
65. The film construction according to any of the preceding embodiments directed to film construction D, wherein the adhesive layer comprises one or more UV stabilizers.
66. The film construction according to any of the preceding embodiments directed to film construction D, wherein the adhesive in the adhesive layer is an UV-curable pressure sensitive adhesive, and wherein, after the adhesive has been UV-cured, the adhesive does not creep.
67. The film construction according to any of the preceding embodiments directed to film construction D, wherein the adhesive in the adhesive layer comprises a diffusing agent.
68. The film construction according to any of the preceding embodiments directed to film construction D, wherein the adhesive in the adhesive layer comprises a diffusing agent and the diffusing agent is chosen from micro beads and nanoparticles.
69. The film construction according to any of the preceding embodiments directed to film construction D, wherein the adhesive in the adhesive layer comprises a diffusing agent and the diffusing agent is chosen from micro beads having average size from 0.1 microns to 100 microns.
70. The film construction according to any of the preceding embodiments directed to film construction D, wherein the adhesive in the adhesive layer comprises a diffusing agent and the diffusing agent is chosen from micro beads having average size from 0.5 microns to 50 microns.
71. The film construction according to any of the preceding embodiments directed to film construction D, wherein the adhesive in the adhesive layer comprises a diffusing agent and the diffusing agent is chosen from micro beads having average size from 0.7 microns to 20 microns.
72. The film construction according to any of the preceding embodiments directed to film construction D, wherein the adhesive in the adhesive layer comprises a diffusing agent and the diffusing agent is chosen from micro beads having average size from 1 micron to 5 microns.
73. The film construction according to any of the preceding embodiments directed to film construction D, wherein the adhesive in the adhesive layer comprises a diffusing agent and the diffusing agent is chosen from nanoparticles having average size from 1 nm to 100 nm.
74. The film construction according to any of the preceding embodiments directed to film construction D, wherein the adhesive in the adhesive layer comprises a diffusing agent and the diffusing agent is chosen from nanoparticles having average size from 5 nm to 50 nm.

75. The film construction according to any of the preceding embodiments directed to film construction D, wherein the adhesive in the adhesive layer comprises a diffusing agent and the diffusing agent is chosen from nanoparticles having average size from 5 nm to 30 nm.

76. The film construction according to any of the preceding embodiments directed to film construction D, wherein the adhesive in the adhesive layer comprises a diffusing agent and the diffusing agent is chosen from nanoparticles having average size from 1 nm to 20 nm.

77. The film construction according to any of the preceding embodiments directed to film construction D, wherein the thickness of the adhesive layer is from 1 micron to 30 microns.

78. The film construction according to any of the preceding embodiments directed to film construction D, wherein the thickness of the adhesive layer is from 1 micron to 20 microns.

79. The film construction according to any of the preceding embodiments directed to film construction D, wherein the thickness of the adhesive layer is from 1 micron to 10 microns.

80. The film construction according to any of the preceding embodiments directed to film construction D, wherein the thickness of the adhesive layer is from 1 micron to 5 microns.

81. The film construction according to any of the preceding embodiments directed to film construction D, wherein the thickness of the adhesive layer is from 2 micron to 10 microns.

82. The film construction according to any of the preceding embodiments directed to film construction D, wherein the first peak of one or more of the microstructured prismatic elements penetrates from 1 micron to 10 microns into the first major surface of the adhesive layer.

83. The film construction according to any of the preceding embodiments directed to film construction D, wherein the first peak of one or more of the microstructured prismatic elements penetrates from 1 micron to 8 microns into the first major surface of the adhesive layer.

84. The film construction according to any of the preceding embodiments directed to film construction D, wherein the first peak of one or more of the microstructured prismatic elements penetrates from 1 micron to 6 microns into the first major surface of the adhesive layer.

85. The film construction according to any of the preceding embodiments directed to film construction D, wherein the first peak of one or more of the microstructured prismatic elements penetrates from 1 micron to 5 microns into the first major surface of the adhesive layer.

86. The film construction according to any of the preceding embodiments directed to film construction D, wherein the first peak of one or more of the microstructured prismatic elements penetrates from 1 micron to 4 microns into the first major surface of the adhesive layer.

87. The film construction according to any of the preceding embodiments directed to film construction D, wherein the one or more of the microstructured prismatic elements have one or more curved facets.

88. The film construction according to any of the preceding embodiments directed to film construction D, wherein the film construction has a visible light transmission from 10 to 100%.

89. The film construction according to any of the preceding embodiments directed to film construction D, wherein the film construction has a visible light transmission from 20 to 100%.

90. The film construction according to any of the preceding embodiments directed to film construction D, wherein the film construction has a visible light transmission from 20 to 95%.

91. The film construction according to any of the preceding embodiments directed to film construction D, wherein the film construction has a visible light transmission from 20 to 85%.

92. The film construction according to any of the preceding embodiments directed to film construction D, wherein the film construction has a visible light transmission from 30 to 80%.

93. The film construction according to any of the preceding embodiments directed to film construction D, wherein the cover film is an optical film.

94. The film construction according to any of the preceding embodiments directed to film construction D, wherein the cover film is an infrared-reflecting film.

95. The film construction according to any of the preceding embodiments directed to film construction D, wherein the cover film diffuses visible light.

96. The film construction according to any of the preceding embodiments directed to film construction D, wherein the cover film diffuses visible light by having a diffuser chosen from bulk diffusers, surface diffusers, embedded diffusers, and combinations thereof.

97. The film construction according to any of the preceding embodiments directed to film construction D, wherein the second major surface of the cover film comprises a coating.

98. The film construction according to any of the preceding embodiments directed to film construction D, wherein the second major surface of the cover film comprises a coating chosen from hardcoats, anti-scratch coatings, low-surface energy coatings, easy-clean coatings, anti-glare coatings, and combinations thereof.

99. The film construction according to any of the preceding embodiments directed to film construction D, wherein the film construction has a rectangular or square shape and the edge of at least one side is sealed with a sealing agent.

100. The film construction according to any of the preceding embodiments directed to film construction D, wherein the film construction has a rectangular or square shape and the edge of at least one side is sealed with an edge sealing tape.

101. The film construction according to any of the preceding embodiments directed to film construction D, wherein the film construction has a circular or ellipsoidal shape and the edge of the film construction is sealed all around.

102. The film construction according to any of the preceding embodiments directed to film construction D, wherein the film construction has a circular or ellipsoidal shape and at least a portion of the edge of the film construction is sealed with a sealing agent.

103. The film construction according to any of the preceding embodiments directed to film construction D, wherein the film construction has a circular or ellipsoidal shape and at least a portion of the edge of the film construction is sealed with an edge sealing tape.

104. The film construction according to any of the preceding embodiments directed to film construction D, wherein the light redirecting film comprises a light redirecting substrate having first and second major surfaces, and wherein the plurality of the microstructured prismatic elements are on the second major surface of the light redirecting substrate, and wherein the film construction further comprises a window film adhesive layer adjacent the first major surface of the light redirecting substrate.

105. The film construction according to any of the preceding embodiments directed to film construction D, wherein the film construction further comprises a window film adhesive layer adjacent the second major surface of the cover film.

106. The film construction according to any of the preceding embodiments directed to film construction D, wherein the film construction further comprises a window film adhesive layer, and the window film adhesive layer comprises one or more UV stabilizers.

107. A window film comprising a film construction as claimed as in any of the preceding embodiments directed to film construction D.

108. A glazing unit comprising a film construction as claimed as in any of the preceding embodiments directed to film construction D.

We claim:

1. A film construction comprising:
  a light redirecting film having a first major surface and a second major surface opposite the first major surface, wherein the first major surface of the light redirecting film comprises a plurality of microstructured prismatic elements,
  wherein one or more of the microstructured prismatic elements have a first peak and a second peak,
  wherein the first peak has a height H1 and the second peak has a height H2,
  wherein H3 is H1-H2, and H3 is equal or greater than 1 micrometer,
  an adhesive layer comprising an adhesive, wherein the adhesive layer has a first major surface and a second major surface opposite the first major surface,
  a cover film having a first major surface and a second major surface opposite the first major surface,
wherein the first peak of one or more of the microstructured prismatic elements penetrates at least partially into the first major surface of the adhesive layer,
wherein the second major surface of the adhesive layer is adjacent to the first major surface of the cover film.

2. The film construction of claim 1, wherein H3 is from 2 micrometers to 8 micrometers.

3. The film construction of claim 1, wherein the second major surface of the adhesive layer is immediately adjacent to the first major surface of the film.

4. The film construction of claim 1, wherein when the film construction is in a vertical position, the first peak of the microstructured prismatic element is positionally located above the second peak.

5. The film construction of claim 1, wherein each of the one or more of the microstructured prismatic elements that have a first peak and a second peak, has a pitch, a height, an aspect ratio, a valley angle, a first included angle (alpha), and a second included angle (beta), wherein:
  the pitch is from 35 to 55 micrometers;
  the height is from 45 to 78 micrometers;
  the aspect ratio is from 1.2 to 1.5;
  the valley angle is from 60 to 80 degrees;
  the angle alpha is from 15 to 25 degrees; and
  the angle beta is from 5 to 15 degrees.

6. The film construction of claim 1, wherein each of the one or more of the microstructured prismatic elements that have a first peak and a second peak, has a pitch, a height, an aspect ratio, a valley angle, a first included angle (alpha), and a second included angle (beta), wherein:
  the pitch is from 35 to 55 micrometers;
  the height is from 40 to 72 micrometers;
  the aspect ratio is from 1.1 to 1.3;
  the valley angle is from 50 to 70 degrees;
  the angle alpha is from 18 to 28 degrees; and
  the angle beta is from 4 to 12 degrees.

7. The film construction of claim 1, wherein H1>H2>H3>0 micrometers, and wherein H3 is less than 6 micrometers.

8. The film construction of claim 1, wherein the first peak has an apex angle B1 and the second peak has an apex angle B2, and wherein B1<B2.

9. The film construction of claim 1, wherein the film construction further comprises a diffuser chosen from bulk diffusers, surface diffusers, embedded diffusers, and combinations thereof.

10. The film construction of claim 1, wherein the film construction further comprises a diffusing layer adjacent the second major surface of the cover film.

11. The film construction of claim 1, wherein the adhesive in the adhesive layer is an ultraviolet(UV)-curable pressure sensitive adhesive.

12. The film construction of claim 1, wherein the adhesive in the adhesive layer comprises a diffusing agent and the diffusing agent is chosen from micro beads and nanoparticles.

13. The film construction of claim 1, wherein the first peak of one or more of the microstructured prismatic elements penetrates from 1 micrometer to 6 micrometers into the first major surface of the adhesive layer.

14. The film construction of claim 1, wherein the film construction further comprises a window film adhesive layer adjacent the second major surface of the cover film.

15. A glazing unit comprising a film construction of claim 1.

* * * * *